United States Patent
Shibayama et al.

(10) Patent No.: US 10,620,345 B2
(45) Date of Patent: Apr. 14, 2020

(54) ANTIREFLECTION FILM AND METHOD OF PRODUCING SAME

(71) Applicant: TOPPAN PRINTING CO., LTD., Tokyo (JP)

(72) Inventors: Naoyuki Shibayama, Tokyo (JP); Toshiaki Yoshihara, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 1085 days.

(21) Appl. No.: 14/038,351

(22) Filed: Sep. 26, 2013

(65) Prior Publication Data

US 2014/0023840 A1    Jan. 23, 2014

Related U.S. Application Data

(63) Continuation of application No. PCT/JP2012/057794, filed on Mar. 26, 2012.

(30) Foreign Application Priority Data

Mar. 28, 2011  (JP) .................... 2011-070083
Apr. 19, 2011  (JP) .................... 2011-093028

(51) Int. Cl.
*G02B 1/11* (2015.01)
*G02B 1/115* (2015.01)
(Continued)

(52) U.S. Cl.
CPC .......... *G02B 1/115* (2013.01); *B29D 11/0073* (2013.01); *B29D 11/00788* (2013.01);
(Continued)

(58) Field of Classification Search
CPC ... G02B 1/115; G02B 1/111; G02F 1/133502; G02F 2202/22; G02F 1/36;
(Continued)

(56) References Cited

U.S. PATENT DOCUMENTS

2007/0086091 A1   4/2007  Sawanobori et al.
2008/0239486 A1   10/2008 Kato et al.
(Continued)

FOREIGN PATENT DOCUMENTS

JP    A-11-092750    4/1999
JP    2003-53878     2/2003
(Continued)

OTHER PUBLICATIONS

Japanese Office Action dated Jan. 5, 2016 in corresponding Japanese Patent Application No. 2014-092068.
(Continued)

*Primary Examiner* — Nancy R Johnson

(57) ABSTRACT

Provided is an antireflection film obtained by laminating, in succession, a transparent substrate, a first layer, and a second layer having a lower refractive index than the refractive index of the first layer. The first layer is obtained by curing a film containing an ionizing radiation-curable material, a quaternary ammonium salt material, a leveling agent, and a solvent, and has a structure wherein a middle layer, hard coating layer and recoating layer are laminated in succession from the transparent substrate side. The recoating layer does not contain a quaternary ammonium salt. The hard coating layer contains a quaternary ammonium salt, and the concentration of the quaternary ammonium salt in the hard coating layer gradually increases from the middle layer side to the recoating layer side.

10 Claims, 6 Drawing Sheets

(51) Int. Cl.
*G02B 1/111* (2015.01)
*B29D 11/00* (2006.01)
*G02F 1/1335* (2006.01)
*H01L 51/52* (2006.01)

(52) U.S. Cl.
CPC ........ *G02B 1/111* (2013.01); *G02F 1/133502* (2013.01); *G02F 2201/38* (2013.01); *G02F 2202/22* (2013.01); *G02F 2202/36* (2013.01); *H01L 51/5275* (2013.01); *H01L 51/5281* (2013.01); *Y10T 428/24942* (2015.01)

(58) Field of Classification Search
CPC .......... G02F 2201/38; B29D 11/00788; B29D 11/0073; Y10T 428/24942; H01L 51/5275; H01L 51/5281
See application file for complete search history.

(56) References Cited

U.S. PATENT DOCUMENTS

| | | |
|---|---|---|
| 2009/0075074 A1 | 3/2009 | Horio et al. |
| 2009/0176084 A1 | 7/2009 | Yoshihara et al. |
| 2009/0202819 A1 | 8/2009 | Asahi et al. |
| 2010/0208350 A1 | 8/2010 | Yoshihara |
| 2011/0268875 A1 | 11/2011 | Yoshihara et al. |
| 2013/0143028 A1 | 6/2013 | Asahi et al. |

FOREIGN PATENT DOCUMENTS

| | | |
|---|---|---|
| JP | A-2005-144849 | 6/2005 |
| JP | A-2005-199707 | 7/2005 |
| JP | A-2005-202389 | 7/2005 |
| JP | A-2006-159415 | 6/2006 |
| JP | 2007-78711 | 3/2007 |
| JP | A-2007-121993 | 5/2007 |
| JP | A-2008-250315 | 10/2008 |
| JP | 2009-53691 | 3/2009 |
| JP | 2009-86660 | 4/2009 |
| JP | 2009-217258 | 9/2009 |
| JP | A-2010-217873 | 9/2010 |

OTHER PUBLICATIONS

International Preliminary Report on Patentability dated Oct. 2, 2013 in corresponding International Patent Application No. PCT/JP2012/057794.

International Search Report issued in International Application No. PCT/JP2012/057794 dated Jul. 3, 2012.

Japanese Office Action dated Feb. 4, 2014 in corresponding Japanese Patent Application No. 2013-507568.

Extended European Search Report dated Apr. 29, 2015 for corresponding European Patent Application No. 14198889.9.

Office Action dated Mar. 2, 2018, in corresponding Korean Patent Application No. 10-2013-7027904, 17 pgs.

ANTIREFLECTION FILM AND METHOD OF PRODUCING SAME

This is a Continuation of International Application No. PCT/JP2012/057794 filed Mar. 26, 2012, which claims the benefit of Japanese Applications No. 2011/070083 filed Mar. 28, 2011 and No. 2011-093028 filed Apr. 19, 2011. The disclosure of the prior applications is hereby incorporated by reference herein in its entirety.

TECHNICAL FIELD

The present invention relates to an antireflection film provided on the surface of a window, a display, or the like in order to suppress reflection of outside light. In particular, the present invention relates to an antireflection film provided on the surface of a display such as a liquid crystal display (LCD), a cathode ray tube (CRT) display, an organic electroluminescence display (OLED), a plasma display, a surface-conduction electron-emitter display (SED), and a field emission display (FED). Furthermore, the present invention relates to an antireflection film provided on the surface of a liquid crystal display (LCD), in particular, the surface of a transmissive liquid crystal display (LCD).

BACKGROUND ART

Generally, a display is used in such an environment that is entered by outside light, whether it is used indoors or outdoors. Incident light, such as external light, is specularly reflected on the surface of the display or the like, and such a reflected image that is caused by this specular reflection is mixed with an image which is displayed in the display, thereby decreasing screen display quality. Therefore, providing an antireflection function is essential to the surface of the display or the like. This antireflection function is required to have more enhanced performance and be combined with other functions.

Generally, an antireflection function is obtained by forming antireflection layers of a multilayer structure on a transparent substrate, or specifically, by forming, on a transparent substrate, antireflection layers having a repeated structure of a high refractive index layer and a low refractive index layer each of which is made of a transparent substrate, such as metal oxide. The antireflection layers configured by a multilayer structure can be formed by using a dry deposition method, such as chemical vapor deposition (CVD) or physical vapor deposition (PVD).

The dry deposition method has an advantage of finely controlling the thickness of a low refractive index layer and a high refractive index layer. On the other hand, the dry deposition method, in which deposition is performed in vacuum, suffers from a problem of low productivity and unsuitableness to mass production. For this reason, attention is drawn to a wet deposition method as a method of forming antireflection layers. The wet deposition method uses a coating liquid and enables increase of area, continuous production and cost reduction.

An antireflection film in which these antireflection layers are provided on a transparent substrate has a comparatively soft surface. Therefore, in order to give surface hardness to the film, the film is provided with a hard coating layer in the manufacturing process, followed by forming antireflection layers thereon, the hard coating layer being generally obtained by curing an ionizing-radiation-curable material, such as an acrylic material. A hard coating layer made of an acrylic material has high surface hardness, glossiness, transparency and abrasion resistance. An antireflection film manufactured by coating at least a low refractive index layer on such a hard coating layer has a merit of being manufactured at comparatively low cost and thus is widely available on the market.

Techniques related to the technique mentioned above are disclosed, for example, in JP-A-2005-202389, JP-A-2005-199707, JP-A-H11-092750, JP-A-2007-121993, JP-A-2005-144849, JP-A-2006-159415 and JP-A-2010-217873.

SUMMARY

Technical Problem

Reflection of outside light can be suppressed by an antireflection function of an antireflection film provided on the surface of the display, and then, in bright place, contrast can be enhanced. In addition, transmittance can be enhanced and therefore a brighter image can be displayed. Further, an effect of energy saving can be expected, such as suppression of the output or the like of a backlight.

An antireflection film has high insulation properties and thus is easily electrostatically charged. Accordingly, such an antireflection film raises a problem that the surface of a product which is provided with a hard coating layer may be tainted by attachment of dust or the like, or that electrostatic charging may occur in the course of the manufacture of a display and may cause trouble. For this reason, an antireflection film is often provided with antistatic performance. Methods of giving antistatic performance to an antireflection film, as suggested, include a method of forming an antistatic layer that contains an electrically conductive material and a method of having a hard coating layer containing an electrically conductive material.

While being required to have antireflection performance, an antireflection film is required to have no interference unevenness and to have excellent optical characteristics. Further, being provided on an outermost surface of a display, an antireflection film is required to have high abrasion resistance.

Further, in addition to the necessity of having excellent antireflection performance, optical characteristics, antistatic performance and abrasion resistance as mentioned above, an antireflection film is required to be manufactured at low cost.

Accordingly, the object of the present invention is to provide an antireflection film that can balance excellent optical characteristics, antistatic performance and high abrasion resistance, with low manufacturing cost.

Solution to Problem

A first aspect of the present invention relates to an antireflection film in which a transparent substrate, a first layer and a second layer that has a refractive index lower than that of the first layer are laminated in this order, wherein: the first layer is formed by curing a coating film that contains an ionizing-radiation-curable material, a quaternary ammonium salt material, a leveling material and a solvent, and has a structure in which a middle layer, a hard coating layer and a recoating layer are laminated in this order from a side of the transparent substrate; the recoating layer does not contain the quaternary ammonium salt material; and the hard coating layer contains the quaternary ammonium salt material whose concentration in the hard coating layer increases from the middle layer side toward the recoating layer side.

The leveling material may be selected from a group consisting of compounds having an acryl group, compounds having a fluorine group and compounds having a siloxane bond.

The quaternary ammonium salt material may have a molecular weight ranging from 2,000 to 80,000; and the leveling material may have a molecular weight ranging from 1,000 to 80,000.

The first layer may have a thickness ranging from at least 3 μm to 15 μm.

In the antireflection film, a parallel light transmittance may be not less than 93%; a haze may be not more than 0.5%; a surface resistance in the second layer may range from $1\times10^5$ Ω/cm² to $1\times10^{12}$ Ω/cm²/cm²; and a pure-water contact angle in a surface of the second layer may range from 80° to 140°.

A second aspect of the present invention relates to a method of manufacturing an antireflection film in which a transparent substrate, a first layer and a second layer that has a refractive index lower than that of the first layer are laminated in this order, comprising: a coating step of forming a first coating film by applying a coating liquid to at least one principal surface of the transparent substrate, the coating liquid containing an ionizing-radiation-curable material, a quaternary ammonium salt material, a leveling material and a solvent; a first drying step of subjecting the first coating film to primary drying; a second drying step of subjecting the first coating film that has been subjected to the primary drying to secondary drying; and a step of applying ionizing radiation to the first coating film that has been subjected to the secondary drying to obtain the first layer as a cured material of the first coating film.

The coating liquid may contain 25 parts by mass to 85 parts by mass of the solvent per 100 parts by mass of the coating liquid; and the solvent may contain 30 parts by mass or more of a solvent that dissolves or swells the substrate, per 100 parts by mass of the solvent.

The primary drying may be performed in a range of 15° C. to 30° C.; and the secondary drying may be performed in a range of 40° C. to 150° C.

A third aspect of the present invention relates to an antireflection film in which a transparent substrate, a first layer and a second layer that has a refractive index lower than that of the first layer are laminated in this order, wherein: the first layer is formed by curing a coating film that contains an ionizing-radiation-curable material, metal oxide microparticles, a leveling material and a solvent, and has a structure in which a middle layer, a hard coating layer and a recoating layer are laminated in this order from a side of the transparent substrate; the recoating layer does not contain metal oxide microparticles; and the hard coating layer contains the metal oxide microparticles, the metal oxide microparticles being unevenly distributed in the hard coating layer.

In the hard coating layer, the metal oxide microparticles may have a volume whose proportion in a unit volume of the hard coating layer increases from the middle layer side toward the recoating layer side.

The metal oxide fine particles may have electrical conductivity.

The leveling material may be selected from a group consisting of compounds having an acryl group, compounds having a fluorine group and compounds having a siloxane bond.

The metal oxide microparticles may have a particle size of not more than 2 μm; and the leveling material may have a molecular weight ranging from 500 to 80,000.

The second layer may have a thickness ranging from 3 μm to 15 μm.

In the antireflection film, a parallel light transmittance may be not less than 93%; a haze may be not more than 0.5%; a surface resistance in the second layer may range from $1\times10^5$ Ω/cm² to $1\times10^{12}$ Ω/cm²; and a pure-water contact angle in a surface of the second layer may range from 80° to 140°.

The fourth aspect of the present invention relates to a method of manufacturing an antireflection film in which a transparent substrate, a first layer and a second layer that has a refractive index lower than that of the first layer are laminated in this order, comprising: a coating step of forming a first coating film by applying a coating liquid to at least one principal surface of the transparent substrate, the coating liquid containing an ionizing-radiation-curable material, metal oxide microparticles, a leveling material and a solvent; a first drying step of subjecting the first coating film to primary drying; a second drying step of subjecting the first coating film that has been subjected to the primary drying to secondary drying; and a step of applying ionizing radiation to the first coating film that has been subjected to the secondary drying to obtain the first layer as a cured material of the first coating film.

The coating liquid may contain 25 parts by mass to 85 parts by mass of the solvent based on 100 parts by mass of the coating liquid; and the solvent may contain 30 parts by mass or more of a solvent that dissolves or swells the substrate, per 100 parts by mass of the solvent.

The primary drying may be performed in a range of 15° C. to 30° C.; and the secondary drying may be performed in a range of 40° C. to 150° C.

In the first drying step, time from when the first coating film is applied until when the solvent contained in the first coating film become 10 parts by mass or less may range from 2 seconds to 60 seconds.

Advantageous Effects of Invention

The present invention can provide an antireflection film that has excellent optical characteristics, antistatic performance and abrasion resistance and is manufactured at low cost, and can provide a method of manufacturing the same. In particular, the present invention can provide an antireflection film having excellent optical characteristics, and a method of manufacturing the same.

DESCRIPTION OF EMBODIMENTS

With reference to the drawings hereinafter is described some embodiments of the present invention.

In the present specification, "(meth)acrylate" refers to both "acrylate" and "methacrylate". For example, "urethane (meth)acrylate" refers to both "urethane acrylate" and "urethane methacrylate".

Further, "molecular weight" refers to a molecular weight that can be derived from a structural formula when the molecular weight is not more than 1,000, or refers to a weight-average molecular weight when the molecular weight is more than 1,000. Furthermore, an average particle size of metal oxide particles and an average particle size of metal oxide microparticles mean a particle size at an integrated value of 50% in a particle size distribution that has been obtained using a light scattering method.

First Embodiment

Hereinafter, a first embodiment of the present invention is described.

<<Antireflection Film>>

Figure 1:
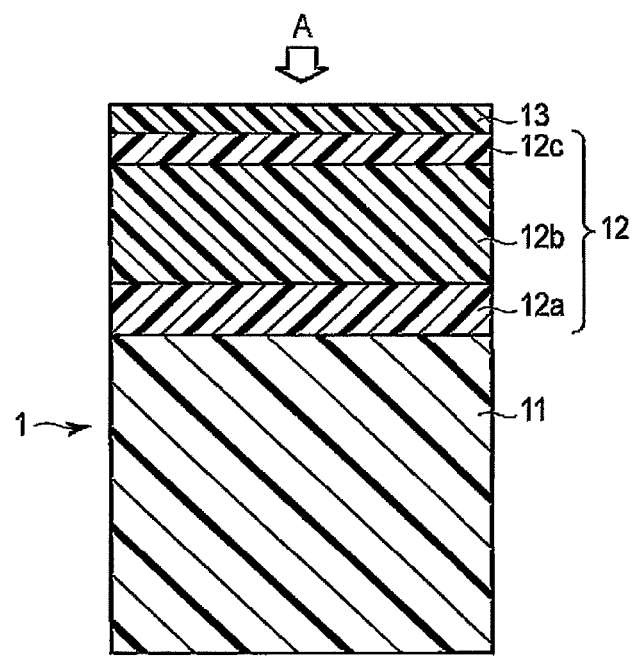
FIG. 1 is a schematic diagram showing a cross section of an antireflection film related to an embodiment.

FIG. 1 is a schematic diagram illustrating a cross section of an antireflection film 1 according to an embodiment.

The antireflection film 1 includes a transparent substrate 11, an uneven distribution layer 12 and a low refractive index layer 13.

The uneven distribution layer 12 and the low refractive index layer 13 are provided on at least one surface of the transparent substrate 11. As shown in FIG. 1, the uneven distribution layer 12 and the low refractive index layer 13 are laminated in this order from the transparent substrate side. The refractive index of the low refractive index layer 13 is low compared to that of the uneven distribution layer 12. Specifically, the refractive index of the low refractive index layer 13 is low compared to that of a hard coating layer 12b, which will be described later, of the uneven distribution layer 12. For example, the refractive index here is measured at a wavelength of 550 nm.

Hereinafter, the uneven distribution layer 12 and the low refractive index layer 13 will be described in turn.

<Uneven Distribution Layer>

The uneven distribution layer 12 is obtained from an ionizing-radiation-curable material, a quaternary ammonium salt material, a leveling material and a solvent.

For example, the uneven distribution layer 12 is obtained by applying ionizing radiation to an uneven-distribution-layer-forming coating liquid that contains these materials, followed by curing. The ionizing-radiation-curable material is cured by the application of ionizing radiation to form a binder matrix. The binder matrix formed in this way can give a high surface hardness to an antireflection film.

Preferably, the thickness of the uneven distribution layer falls within a range of 3 μm to 15 μm. By setting a thickness that falls within such a predetermined range, an intended uneven distribution layer can be obtained. If the uneven distribution layer has a thickness of less than 3 μm, the hard coating layer would not have a sufficient surface hardness and thus the antireflection film obtained would not have sufficient hard coating properties. Further, if the uneven distribution layer has a thickness of 15 μm or more, a desired concentration distribution would not be obtained in the quaternary ammonium salt material and thus the predetermined antistatic function would not be obtained. More preferably, the thickness of the uneven distribution layer falls within a range of 4 μM to 10 μm.

The uneven distribution layer includes a middle layer 12a, the hard coating layer 12b and a recoating layer 12c. The middle layer 12a, the hard coating layer 12b and the recoating layer 12c are laminated in this order from the transparent substrate side.

For example, as mentioned above, the uneven distribution layer is formed from an uneven-distribution-layer-forming coating liquid that contains an ionizing-radiation-curable material, a quaternary ammonium salt material, a leveling material and a solvent. With the application of this coating liquid, a coating film is formed. Then, the coating film is dried and the dried coating film is cured to thereby form the uneven distribution layer.

In forming the uneven distribution layer in this way, the solvent which is contained in the coating liquid dissolves or swells the transparent substrate 11 and infiltrates into the transparent substrate 11, in a period from when the coating film has been formed until when the coating film is dried. Accompanying this, the components of the binder-matrix-foaming material infiltrate into the transparent substrate 11, for mixing with the components configuring the substrate. In this way, the middle layer 12a is formed. On the other hand, the quaternary ammonium salt material, which hardly infiltrates into the transparent substrate 11, segregates toward a side opposite to the transparent substrate side and forms the hard coating layer 12b. In this instance, due to surface tension, the quaternary ammonium salt material is inhomogeneously present such that the low refractive index layer side of the hard coating will have a high concentration and the transparent substrate side thereof will have a low concentration. The leveling material moves to the outermost surface (the side on which the low refractive index layer is formed) due to surface tension and forms the recoating layer 12c. Thus, the middle layer 12a, the hard coating layer 12b and the recoating layer 12c are formed, with a layer configuration different from each other.

As mentioned above, in the uneven distribution layer 12, the concentration of the quaternary ammonium salt material gradually changes in a direction from the middle layer 12a toward the surface of the uneven distribution layer (the side of the low refractive index layer 13). Specifically, the concentration of the quaternary ammonium salt material gradually increases in a direction from the middle layer 12a toward the surface of the uneven distribution layer (the low refractive index layer 13 side). Such a change of concentration of the quaternary ammonium salt material can be confirmed by performing electron probe micro analysis (EPMA) with respect to a cross section of the uneven distribution layer 12 and measuring the concentration of anions of the quaternary ammonium salt material, which are contained in the uneven distribution layer. Generally, chloride ions are very often used as anions of the quaternary ammonium salt material. Therefore, by measuring the concentration of chlorine, the quaternary ammonium salt material can be confirmed as being inhomogeneously present.

The EPMA may be performed by using whichever of an energy-dispersive X-ray fluorescence analyzer (EDX) or a wavelength-dispersive X-ray fluorescence analyzer (WDX).

Hereinafter is explained a method of confirming the distribution of the quaternary ammonium salt material in the case where the anions of the quaternary ammonium salt material are chloride ions.

Figure 2:
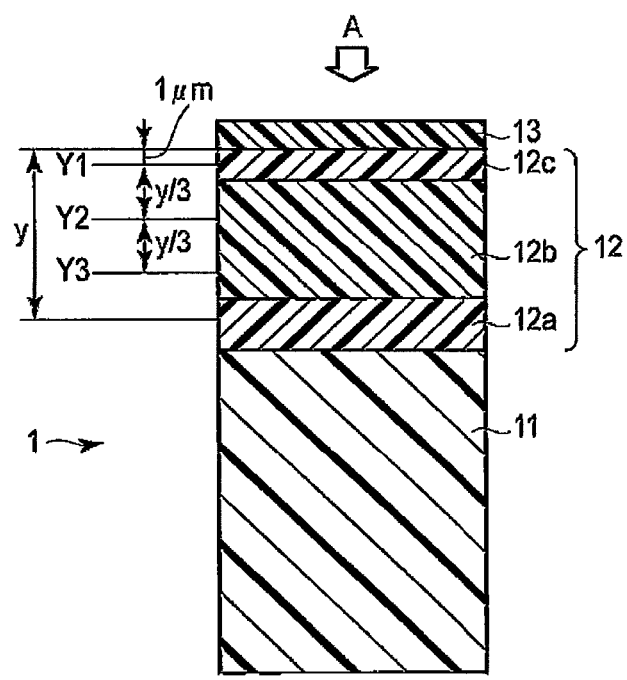
FIG. 2 is a diagram showing measurement positions of EPMA analysis in the cross section of an antireflection film related to an embodiment.

FIG. 2 is a diagram illustrating measurement positions in the EPMA analysis.

In the EPMA analysis, the concentration of chloride ion is measured at three positions Y1, Y2 and Y3 in the depth direction shown in FIG. 2, in a processed cross section of the uneven distribution layer of the antireflection film.

The thickness of the uneven distribution layer 12 here is y. y is calculated from the amount of application of the coating liquid. Y1 corresponds to a position 1 μm deep from the interface between the uneven distribution layer 12 and the low refractive index layer 13. Y2 corresponds to a position 1 μm+(y/3) μm deep from the interface between the uneven distribution layer 12 and the low refractive index layer 13. Y3 corresponds to a position 1 μm+(2y/3) μm deep from the interface between the uneven distribution layer 12 and the low refractive index layer 13.

The quaternary ammonium salt material is determined as being unevenly distributed in the hard coating layer on condition that chlorine is detected at all of the positions Y1, Y2 and Y3 and that the detected concentration (atomic %) of chlorine at each of the positions satisfies a relation expressed by (detection amount of Cl at Y1)>(detection amount of Cl at Y2)>(detection amount of Cl at Y3). In other words, it is determined that, in the hard coating layer, the concentration of the quaternary ammonium salt gradually increases in a direction from the middle layer side toward the recoating layer side.

When the detection amount of chlorine is not more than 0.1 atomic % in the EPMA analysis, chlorine is regarded not to be detectable. Further, when the difference in the detection amount of chlorine between Y1, Y2 and Y3 is not less than 0.1 atomic %, the difference is regarded as a significant difference.

In this way, when the concentration of the quaternary ammonium salt material gradually increases, the amount of use of the quaternary ammonium salt material can be reduced, compared to the case where, for example, (detection amount of chlorine at Y1), (detection amount of chlorine at Y2) and (detection amount of chlorine at Y3) are equal to each other and there is no difference in the concentration.

Further, for example, when the quaternary ammonium salt material is present only on the low refractive index layer side, adhesion and steel wool resistance (abrasion resistance) of the hard coating layer are enhanced, compared specifically to the case where Cl is detected only at Y1. When the composition of a resin drastically changes in the uneven distribution layer, an interface is generated and thus adhesion and steel wool resistance (abrasion resistance) are impaired. However, the gradual change in the concentration of the quaternary ammonium salt material as described above can prevent the generation of an interface.

Hereinafter are described the layers included in the uneven distribution layer 12, i.e. the middle layer 12a, the hard coating layer 12b and the recoating layer 12c.

(Middle Layer)

The middle layer 12a is present in the interface between the transparent substrate 11 and the uneven distribution layer 12. In the middle layer 12a, the components of the transparent substrate are mixed with the components of the ionizing-radiation-curable material.

The refractive index of the middle layer 12a changes in a thickness direction, that is, in a direction from the transparent substrate 11 side toward the side of the low refractive index layer 13. Specifically, the refractive index gradually changes from the refractive index of the transparent substrate 11 to that of the hard coating layer 12b. More specifically, the refractive index gradually increases from the refractive index of the transparent substrate 11 to that of the hard coating layer 12b.

By providing such a middle layer 12a, an interference band is prevented from being generated in the interference between the uneven distribution layer and the transparent substrate. Further, the middle layer 12a can enhance the adhesiveness between the transparent substrate 11 and the uneven distribution layer 12. The middle layer 12a can be formed from the uneven-distribution-layer-forming coating liquid.

The presence of the middle layer 12a can be confirmed by calculating a spectral reflectance of the antireflection film with an incidence angle of 5° from the low refractive side. When an interference peak corresponding to the thickness of the low refractive index layer is confirmed in the spectral reflectance (when a number of ripples are confirmed in the waveform of the optical spectrum), it is determined that the middle layer 12a has not been formed. In this case, an interference band will be observed in a visual inspection with the application of black coating to the rear surface. On the other hand, when no interference peak corresponding to the thickness of the low refractive index layer is confirmed in the spectral reflectance, it is determined that the middle layer 12a has been formed. In this case, interference unevenness cannot be found at all in the visual inspection with the application of black coating to the rear surface.

The interference band and the interference unevenness, which are a kind of color variations due to optical interference, are mainly caused by the difference in the refractive index between the transparent substrate and the hard coating layer. That is, the interference band and the interference unevenness correspond to a phenomenon in which a plurality of optical interferences concurrently occur in a film having a large thickness and iridescent color variations can be observed. The color variations refer to reflected-color variations that are induced by the uneven thickness of the low refractive index layer, i.e. a phenomenon in which in-plane color unevenness is deepened.

(Hard Coating Layer)

As shown in FIG. 1, the hard coating layer 12b is formed on the middle layer 12a.

The hard coating layer 12b contains the ionizing-radiation-curable material and the quaternary ammonium salt material, which are the components of the binder matrix. Such a hard coating layer 12b enhances the surface hardness of the antireflection film, while giving abrasion resistance to the antireflection film. With the blending of the quaternary ammonium salt material, the antireflection film is imparted with antistatic properties. The hard coating layer 12b further contains the leveling material. The hard coating layer 12b can be formed from the uneven-distribution-layer-forming coating liquid.

As described above, in the hard coating layer 12b, the quaternary ammonium salt material is distributed with concentration differentials. The concentration of the quaternary ammonium salt material increases in a direction from the middle layer 12a toward the surface of the uneven distribution layer (the low refractive side).

When the quaternary ammonium salt material is present in some portions of the antireflection film, the antireflection film exhibits the antistatic function. The antistatic properties are exhibited at a portion in which the concentration of the quaternary ammonium salt material is the highest. Therefore, when the coating film is designed such that the concentration of the quaternary ammonium salt material will be high on the recoating layer side of the hard coating layer 12b, the antireflection film can exhibit the antistatic function. Such a design can contribute to reducing the amount of use of the expensive quaternary ammonium salt material, compared to the case where the quaternary ammonium salt material is dispersed in the entire hard coating layer 12b. The amount of use of the quaternary ammonium salt material can be reduced, and the bleeding of the quaternary ammonium salt material to the surface can be suppressed, and recoating properties can be enhanced. Furthermore, the occurrence of blushing can be suppressed.

(Recoating Layer)

As shown in FIG. 1, the recoating layer 12c is formed on the hard coating layer 12b. The recoating layer 12c can be formed from the uneven-distribution-layer-forming coating liquid.

The recoating layer 12c contains the leveling material. Typically, the recoating layer 12c contains the ionizing-radiation-curable material and the leveling material.

The recoating layer 12c does not contain the quaternary ammonium salt material.

If no recoating layer 12c is formed, the low refractive index layer 13 would be separated and abrasion resistance would be impaired. This is considered to be ascribed to the quaternary ammonium salt material which is distributed in the outermost surface (the low refractive index layer side) of the uneven distribution layer electrically repelling the material that forms the low refractive index layer and impairing the adhesion between the uneven distribution layer and the low refractive index layer.

Stronger electrical repulsion between the material that forms the low refractive index layer and the quaternary ammonium salt material may often lead to the occurrence of deficiency, i.e. the occurrence such as of cissing in applying the low-refractive-index-layer-forming coating liquid. Also, when the material that forms the low refractive index layer contains a water-repellent material, the quaternary ammonium salt material and the water-repellent material may electrically repel each other, and thus desired antifouling performance would not be necessarily obtained.

Being ionic, the quaternary ammonium salt material has a property of easily adsorbing moisture from the air. Therefore, if no recoating layer is provided, the quaternary ammonium unevenly distributed in the outermost surface of the uneven distribution layer may adsorb water and the like. Thus, depending on drying conditions after coating, the drying speed may partially vary, leading to the occurrence of surface roughness, occurrence of blushing, occurrence of asperities in the surface of the uneven distribution layer, or the occurrence of haze.

As described above, by providing the recoating layer 12c on the hard coating layer 12b and forming the low refractive index layer 13 on the recoating layer 12c, adhesion can be enhanced and abrasion resistance can be prevented from being impaired. Further, by forming the recoating layer 12c, surface roughness can be suppressed and blushing can be avoided. The occurrence of blushing can be confirmed by measuring a haze value of the antireflection film. Specifically, when the haze value of the antireflection film is not less than 0.5%, blushing may be regarded as having occurred. The occurrence of haze can be prevented by the material that forms the recoating layer because the material also has leveling properties that can suppress the formation of surface asperities. The formation of surface asperities can be confirmed on the basis of the haze value of the antireflection film or by measuring the surface using an atomic force microscope (AFM).

Whether the recoating layer 12c has been formed on the outermost surface of the uneven distribution layer 12 can be confirmed by measuring a contact angle of pure water on the surface of the uneven distribution layer. Specifically, when the contact angle of pure water on the surface of the uneven distribution layer is 60° or more, it may be determined that a recoating layer has been formed on the surface of the uneven distribution layer. When no recoating layer has been formed, i.e. when the quaternary ammonium salt material is present on the surface of the uneven distribution layer 12, the contact angle becomes small due to the high hydrophilic properties of the quaternary ammonium salt material. On the other hand, when the recoating layer has been formed, the contact angle of pure water on the surface of the uneven distribution layer becomes large. When the recoating layer has been formed, the contact angle of pure water is increased on the surface of the uneven distribution layer 12, compared to the case where no recoating layer has been formed.

The formation of the recoating layer 12c on the outermost layer in the uneven distribution layer 12 can also be confirmed by the surface analysis using an X-ray photoelectron spectrometer (XPS). Specifically, the XPS analysis may be conducted of the surface of the uneven distribution layer. If no element derived from the quaternary ammonium salt material is detected, it may be determined that a recoating layer has been formed. For example, the element derived from the quaternary ammonium salt material includes chlorine as anions.

The XPS is a device for analyzing the chemical state on the surface of a sample. When an X-ray (energy: hv) is applied to a sample, core electrons in the elements are beaten out due to the photoelectric effect. The kinetic energy (Ek) in this instance of the photoelectrons is expressed by the following general formula (A).

$$Ek = hv - Eb - \varphi \qquad \text{General formula (A):}$$

Here, Eb is an energy level (binding energy) of the core electrons and $\varphi$ is a work function of the device or the sample. Eb is a value specific to an element and varies depending on the chemical state of the element. On the other hand, the distance that an electron can move in a solid body in a state of retaining energy is several tens of Å at most. The XPS is able to measure Ek of photoelectrons discharged from the surface of a sample and the number of the photoelectrons to thereby analyze the type, amount and chemical state of an element that is present at a position several tens of Å deep from the surface of the sample.

Low Refractive Index Layer>

As shown in FIG. 1, the low refractive index layer 13 is provided on the uneven distribution layer 12.

The low refractive index layer 13 is obtained from the ionizing-radiation-curable material that is the binder-matrix-forming material, and low refractive particles. For example, the low refractive index layer 13 is obtained by applying ionizing radiation to the low-refractive-index-layer-forming coating liquid that contains these materials, followed by curing. When the ionizing-radiation-curable material has a low refractive index, the low-refractive-index-layer-forming coating liquid does not have to contain low refractive particles.

The low refractive index layer 13 has a thickness (d) which is designed such that an optical thickness (nd) obtained by multiplying a refractive index (n) of the low refractive index layer with the thickness (d) will be equal to ¼ of the visual-light wavelength. Having such a thickness, the low refractive index layer 13 exerts the antireflection function in the antireflection film.

Preferably, the optical thickness of the low refractive index layer ranges from 80 nm to 200 nm. When the optical thickness of the low refractive index layer falls within this range, a spectral reflectance curve obtained from the surface side of the antireflection film, i.e. from the side of an arrow A shown in FIGS. 1 and 2, has a minimum value in the vicinity of 500 nm.

In the spectral reflectance curve, the ascending curve in a short-wavelength direction with reference to the minimum value tends to be steep compared to the ascending curve in a long-wavelength direction. In this case, the steep ascending curve in the short-wavelength direction with reference to the minimum value of the spectral reflectance curve becomes the cause of color of the reflected light of the antireflection film to be formed, and also becomes the cause of color variations in the occurrence of thickness variations in the uneven distribution layer. When the minimum value of the spectral reflectance curve is in the vicinity of 500 nm, the reflected hue can be mitigated, and thus the occurrence of color variations due to the steep ascending curve in the short-wavelength direction can be suppressed.

When an average luminous reflectance in a low-refractive-index-layer-forming plane (surface (A)) of the antireflection film exceeds 2.5%, the antireflection performance of the antireflection film is not sufficient. On the other hand, it is difficult to realize an antireflection film whose average luminous reflectance in the surface thereof is 0.2%, by use of optical interference of the uneven distribution layer. The average luminous reflectance in the surface of the low refractive index layer preferably ranges from not less than 0.2% to not more than 2.0%.

For example, the antireflection film of the present embodiment has parallel light transmittance of not less than 93% as measured in conformity with JIS K7361-1:1997, haze of not more than 0.5% as measured in conformity with JIS K7136, surface resistance ranging from $1 \times 10^5$ $\Omega/cm^2$ to $1 \times 10^{12}$ $\Omega/cm^2$ in the surface of the low refractive index layer, and pure-water contact angle ranging from 80° to not more than 140° in the surface of the low refractive index layer of the antireflection film.

Hereinafter are more specifically described the characteristics the antireflection film.

In an antireflection film, the higher the parallel light transmittance is, the more preferable it is. More preferably, the parallel light transmittance ranges from 93% to 98%. Taking account of the materials that can be used currently, it is difficult to prepare an antireflection film having parallel light transmittance exceeding 98%. If parallel light transmittance of an antireflection film falls below 93%, no sense of transparency would be given and white opaqueness (white browning) would be caused, and thus the contrast of the display may be impaired.

In an antireflection film, the lower the haze is, the more preferable it is. More preferably, haze is not more than 0.5%. It is particularly preferable that haze ranges from not less than 0.05% to not more than 0.5%. Taking account of the materials that can be used currently, it is difficult to prepare an antireflection film having haze that is below 0.05%. If haze exceeds 1.0%, no sense of transparency would be given and white opaqueness (white browning) would be caused, and thus the contrast of the display may be impaired.

Further, it is preferable that surface resistance ranges from $1 \times 10^5$ $\Omega/cm^2$ to $1 \times 10^{12}$ $\Omega/cm^2$. In order to prepare an antireflection film having surface resistance of less than $1 \times 10^5$ $\Omega/cm^2$, a large quantity of quaternary ammonium salt material is needed, leading to the probability of not being able to form the uneven distribution layer. When an antireflection film has a surface resistance ranging from $1 \times 10^{10}$ $\Omega/cm^2$ to $1 \times 10^{12}$ $\Omega/cm^2$, the range is generally considered not to cause attachment of dust in an active state. When an antireflection film is used for the outermost surface of a display, this condition is required to be met. For this reason, preferable surface resistance is determined to be not more than $1 \times 10^{12}$ $\Omega/cm^2$. Surface resistance can be measured in conformity with JIS-K6911 (1995).

When the pure-water contact angle is 80° or more in the surface of a low refractive index layer, the low refractive index layer has excellent antifouling properties. When the pure-water contact angle is 140° or less, adhesion between the uneven distribution layer and the low refractive index layer is enhanced in forming the low refractive index layer, and thus high surface hardness can be given. In this case, the antireflection film to be obtained will have more excellent abrasion resistance and antifouling properties. In contrast, if the pure-water contact angle exceeds 140°, cissing would be caused in applying the low-refractive-index-layer-forming coating liquid, and thus the low refractive index layer cannot be necessarily formed. Further, if the pure-water contact angle is less than 80°, sufficient antifouling properties would not be necessarily obtained. The pure-water contact angle can be measured in conformity with JIS R3257 (1999). Specifically, using a contact angle gauge, a droplet may be formed at a needle tip in a dry state (20° C.-65% RH). Then, this is brought into contact with the surface of a sample (solid body) to form a droplet on the surface of the sample. When this contact angle is measured, the pure-water contact angle can be obtained. In this case, the "contact angle" refers to an angle formed between: a tangent line with respect to the surface of liquid at a point where the solid body contacts the liquid; and the surface of the solid body, and is defined by an angle on the side of the liquid. Distilled water is used as the liquid.

<<Method of Manufacturing Antireflection Film>>

Subsequently, hereinafter is described a method of manufacturing the antireflection film according to the present embodiment.

Figure 3:
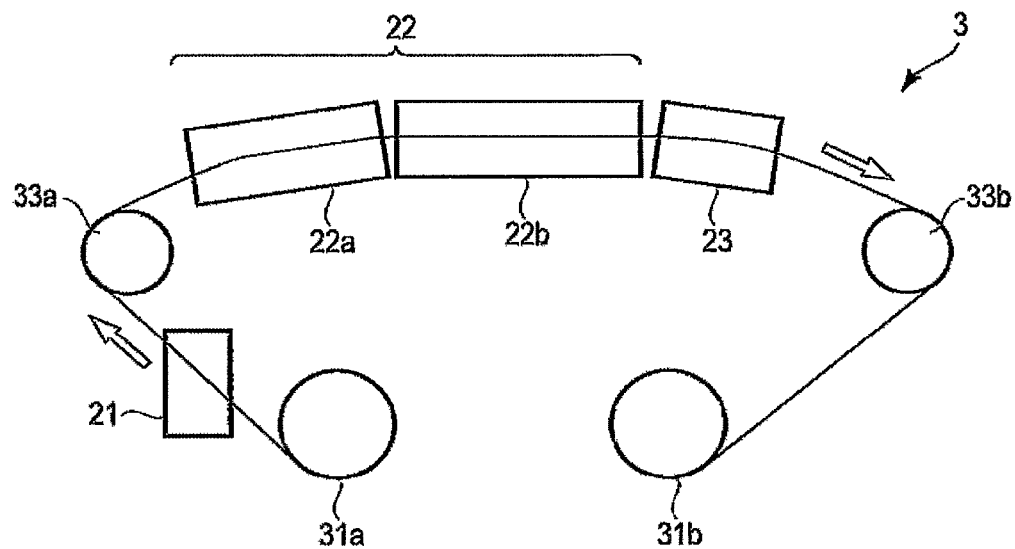
FIG. 3 is a schematic diagram showing an apparatus for manufacturing an antireflection film related to an embodiment.

The antireflection film according to the present embodiment can be manufactured by using an apparatus 3 for manufacturing an antireflection film, which is schematically shown in FIG. 3.

The manufacturing apparatus 3 includes a first unit 21, a second unit 22 and a third unit 23. The units are connected in series in this order.

The manufacturing apparatus 3 further includes a conveyor. The conveyor conveys the substrate 11 so that the substrate 11 passes through the first unit 21, the second unit 22 and the third unit 23 in this order.

The first unit 21 includes a coating applicator. The coating applicator forms a coating film on the substrate 11 in the first unit 21. Specifically, the coating applicator forms a coating film using a wet deposition method.

The second unit 22 includes a first drying unit 22a and a second drying unit 22b. These drying units 22a and 22b are arranged such that the drying unit 22a is located upstream of the drying unit 22b, with reference to a flow direction of the substrate 11. At least one of the drying units 22a and 22b includes a drier, such as a heater or a blower. The drying unit 22a performs primary drying of the coating film formed on the substrate 11. On the other hand, the drying unit 22b performs secondary drying of the coating film. Details of the primary and secondary dryings will be described later.

The third unit includes an ionizing radiation applicator. The ionizing radiation applicator applies ionizing radiation to the coating film completed with the secondary drying.

The conveyor includes reels 31a and 31b and a motor (not shown).

The reel 31a is detachably mounted to a rotary shaft, not shown, such as the rotary shaft of the motor. The reel 31a reels out the substrate 11.

The reel 31b is detachably mounted to a rotary shaft, not shown, such as the rotary shaft of the motor. The reel 31b reels in the substrate 11 that has been treated.

The conveyor further includes guide rollers 33a and 33b that prevent deflection of the substrate 11 being conveyed.

The manufacturing apparatus 3 may include a controller (not shown). The controller is connected to the conveyor, the coating applicator, the drier and the ionizing radiation applicator. The controller controls these devices.

Manufacture of the antireflection film using the manufacturing apparatus 3 is performed by firstly forming the uneven distribution layer, followed by forming the low refractive index layer. Specific manufacturing method is provided below.

<Formation of Uneven Distribution Layer>

First, the transparent substrate 11 rolled up about the reel 31a is prepared.

The transparent substrate 11 is a film or a sheet that contains an organic polymer. For example, the transparent substrate 11 is a substrate that is usually used for an optical member, such as a display. Taking account of optical characteristics, such as transparency and optical refractive index, and further, taking account of various physical properties, such as impact resistance, heat resistance and durability, the transparent substrate 11 in use contains an organic polymer, e.g., a polyolefin series such as polyethylene or polypropylene; a polyester series such as polyethylene terephthalate or polyethylene naphthalate; a cellulose series such as triacetyl cellulose, diacetyl cellulose or cellophane; a polyamide series such as 6-nylon or 6,6-nylon; an acrylic series such as polymethylmethacrylate; polystyrene; polyvinyl chloride; polyimide; polyvinyl alcohol; polycarbonate; or ethylene-vinylalcohol. In particular, polyethylene terephthalate, triacetyl cellulose, polycarbonate or polymethylmethacrylate is favorable. Among them, triacetyl cellulose has a small birefringence index and good transparency and thus can be favorably used for a liquid crystal display.

As the transparent substrate 11, the one containing the organic polymer mentioned above and permitted to have an additional function may also be used. The additional function is given by adding a well-known additive, such as ultraviolet absorber, infrared ray absorber, plasticizer, lubricant, colorant, antioxidant and fire retardant, to the organic polymer. Further, the transparent substrate 11 may include a sole organic polymer selected from the ones mentioned above, or may include two or more organic polymers mixed with each other. Also, the transparent substrate 11 may be formed by laminating a plurality of layers.

Preferably, the transparent substrate 11 has a thickness ranging from 25 μm to 200 μm, more preferably, ranging from 40 μm to 80 μm.

Subsequently, the reel 31a is mounted to the rotary shaft and the substrate 11 is reeled out of the reel 31a. Then, one end of the reeled out substrate 11 is fixed to the reel 31b. Subsequently, the conveyor is activated to reel out the substrate 11 from the reel 31a, while the substrate 11 is reeled into the reel 31b.

[Coating Process]

The substrate 11 reeled out of the reel 31a is firstly conveyed to the first unit 21. Then, the coating applicator is activated to supply the uneven-distribution-layer-forming coating liquid to the substrate 11. For example, under the control of the controller, the coating applicator supplies the uneven-distribution-layer-forming coating liquid to thereby form a first coating film. For example, the first coating layer is preferably formed such that an uneven distribution layer having a thickness of 1 μm to 20 μm, preferably from 3 μm to 15 μm, typically from 4 μm to 10 μm will be obtained.

A coating method that can be used for applying the uneven-distribution-layer-forming coating liquid onto the transparent substrate may make use of a roll coater, reverse roll coater, gravure coater, micro-gravure coater, knife coater, bar coater, wire-bar coater, die coater or dip coater. The uneven distribution layer 12, which is a thin film, is required to have a uniform thickness. Accordingly, it is preferable to use a micro-gravure coater method or a die coater method.

The uneven-distribution-layer-forming coating liquid contains an ionizing-radiation-curable material, a quaternary ammonium salt material and a leveling material.

(Ionizing-Radiation-Curable Material)

For example, the ionizing-radiation-curable material is an acrylic material. The acrylic material that can be used may be a monofunctional or polyfunctional (meth)acrylate compound, such as an acrylic or methacrylate ester of a polyhydric alcohol, and polyfunctional urethane(meth)acrylate compounds that can be synthesized such as from diisocyanate and a polyhydric alcohol, and hydroxy ester of an acrylic acid or a methacrylic acid. Other than these, a polyether resin, a polyester resin, an epoxy resin, an alkyd resin, a spiroacetal resin, a polybutadiene resin and a polythiol-polyene resin having a functional group of an acrylate series may be used as the ionizing radiation material.

For example, the monofunctional (meth)acrylate compound includes 2-hydroxyethyl(meth)acrylate, 2-hydroxypropyl(meth)acrylate, 2-hydroxybutyl(meth)acrylate, n-butyl(meth)acrylate, isobutyl(meth)acrylate, t-butyl(meth)acrylate, glycidyl(meth)acrylate, acryloylmorpholin, N-vinylpyrrolidone, tetrahydrofurfuryl acrylate, cyclohexyl (meth)acrylate, 2-ethylhexyl(meth)acrylate, isobornyl (meth)acrylate, isodecyl(meth)acrylate, lauryl(meth)acrylate, tridecyl(meth)acrylate, cetyl(meth)acrylate, stearyl (meth)acrylate, benzyl(meth)acrylate, 2-ethoxyethyl(meth) acrylate, 3-methoxybutyl(meth)acrylate, ethyl carbitol (meth)acrylate, phosphate(meth)acrylate, ethylene-oxide-modified phosphate(meth)acrylate, phenoxy(meth)acrylate, ethylene-oxide-modified phenoxy(meth)acrylate, propylene-oxide-modified phenoxy(meth)acrylate, nonyl phenol (meth)acrylate, ethylene-oxide-modified nonyl phenol (meth)acrylate, propylene-oxide-modified nonyl phenol (meth)acrylate, methoxy diethylene glycol(meth)acrylate, methoxy polythylene glycol(meth)acrylate, methoxy propylene glycol(meth)acrylate, 2-(meth)acryloyl oxyethyl-2-hydroxy propyl phthalate, 2-hydroxy-3-phenoxy propyl (meth)acrylate, 2-(meth)acryloyl oxyethyl hydrogen phthalate, 2-(meth)acrtyloyl oxypropyl hydrogen phthalate, 2-(meth)acryloyl oxypropyl hexahydro hydrogen phthalate, 2-(meth)acrylol oxypropyl tetrahydro hydrogen phthalate, dimethylaminoethyl(meth)acrylate, trifluoroethyl(meth) acrylate, tetrafluoropropyl(meth)acrylate, hexafluoropropyl (meth)acrylate, octafluoropropyl(meth)acrylate, octafluoropropyl(meth)acrylate, and adamantine derivative mono (meth)acrylate, such as adamanthyl acrylate having monovalent mono(meth)acrylate which is derived from 2-adamantane and adamantine diol.

For example, the two-functional (meth)acrylate compound includes di(meth)acrylates, such as ethylene glycol di(meth)acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth) acrylate, tripropylene glycol di(meth)acrylate, and hydroxy pivalate neopentyl glycol di(meth)acrylate.

For example, the three-or-more functional (meth)acrylate compound includes tri(meth)acrylates, such as trimethylolpropane tri(meth)acrylate, ethoxylated trimethylolpropane tri(meth)acrylate, propoxylated trimethylolpropane tri (meth)acrylate, tris 2-hydroxyethyl isocyanurate tri(meth) acrylate and glycerin tri(meth)acrylate, three-functional (meth)acrylate compounds, such as pentaerythritol tri(meth) acrylate, dipentaerythritol tri(meth)acrylate and ditrimethylolpropane tri(meth)acrylate, polyfunctional (meth)acrylate compounds having three or more functional groups, such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate and ditrimethylolpropane hexa(meth)acrylate, and polyfunctional (meth)acrylate compounds in which a part of each of these (meth)acrylates is replaced by an alkyl group or ε-caprolactone.

A polyfunctional urethane acrylate may also be used as the acrylic material. The urethane acrylate can be obtained by reaction of a polyhydric alcohol, a polyhydric isocyanate and a hydroxyl-group-containing acrylate. Specifically, UA-306H, UA-306T, UA-3061 and the like manufactured by Kyoeisha Chemical Co., Ltd., UV-1700B, UV-6300B, UV-7600B, UV-7605B, UV-7640B, UV-7650B and the like manufactured by Nippon Synthetic Chemical Industry Co., Ltd., U-4HA, U-6HA, UA-100H, U-6LPA, U-15HA, UA-32P, U-324A and the like manufactured by Shin Nakamura Chemical Co., Ltd., Ebecryl-1290, Ebecryl-1290K, Ebecryl-5129 and the like manufactured by Dycel UCB Co., and UN-3220HA, UN-3220HB, UN-3220HC, UN-3220HS and the like manufactured by Negami Chemical Industrial Co., Ltd. can be used, although not limited to these.

Other than these, a polyether resin, a polyether resin, an epoxy resin, an alkyd resin, a spiroacetal resin, a polybutadiene resin, a polythiol polyene resin, and the like having a functional group of an acrylate series may be used as the ionizing radiation material.

(Quaternary Ammonium Salt Material)

As the quaternary ammonium salt material, an acrylic material that contains a quaternary ammonium salt material as a functional group within a molecule may be favorably used. However, the quaternary ammonium salt material not having an acryl group as a functional group within a molecule of the material may also be used. The quaternary ammonium salt material shows a $-N^+X^-$ structure and includes quaternary ammonium cations ($-N^+$) and anions ($X^-$) to permit the hard coating layer to exhibit electrical conductivity. In this case, $X^-$ includes $Cl^-$, $Br^-$, $I^-$, $F^-$, $HSO_4^-$, $SO_4^{2-}$, $NO_3^-$, $PO_4^{3-}$, $H_2PO_4^-$, $OH^-$ and the like.

Further, as the quaternary ammonium salt material, an acrylic material that contains quaternary ammonium salt as a functional group within a molecule may also be used. The acrylic material that contains quaternary ammonium salt as a functional group within a molecule includes polyfunctional (meth)acrylate compounds, such as an acrylic or methacrylate ester of a polyhydric alcohol that contains quaternary ammonium salt ($-N^+X^-$) as a functional group within a molecule, or polyfunctional urethane (meth)acrylate compounds that can be synthesized such as from diisocyanate and a polyhydric alcohol, and hydroxy ester of an acrylic acid or a methacrilic acid. Other than these, a polyether resin, a polyester resin, an epoxy resin, an alkyd resin, a spiroacetal resin, a polybutadiene resin, a polythiol polyene resin, and the like having a functional group of an acrylate series may be used as the ionizing radiation material.

It is preferable that the molecular weight of the quaternary ammonium salt material ranges from 2,000 to 80,000. By allowing the weight-average molecular weight of the quaternary ammonium salt material to fall within this range, the uneven distribution layer can be formed, in which the middle layer, the hard coating layer and the recoating layer are laminated in this order in a distributed manner from the transparent substrate side. If the molecular weight of the quaternary ammonium salt material is less than 2,000, the quaternary ammonium salt material tends to be unevenly distributed to the surface of the uneven distributed layer. Thus, the quaternary ammonium salt material would be present in the surface of the uneven distribution layer, disabling formation of the recoating layer. Therefore, the low-refractive-index-layer-forming material and the quaternary ammonium salt material may electrically repel each other, impairing the adhesiveness between the uneven distribution layer and the low refractive index layer to thereby impair abrasion resistance. On the other hand, if the weight-average molecular weight of the quaternary ammonium salt material exceeds 80,000, the quaternary ammonium salt material would be dispersed in the hard coating layer 12b. Accordingly, the quaternary ammonium salt material could not be unevenly distributed in a manner of gradually increasing its concentration. As a result, surface resistance may be impaired.

The content of the quaternary ammonium salt material in the uneven distribution layer is preferably from 0.5 parts by mass to 20 parts by mass. If the content of the quaternary ammonium salt material that is an electrically conductive material in the uneven distribution layer is less than 0.5, sufficient antistatic performance would not be necessarily obtained. On the other hand, if the content of the quaternary ammonium salt material that is an electrically conductive material in the uneven distribution layer exceeds 20 parts by mass, the recoating layer would not be necessarily formed well. Further, if the content of the quaternary ammonium salt material exceeds 20 parts by mass, the quaternary ammonium salt material would not be unevenly distributed in the uneven distribution layer. It should be appreciated that the content of the quaternary ammonium salt material in the uneven distribution layer is synonymous with the content of the quaternary ammonium salt material with respect to the solid matter in the uneven-distribution-layer-forming coating liquid.

(Leveling Material)

The leveling material is preferably selected from a group consisting of compounds having an acryl group, compounds having a fluorine group and compounds having a siloxane bond. These leveling materials tend to segregate toward the outermost surface and can easily form the recoating layer.

The compounds having an acryl group refer to an acrylic leveling material that contains an acryl group within a molecule. The compounds having an acryl group have a structure as shown in (Chem. 1) and exhibit low degree of activity and good recoating properties. In this case, $R_1$ may include H, $CH_3$ and $C_nH_{2n-1}$ (n=natural number). Further, as $R_2$, an alkyl group, a polyester group, a polyether group, a salt or a reactive group may be introduced.

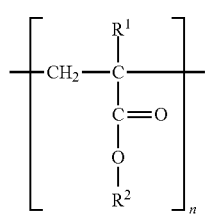
[Chem. 1]

The compounds having an acryl group may specifically include BYKO-350, BYK-352, BYK-354, BY-355, BYK-356, BYK-358N, BYK-361N, BYK-380, BYK-392 and BYK-394.

As the compounds having a fluorine group, compounds having a perfluoroalkyl group or a fluorinated alkenyl group may be favorably used. The perfluoroalkyl group has a structure of $—C_nF_{2n+1}$ (n=natural number) and functions as a hydrophobic/lipophobic group. Therefore, the perfluoroalkyl group has characteristics of being stiff and hardly bent and thus being arrayed in good order in a surface. Thus, use of only a small quantity of such a compound can exert the function, as a leveling material, of covering the surface. In this case, when combined with a lipophilic group, the effect as a leveling material can be further enhanced. Further, the perfluoroalkenyl group has a C═C bond within a molecule and therefore, when arrayed in a surface, lowers the density because of its large bulk, compared to the perfluoroalkyl group. Thus, recoating-properties-inhibition of the perfluoro group is suppressed.

Specifically, the compounds having a fluorine group include Ftergent 222F (manufactured by Neos Company Limited) having a fluorinated alkenyl group, and F470 (manufactured by DIC Corporation) and F489 (manufactured by DIC Corporation) having a perfluoroalkyl group. Other than these, V-8FM (manufactured by Osaka Organic Chemical Industry Ltd.) may also be used. The compounds having fluorine, i.e. the leveling material of the present invention, shall not be limited to these.

As the compounds having a siloxane bond, a silicon-based leveling agent having a siloxane bond and an organic modifier within a molecule may be favorably used. The compounds having a siloxane bond has a structure shown by (Chem. 2), in which the surface tension can be controlled as desired by changing the number of n or the organic modifier in the (Chem. 2).

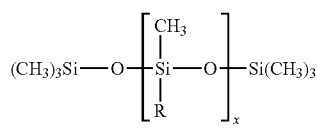
[Chem. 2]

As an example of changing the number of n or the organic modifier in the (Chem. 2) that is a compound having a siloxane bond, a compound having a siloxane bond with a structure as shown in (Chem. 3) may also be used. The siloxane bond can be modified by having a side chain. An example of $R_1$ in the structure of (Chem. 3) includes $CH_3$, $CH_2—CH_3$ and $(CH_2)_9CH_3$. An example of $R_2$ includes a polyether group, polyester group and aralkyl group. Compounds having a siloxane bond with a structure as shown in (Chem. 4) may also be used. The siloxane bond is made up of a Si—O—Si bond. As an example of $R_3$, an average of one polyether chain or the like may be used. In both of (Chem. 3) and (Chem. 4), control of surface tension or adjustment of compatibility can be conducted as desired.

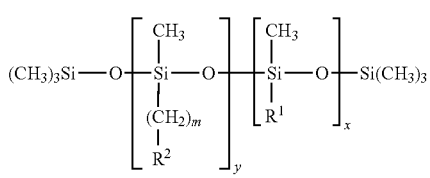
[Chem. 3]

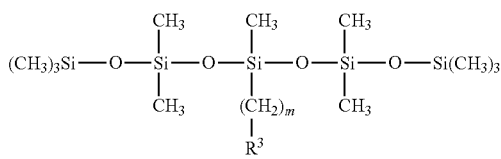
[Chem. 4]

Specifically, the compounds that have a siloxane bond and can be used may be BYK-300, BYK-306, BYK-307, BYK-310, BYK-315, BYK-322, BYK-323, BYK-325, BYK-330, BYK-331, BYK-333, BYK-337, BYK-341, BYK-344, BYK-345, BYK-347, BYK-348, BYK-349, BYK-370, BYK-375, BYK-377, BYK-378, BYK-UV3500, BYK-UV3510, BYK-UV3570, BYK-Silclean 3700 and BYK-Silclean 3720 which are manufactured by BYK Japan KK. Further, the compounds having a siloxane bond and can also be used may be TSF410, TSF411, TSF4700, TSF4701, XF42-B0970, TSF4730, YF3965, TSF4421, XF42-334, SF42-B3629, XF42-A3161, TSF4440, TSF4441, TSF4445, TSF4450, TSF4446, TSF4452 and TSF4460, which are manufactured by Momentive Performance Materials Inc. Furthermore, the compounds having a siloxane bond and can also be used may be POLYFLOW KL400X, POLYFLOW KL400HL, POLYFLOW KL401, POLYFLOW KL402, POLYFLOW KL403 and POLYFLOW KL404, which are manufactured by Kyoeisha Chemical Co., Ltd. The compounds having a siloxane bond, which are used as the leveling material, shall not be limited to these.

Further, the content of the leveling material in the uneven distribution layer preferably ranges from 0.001 parts by mass to 5.00 parts by mass. If the content of the leveling material in the uneven distribution layer is less than 0.001 parts by mass, the recoating layer would not be necessarily formed, but the quaternary ammonium salt material would be resultantly present in the outermost surface of the uneven distribution layer. Therefore, the abrasion resistance may be impaired, and further, formation of the low refractive index layer may be hampered. On the other hand, if the content of the leveling material exceeds 5.00 parts by mass, the recoating layer would have a large thickness and behave as an optical thin film. Therefore, the optical properties of the antireflection film may be impaired.

The molecular weight of the leveling material preferably ranges from 1,000 to 80,000. If the molecular weight of the leveling material is less than 1,000, the leveling material would bleed, thereby impairing the recoating properties. Accordingly, adhesion is impaired between the low refractive index layer and the uneven distribution layer. On the other hand, if the molecular weight of the leveling material exceeds 80,000, the leveling material cannot cover the surface and thus the leveling function would be impaired. Therefore, the quaternary ammonium salt material would be unevenly distributed in the surface.

(Solvent)

The uneven-distribution-layer-forming coating liquid further contains a solvent. The uneven-distribution-layer-forming coating liquid contains the solvent at a rate ranging from 25 parts by mass to 85 parts by mass. By allowing the amount of the solvent in the uneven-distribution-layer-forming coating liquid to fall in the above range, the quaternary ammonium salt material in the coating film will be unevenly distributed, thereby well ensuring the time for the formation of the hard coating layer in the uneven distribution layer and facilitating manufacture of the uneven distribution layer. If the amount of the solvent is less than 25 parts by mass, the coating film would be rapidly dried and therefore formation of the middle layer in the uneven distribution layer may tend to be difficult. In addition, the quaternary ammonium salt material would not be unevenly distributed in the uneven distribution layer and therefore it may be difficult to obtain desired antistatic performance. On the other hand, if the amount of the solvent exceeds 85 parts by mass, drying time would have to be prolonged, which is unfitted for mass production. Further, in this case, it would be difficult to form an uneven distribution layer having a desired surface hardness.

Further, the solvent contained in the uneven distribution layer include 30 parts by mass or more of a solvent that dissolves or swells the transparent substrate 11. As mentioned above, the solvent that dissolves or swells the transparent substrate infiltrate into the transparent substrate during the process of applying the uneven-distribution-layer-forming coating liquid onto the transparent substrate and forming a coating film, followed by drying. Accompanying this, the components of the binder-matrix-forming material also infiltrate into the transparent substrate and mix into the substrate to form the middle layer 12a. The amount of the solvent of this range contained in the coating liquid of the uneven distribution layer enables formation of the middle layer between the transparent substrate and the uneven distribution layer, the middle layer consisting of the components of the transparent substrate and the components of the binder matrix, and further enables efficient formation of the uneven distribution layer. If the solvent that dissolves or swells the transparent substrate are less than 30 parts by mass with respect to all solvents, the uneven distribution layer would not be necessarily formed. In this manner, the uneven distribution layer that includes the middle layer, the hard coating layer in which the quaternary ammonium salt material is unevenly distributed, and the recoating layer can be formed.

When a triacetyl cellulose film is used as the transparent substrate, the solvent for dissolving or swelling the transparent substrate include ethers, such as dibutyl ether, dimethoxymethane, dimethoxyethane, diethoxyethane, propylene oxide, dioxane, dioxolane, trioxane, tetrahydrofuran, anisole and phenetole, or a part of ketones, such as acetone, methyl ethyl ketone, diethyl ketone, dipropyl ketone, diisobutyl ketone, cyclopentanone, cyclohexanone, methylcyclohexanone and methylcyclohexanone, or esters, such as ethyl formate, propyl formate, n-pentyl formate, methyl acetate, ethyl acetate, methyl propionate, ethyl propionate, n-pentyl acetate and γ-butyrolactone, or further, cellosolves, such as methyl cellosolve, cellosolve, butyl cellosolve and cellosolve acetate, or beyond that, N-methyl-2-pyrolidone and dimethyl carbonate. These may be used solely or by combining two or more.

The solvent that does not dissolve or swell a triacetyl cellulose film include alcohols, such as ethanol and isopropyl alcohol, or aromatic hydrocarbons, such as toluene, xylen, cyclohexane and cyclohexylbenzene, or hydrocarbons, such as n-hexane, or a part of ketones, such as methyl isobutyl ketone, methyl butyl ketone and diacetone alcohol.

When the uneven-distribution-layer-forming coating liquid is cured by an ultraviolet beam, a photopolymerization initiator may be added to the uneven-distribution-layer-forming coating liquid. Further, additives, such as a surface adjuster, a refractive index adjuster, an adhesion improver or a curative may be added to the uneven-distribution-layer-forming coating liquid.

The photopolymerization initiator only has to generate radicals when an ultraviolet beam is applied, and thus acetophenones, benzoins, benzophenones, phosphine oxides, ketals, anthraquinones or thioxanthones may be used. Further, the amount of addition of the photopolymerization initiator preferably ranges from 0.1 parts by mass to 10 parts by mass, more preferably, from 1 part by mass to 8.5 parts by mass, with respect to the ionizing-radiation-curable material. It should be appreciated that the content of the leveling material in the uneven distribution layer is synonymous with the content of the leveling material with respect to the solid matter in the uneven-distribution-layer-forming coating liquid.

Such an uneven-distribution-layer-forming coating liquid is applied onto a transparent substrate using a wet deposition method to thereby form a coating film.

[Drying Process]

After forming the first coating film, the substrate 11 is conveyed to the second unit 22 by the conveyor. Description provided herein is based on that the drier includes a first drier and a second drier.

In the first drying unit 22a, the quaternary ammonium material in the coating film is unevenly distributed.

The substrate 11 that has been conveyed to the second unit 22 by the conveyor is dried by the first drier in the first drying unit 22a. By drying the first coating film, the solvent in the coating film are removed. As a drying means, heating, blowing, hot blasting or the like may be used.

First drying in the first drying unit 22a is preferably performed immediately after coating. The drying temperature preferably ranges from 15° C. to 30° C. By setting the first drying temperature to the range of not less than 15° C. to not more than 30° C., the time for the quaternary ammonium salt material and the leveling material to unevenly distribute in the first coating film can be well ensured. If the drying temperature exceeds 30° C. in the drying in the first drying unit 22a, the coating film of the uneven distribution layer would be rapidly dried, disabling formation of the layer structure of the uneven distribution layer described above. On the other hand, if the drying temperature is less than 15° C., the drying time would have to be prolonged, which is unfitted for series production.

The drying process is preferably performed in a solvent atmosphere corresponding to a solvent concentration ranging from 0.2 vol % to 10 vol %. By performing the drying process in a solvent atmosphere ranging from 0.2 vol % to 10 vol %, sufficient time is ensured for the quaternary ammonium salt material in the coating film to unevenly distribute and for the hard coating layer to be formed in the uneven distribution layer, thereby facilitating manufacture of the uneven distribution layer.

Preferably, the solvent used in the drying atmosphere include at least one of solvents contained in the uneven-distribution-layer-forming coating liquid. If the solvent concentration is less than 0.2 vol %, the coating film would be rapidly dried, disabling formation of the layer structure of the uneven distribution layer. On the other hand, if the solvent concentration exceeds 10 vol %, the drying time would have to be prolonged, which is unfitted for series production.

Subsequently, the substrate 11 is conveyed to the second drying unit 22b by the conveyor. The substrate 11 conveyed to the second drying unit 22b by the conveyor is dried by the second drier in the second drying unit 22b.

Drying in the second drying unit 22b is preferably performed at a drying temperature ranging from 40° C. to 150° C. By setting the secondary drying temperature to the range of 40° C. to 150° C., the uneven distribution layer can be formed, in which the middle layer, the hard coating layer and the recoating layer of uneven distribution are laminated in this order from the transparent substrate side. If the secondary drying temperature exceeds 150° C., the evaporation rate of the solvent would be so high that the surface of the uneven distribution layer would become rough and therefore haze may be caused. On the other hand, if the drying temperature is less than 40° C., the solvent would remain in the uneven distribution layer, leading to formation of an uneven distribution layer without having hard coating properties.

Thus, the two-stage successive drying performed within the above temperature ranges can facilitate manufacture of the uneven distribution layer 12. The primary drying alone may be insufficient for drying the coating film. Therefore, following the primary drying, further drying is performed as the secondary drying at a heating temperature that is a drying temperature ranging from 50° C. to 150° C. to thereby achieve appropriate heating and drying. Further, in the primary drying, the layers in the uneven distribution layer are isolated from each other and, by performing heating and drying in the secondary drying, the solvent is removed.

In the drying process, it is preferable that the time for the amount of the solvent contained in the coating film to be reduced to not more than 10 parts by mass ranges from 2 seconds to 60 seconds. When the time for the solvent contained in the coating film to be reduced to not more than 10 parts by mass falls within this range, time is well ensured for the quaternary ammonium salt material and the leveling material in the coating film to be unevenly distributed and to form an uneven distribution layer, enabling easy formation of the uneven distribution layer 12. If the time for the amount of the solvent contained in the coating film to be reduced to not more than 10 parts by mass is less than 2 seconds, the coating film would be rapidly dried, disabling formation of the hard coating layer in which a high refractive index material is unevenly distributed. If the time for the amount of the solvent contained in the coating film to be reduced to not more than 10 parts by mass exceeds 60 seconds, the time is exceedingly long and thus is not realistic. For example, in forming the uneven distribution layer using a sheeting method as well, the tact time is so long that the productivity would be impaired.

Using the drying process as described above, the material, chiefly, the leveling material, that forms the recoating layer moves toward the surface of the uneven distribution layer (the low refractive index side) by surface tension, for the formation of the recoating layer.

[Radiation Applying Process]

The dried substrate 11 is conveyed to the third unit 23 by the conveyor.

In the third unit 23, with the application of ionizing radiation, the coating film is cured to thereby obtain the uneven distribution layer.

For example, an ultraviolet beam or an electron beam may be used as the ionizing radiation. When an ultraviolet beam is used as the ionizing radiation, the light source that can be used may be a high-pressure mercury vapor lamp, low-pressure mercury vapor lamp, ultrahigh pressure mercury lamp, metal halide lamp, carbon arc or xenon arc. When an electron beam is used, the electron beam that can be used may be emitted from various electron beam accelerators, such as of Cockcroft-Walton type, Van de Graaff type, resonance transformer type, insulated core transformer type, linear type, dynamitron type, high-frequency type and the like. Preferably, the electron beam to be used has an energy of 50 to 1000 KeV, more preferably, an energy of 100 to 300 KeV.

<Formation of Low Refractive Index Layer>

Hereinafter is described a method of forming the low refractive index layer.

The low refractive index layer is formed after forming the uneven distribution layer. Excepting that the second drying unit 22b is not included, the low refractive index layer can be formed on the uneven distribution layer using a device similar to the one shown in FIG. 3. Alternatively, the low refractive index layer may be formed by using the device 3 shown in FIG. 3, with an additional provision of a fourth unit, a fifth unit and a sixth unit. The fourth unit, the fifth unit and the sixth unit correspond to the first unit, the second unit and the third unit, respectively. In this case, excepting that the fifth unit does not include the second drying unit 22b, the configuration of the device is similar to the one explained for the device 3. In this device, the conveyor conveys the substrate 11 so that, after formation of the uneven distribution layer, the substrate 11 will pass through the fourth unit, the fifth unit and the sixth unit in this order.

The method of forming the low refractive index layer is as follows. Description here is provided based on that the low refractive index layer is formed using a device which is similar to the one shown in FIG. 3 except that the second drying unit 22b is not included. References used for the components of the device are similar to those used in FIG. 3.

[Coating Process]

The substrate 11 formed with the uneven distribution layer is conveyed to the first unit 21 by the conveyor. Then, the coating applicator is activated to supply the low-refractive-index-layer-forming coating liquid to the substrate 11. For example, under the control of the controller, the coating applicator supplies the low-refractive-index-layer-forming coating liquid to the substrate 11 to form a second coating film. The second coating film is applied so that an optical thickness (nd) obtained by multiplying a refractive index (n) of the low refractive index layer with its thickness (d) will be equal to ¼ of a visible light wavelength. For example, the second coating film is formed so that the low refractive index layer to be obtained will have a thickness of 50 nm to 250 nm, typically, 80 nm to 200 nm.

For example, the coating method of applying the low-refractive-index-layer-forming coating liquid onto the uneven distribution layer includes a roll coater, reverse roll coater, gravure coater, micro-gravure coater, knife coater, bar coater, wire-bar coater, die coater or dip coater. Since the low refractive index layer 13 is required to be thinly coated so as to have a uniform thickness, it is preferable to use a micro-gravure coater as the coating method.

The low-refractive-index-layer-forming coating liquid contains low refractive particles and a binder-matrix-forming material. When the binder-matrix-forming material has a low refractive index, the low-refractive-index-layer-forming coating liquid does not have to contain the low refractive particles. As the binder-matrix-forming material, an ionizing-radiation-curable material and/or a thermosetting material may be used.

As the ionizing-radiation-curable material, an acrylic material may be used. The acrylic material that can be used may be monofunctional or polyfunctional (meth)acrylate compounds, such as an acrylic or methacrylate ester of a polyhydric alcohol, or polyfunctional urethane(meth)acrylate compounds that can be synthesized such as from diisocyanate and a polyhydric alcohol, and hydroxy ester of an acrylic acid or a methacrilic acid. Other than these, a polyether resin, a polyester resin, an epoxy resin, an alkyd resin, a spiroacetal resin, a polybutadiene resin, a polythiol polyene resin, and the like having a functional group of an acrylate series may be used as the ionizing radiation material.

For example, the monofunctional (meth)acrylate compounds that can be used may be the compounds similar to those explained regarding the ionizing-radiation-curable material of the uneven-distribution-layer-forming coating liquid. For example, the two-functional (meth)acrylate compounds that can be used may be the compounds similar to those explained regarding the ionizing-radiation-curable material of the uneven-distribution-layer-forming coating liquid. The three-or-more functional (meth)acrylate compounds that can be used may be the compounds similar to those explained regarding the ionizing-radiation-curable material of the uneven-distribution-layer-forming coating liquid.

Among the acrylic materials, the polyfunctional urethane acrylate is favorably used, for the reasons that a desired molecular weight and molecular structure can be designed and that the physical properties of the hard coating layer to be formed can be easily balanced. The urethane acrylate can be obtained by having a polyhydric alcohol, a polyisocyanate and a hydroxyl-group-containing acrylate reacted with each other.

The low refractive particles contain a low refractive material. For example, the low refractive particles that can be used may be LiF MgF, 3NaF.AlF or AlF (all having a refractive index of 1.40), or $Na_3AlF6$ (cryolite, refractive index of 1.33). Preferably, particles having a void within a particle can be preferably used as the low refractive particles. The particles having a void within a particle have a refractive index of air ($\approx$1) in a portion of the void and therefore can serve as low refractive particles having a very low refractive index. Specifically, low-refractive silica particles having a void in a particle may be used. As the low-refractive silica particles having a void in a particle, porous silica particles or shell-structured silica particles may be used.

For example, the following particles may be used as the low-refractive silica particles having a void in a particle. Specifically, such a particle has a structure in which the refractive index is 1.35 that is lower than the refractive index of 1.45 of glass, with a spherical shape being retained, a spherical structure with a radius of not less than 20 nm and not more than 25 nm and with a density of ($\rho$1) resides in the center portion, a layer having a thickness of not less than 10 nm and not more than 15 nm with a different density of ($\rho$2) covers the spherical structure, the value of ($\rho$1/$\rho$2) is 0.5, 0.1 or 0.0, and the center portion of the low-refractive silica particle has a density of about ⅒ of the external silica.

Preferably, the low-refractive particles have a particle size ranging from 1 nm to 100 nm. If the particle size exceeds 100 nm, light would be markedly reflected due to Rayleigh scattering, and the low refractive index layer would be whitened, tending to impair the transparency of the antireflection film. On the other hand, if the particle size is less than 1 nm, the particles would be agglomerated, raising a problem such as of non-uniformity of the particles in the low refractive index layer.

The binder-matrix-forming material may further contain a thermoplastic resin. The thermoplastic resin that can be used may be cellulose derivatives, such as acetyl cellulose, nitrocellulose, acetyl butyl cellulose, ethyl cellulose and methyl cellulose, or vinyl resins, such as vinyl acetate and its copolymers, vinyl chloride and its copolymers, and vinylidene chloride and its copolymers, or acetal resins, such as polyvinyl formal and polyvinyl butyral, or acrylic resins, such as an acryl resin and its copolymers, and a methacryl resin and its copolymers, or polystyrene resins, or polyamide resins, or linear polyester resins, or polycarbonate resins. Adding a thermoplastic resin, the manufactured film can be suppressed from being curled.

Further, as the binder-matrix-forming material, a hydrolysate of a silicon alkoxide that is a thermosetting material may also be used. Specifically, a hydrolysate of silicon alkoxide as expressed by the following General Formula (B) may be used.

$$R_xSi(OR)_{4-x} \qquad \text{General Formula (B):}$$

(In the formula, R indicates an alkyl group and x is an integer that satisfies 0≤x≤3.)

For example, the silicon alkoxide expressed by General Formula (B) and can be used may be tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-proxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane. The hydrolysate of a silicon alkoxide may be obtained by using the metal alkoxide expressed by General Formula (B) as a raw material, for example, can be obtained by hydrolysis using hydrochloric acid.

When using the hydrolysate of a silicon alkoxide, i.e. a thermosetting material, as the binder-matrix-forming material, a hydrolysate of a silicon alkoxide, i.e. a fluorine compound expressed by the following General Formula (C), may further be contained as a water-repellent material.

$$R'_zSi(OR)_{4-z} \qquad \text{General Formula (C):}$$

(In the formula, R' indicates a nonresponsive functional group having an alkyl group, a fluoroalkyl group or a fluoroalkylene oxide group, and z is an integer that satisfies $1 \leq z \leq 3$.)

By using the hydrolysate of a silicon alkoxide expressed by General Formula (C), antifouling properties can be given to the surface of the low refractive index layer of the antireflection film. Further, the refractive index of the low refractive index layer can further be lowered. For example, the silicon alkoxide may be octadecyltrimethoxysilane and 1H,1H,2H,2H-perfluorooctyltrimethoxysilane.

When the low refractive index layer is formed by performing curing with the application of an ultraviolet beam, the binder-matrix-forming material may contain a photopolymerization initiator. The photopolymerization initiator may only have to generate radicals upon application of an ultraviolet beam. For example, the photopolymerization initiator that can be used may be acetophenones, benzoins, benzophenones, phosphine oxides, ketals, anthraquinones and thioxanthones. Further, the amount of addition of the photopolymerization initiator preferably ranges from 0.1 parts by mass to 10 parts by mass, more preferably from 1 part by mass to 8.5 parts by mass, with respect to the ionizing-radiation-curable material.

The low-refractive-index-layer-forming coating liquid may further contain a water-repellent material. The water-repellent material hardly allows the stain such as of fingerprint to attach to the surface of the antireflection film and enables easy-wipe of the attached stain. The water-repellent material that can be used may be silicone-based materials, organic silicon compounds and UV-curable water-repellent agents. The silicone-based materials that can be used may be alkylaralkyl-modified silicone oil, alkyl-modified silicone oil, polyether-modified silicone oil and alkyl-polyether-modified silicone oil. Further, organic silicon compounds without containing fluorine and without having a (meth) acryl group may also be used. Specifically, the organic silicon compounds that can be used may be alkylalkoxysilane compounds, silane-siloxane compounds, silane compounds containing a polyester group, and silane compounds or siloxane compounds having a polyether group. The water-repellent agents that can be used may be BYK-350 and BYK-3500 (manufactured by BYK Japan KK) and F470 (manufactured by DIC Corporation).

Further, the low-refractive-index-layer-forming coating liquid may further contain a surface adjuster, a refractive index adjuster, an adhesion improver or a curative.

The low-refractive-index-layer-forming coating liquid contains a solvent. Taking account of coating adequacy, the solvent is appropriately selected from aromatic hydrocarbons, such as toluene, xylen, cyclohexane and cyclohexylbenzene, or hydrocarbons, such as n-hexane, or ethers, such as dibutylether, dimethoxymethane, dimethoxyethane, dietoxyethane, propylene oxide, dioxane, dioxolane, trioxane, tetrahydrofuran, anisole and phenetole, or ketones, such as methyl isobutyl ketone, methyl butyl ketone, acetone, methyl ethyl ketone, diethyl ketone, dipropyl ketone, diisobutyl ketone, cyclopentanone, cyclohexanone, methylcyclohexanone and methylcyclohexanone, or esters, such as ethyl formate, propyl formate, n-pentyl formate, methyl acetate, ethyl acetate, methyl propionate, ethyl propionate, n-pentyl acetate and γ-ptilo lactone, or further, cellosolves, such as methyl cellosolve, cellosolve, butyl cellosolve and cellosolve acetate, or alcohols, such as methanol, ethanol and isopropyl alcohol, or water.

The low-refractive-index-layer-forming coating liquid obtained by adjusting the above materials is applied onto the uneven distribution layer 12 using a wet deposition method to form a coating film of the low refractive index layer, thereby forming the low refractive index layer 13.

[Drying Process]

After forming the second coating film, the substrate 11 is conveyed to the second unit 22 by the conveyor.

The substrate 11 that has been conveyed to the second unit 22 by the conveyor is dried by the drier in the second unit 22.

By drying the second coating film, the solvent in the coating film is removed. As a drying means, heating, blowing, hot blasting or the like may be used. The drying temperature preferably ranges from 50° C. to 150° C.

[Radiation Applying Process]

The dried substrate 11 is conveyed to the third unit 23 by the conveyor.

In the third unit 23, ionizing radiation is applied to the coating film to cure the coating film, thereby forming the low refractive index layer 13. Description here is based on the case where an ionizing-radiation-curable material is used as the low refractive index layer-forming material. However, when a thermosetting material is used as the low-refractive-index-layer-forming material, the thermosetting material can be cured by heating.

For example, as the ionizing radiation, an ultraviolet beam or an electron beam may be used. When an ultraviolet beam is used as the ionizing radiation, the light source that can be used may be a high-pressure mercury vapor lamp, low-pressure mercury vapor lamp, ultrahigh pressure mercury lamp, metal halide lamp, carbon arc or xenon arc. When an electron beam is used, the electron beam that can be used may be emitted from various electron beam accelerators such as of Cockcroft-Walton type, Van de Graaff type, resonance transformer type, insulated core transformer type, linear type, dynamitron type, high-frequency type and the like. Preferably, the electron beam has an energy of 50 to 1000 KeV, more preferably, an energy of 100 to 300 KeV.

The antireflection film according to the present embodiment is continuously formed using a roll-to-roll method. Similar to the case of the uneven distribution layer, as shown in FIG. 3, the web-like transparent substrate, which is being reeled in, is permitted to uninterruptedly run from the reel 31a to the reel 31b and pass through the first unit 21, the second unit 22 and the third unit 23. Thus, the low refractive index layer is formed on the uneven distribution layer, thereby manufacturing the antireflection film.

In this way, the antireflection film is obtained.

With the blending of the quaternary ammonium salt material, the antireflection film of the present embodiment is imparted with antistatic properties. Compared to the ionizing-radiation-curable material that is the binder-matrix-forming material, the quaternary ammonium salt material easily segregates toward the surface. Further, compared to the quaternary ammonium salt material and the ionizing-radiation-curable material, the leveling material easily segregates toward the surface. By controlling conditions, such as drying temperature and drying time in forming the uneven distribution layer, the quaternary ammonium salt can be unevenly distributed. Thus, the uneven distribution layer can be formed, which includes the middle layer, the hard coating layer and the recoating layer isolated from each other. With such a configuration of the uneven distribution layer, the adhesion and the steel wool resistance (abrasion resistance) of the hard coating layer are enhanced, compared to the case where, for example, there is no concentration difference, or the quaternary ammonium salt material is present only on the low refractive index layer side. Further, when the composition of a resin drastically changes in the uneven distribution layer, an interface is generated to impair the adhesion and the steel wool resistance (abrasion resistance). However, the gradual change of concentration in the quaternary ammonium salt material can prevent the generation of an interface.

Also, applying the uneven-distribution-layer-forming coating liquid, the middle layer 12a, the hard coating layer 12b and the recoating layer 12c can be concurrently formed. Accordingly, compared to the case where a hard coating layer and an antistatic layer are sequentially coated on the transparent substrate 11, manufacturing cost can be reduced.

Further, the recoating layer 12c is provided on the hard coating layer 12b and, further, the low refractive index layer 13 is formed on the recoating layer 12c to enhance the adhesion therebetween and prevent the abrasion resistance from being impaired. Also, formation of the recoating layer 12c can suppress surface roughness and prevent blushing. Such an antireflection film also has excellent optical characteristics.

Second Embodiment

Hereinafter, a second embodiment of the present invention is described.
<<Antireflection Film>>
The antireflection film related to the second embodiment has a configuration similar to that of the antireflection film of the first embodiment described referring to FIG. 1. The following description is provided using the same references as those used in the first embodiment.

The refractive index of the uneven distribution layer 12 is lower than the refractive index of the low refractive index layer 13. Specifically, the refractive index of the low refractive index layer 13 is lower than the refractive index of the hard coating layer 12b, which will be described later, of the uneven distribution layer 12. For example, the refractive index here is measured at a wavelength of 550 nm.
<Uneven Distribution Layer>
For the uneven distribution layer 12, the materials similar to those described in the first embodiment are used, except that metal oxide particles are used instead of the quaternary ammonium salt material. In other words, the uneven distribution layer 12 is obtained from an ionizing-radiation-curable material, metal oxide microparticles, a leveling material and a solvent.

For example, the uneven distribution layer 12 is obtained by applying ionizing radiation to an uneven-distribution-layer-forming coating liquid that contains these materials, followed by curing. The ionizing-radiation-curable material is cured with the application of the ionizing radiation to thereby form a binder matrix. The binder matrix formed in this way can give a high surface hardness to the antireflection film.

For example, the uneven distribution layer may have a thickness that falls within the range described in the first embodiment.

The uneven distribution layer has a configuration similar to that described in the first embodiment. In other words, the uneven distribution layer includes the middle layer 12a, the hard coating layer 12b and the recoating layer 12c. The middle layer 12a, the hard coating layer 12b and the recoating layer 12c are laminated in this order from the transparent substrate 11 side.

For example, the uneven distribution layer is formed from an uneven-distribution-layer-forming coating liquid that contains, as described above, an ionizing-radiation-curable material, metal oxide microparticles, a leveling material and a solvent. This coating liquid is applied to form a coating film, followed by drying. Then, the dried coating film is cured to form the uneven distribution layer.

In forming the uneven distribution layer in this way, the solvent contained in the coating liquid dissolve or swell the transparent substrate 11 and infiltrates into the transparent substrate 11 during the period when the coating film is formed and then dried. Accompanying this, the components of the binder-matrix-forming material also infiltrate into the transparent substrate 11 for mixing with the components that configure the substrate. Thus, the middle layer 12a is formed. On the other hand, the metal oxide microparticles, which hardly infiltrate into the transparent substrate 11, segregate toward a side opposite to the transparent substrate side to form the hard coating layer 12b. In this case, the metal oxide microparticles are unevenly distributed in the hard coating layer 12b. For example, the metal oxide microparticles are unevenly distributed such that, due to surface tension, the proportion of their volume in a unit volume of the hard coating layer is high on the low refractive index layer side, and the proportion of their volume in a unit volume of the hard coating layer is low on the transparent substrate side. In this case, the metal oxide microparticles may be unevenly distributed in the hard coating layer 12b on the recoating layer side, and a difference is not necessarily required to be made between the refractive index of the middle layer 12a and the refractive index of the hard coating layer 12b on the middle layer 12a side. Preferably, the metal oxide microparticles are unevenly distributed such that the proportion of their volume in a unit volume of the hard coating layer becomes higher in a direction from the middle layer side toward the recoating layer side. Due to surface tension, the leveling material moves to the outermost surface (the side on which the low refractive index layer is formed) to form the recoating layer 12c. In this way, the middle layer 12, the hard coating layer 12b and the recoating layer 12c having a mutually different layer configuration are formed. The layer configurations of these layers are isolated from each other.

The presence of the metal oxide microparticles in the uneven distribution layer 12 can be confirmed by performing EPMA with respect to a cross section of the uneven distribution layer.

The EPMA may be performed by using one of an energy-dispersive X-ray fluorescence analyzer (EDX) or a wavelength-dispersive X-ray fluorescence analyzer (WDX).

In the EPMA analysis of the cross section, the concentration is measured of elements which are peculiar to the metal oxide microparticles contained in the uneven distribution layer. For example, when antimony-doped tin oxide (hereinafter referred to as ATO) is used as the metal oxide microparticles, the concentration of Sb (antimony) or Sn (tin) is measured, as the elements peculiar to the metal oxide microparticles.

Also, for example, when PTO is used as the metal oxide microparticles, or when phosphorus-doped tin (hereinafter referred to as PTO) is used as the elements peculiar to the metal oxide microparticles, the concentration of P (phosphorus) or Sn (tin) is measured.

Hereinafter is described a method of confirming the distribution of the metal oxide microparticles when ATO is used as the metal oxide microparticles.

FIG. 2 is a diagram illustrating measurement positions in the EPMA analysis.

The distribution of the metal oxide microparticles can be confirmed by performing an EDX analysis at three positions Y1, Y2 and Y3 in the depth direction shown in FIG. 2, in a processed cross section of the uneven distribution layer of the antireflection film. Y1, Y2 and Y3 are similar to those described in the first embodiment. When the amount of detection of a targeted element is not more than 0.1 atomic % in the EPMA analysis, the element is regarded not to be detectable.

Hereinafter is described the layers, i.e. the middle layer, the hard coating layer and the recoating layer, included in the uneven distribution layer 12.

(Middle Layer)

The middle layer 12a resides in the interface between the transparent substrate 11 and the uneven distribution layer 12. In the middle layer 12a, the components of the transparent substrate and the components of the ionizing-radiation-curable material are mixed.

The middle layer 12a can be formed from the uneven-distribution-layer-forming coating liquid.

The refractive index of the middle layer is similar to that described in the first embodiment. Further, the presence of the middle layer 12a can be confirmed through a method similar to the one described in the first embodiment.

(Hard Coating Layer)

As shown in FIG. 1, the hard coating layer 12b is formed on the middle layer 12a.

The hard coating layer 12b contains the ionizing-radiation-curable material and the metal oxide microparticles. Such a hard coating layer 12b enhances the surface hardness of the antireflection film and gives abrasion resistance to the antireflection film. With the blending of the metal oxide microparticles, the antireflection film is imparted with antistatic properties. The hard coating layer 12b further contains the leveling material. The hard coating layer 12b can be formed from the uneven-distribution-layer-forming coating liquid.

Compared to the ionizing-radiation-curable material, a metal oxide has a high refractive index. Uneven distribution of such metal oxide microparticles in the hard coating layer 12b raises the refractive index compared to the case where no metal oxide microparticles are added. Therefore, when the antireflection film is manufactured with the provision of the low refractive index layer on the hard coating layer 12b, the surface reflectance can be lowered.

Preferably, in the hard coating layer 12b, the proportion of the volume of the metal oxide microparticles in a unit volume of the hard coating layer becomes high in a direction from the middle layer 12a toward the surface of the uneven distribution layer (the low refractive index side).

Further, the uneven distribution of the metal oxide microparticles can also give antistatic properties to the antireflection film. When an antireflection film is prepared with the uneven distribution of the metal oxide microparticles, the surface reflectance can be lowered. In addition, when the antireflection film is used as an outermost surface film of a display, dust is prevented from attaching thereto. The provision of the antistatic performance can be judged on the basis of the surface resistance of the antireflection film.

Figure 4:
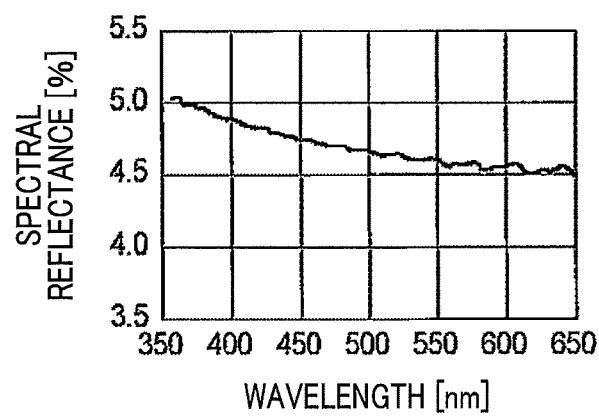
FIG. 4 is a diagram showing spectral reflectance on the surface of an uneven distribution layer of Example D1.
Figure 5:
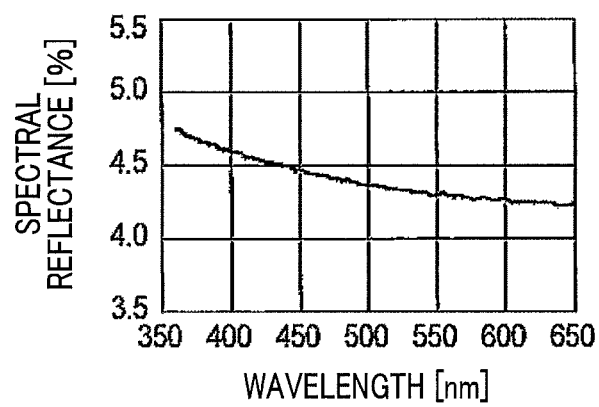
FIG. 5 is a diagram showing spectral reflectance on the surface of an uneven distribution layer of Example D16.
Figure 6:
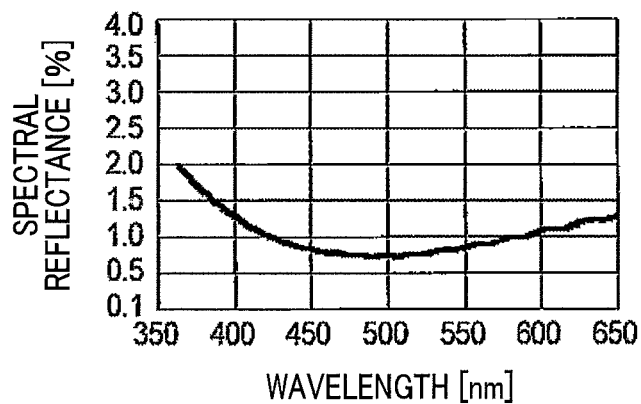
FIG. 6 is a diagram showing spectral reflectance on the surface of a low refractive index layer of Example D1.
Figure 7:
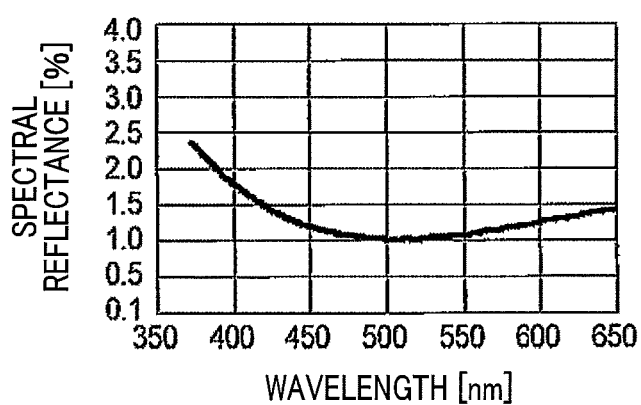
FIG. 7 is a diagram showing spectral reflectance on the surface of a low refractive index layer of Example D16.
Figure 8:
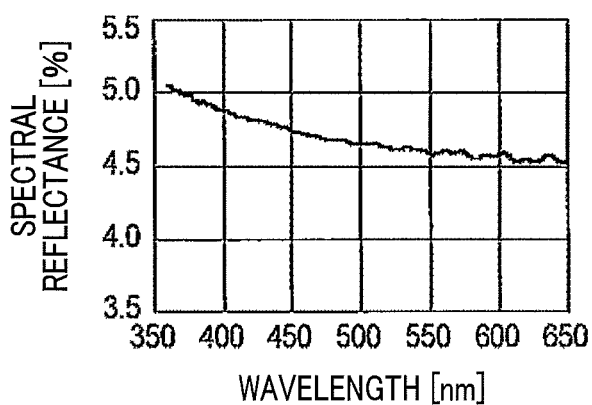
FIG. 8 is a diagram showing spectral reflectance on the surface of an uneven distribution layer of Example E1.
Figure 9:
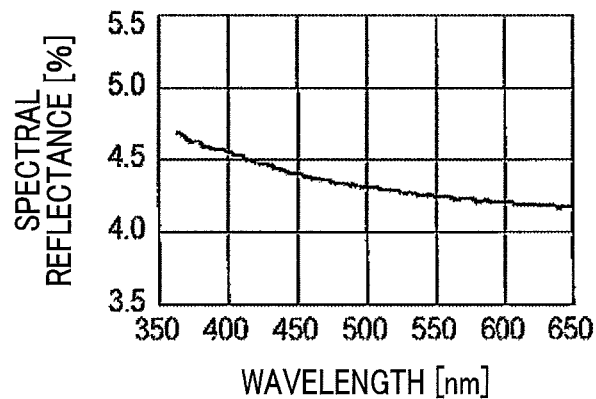
FIG. 9 is a diagram showing spectral reflectance on the surface of an uneven distribution layer of Example E17.
Figure 10:
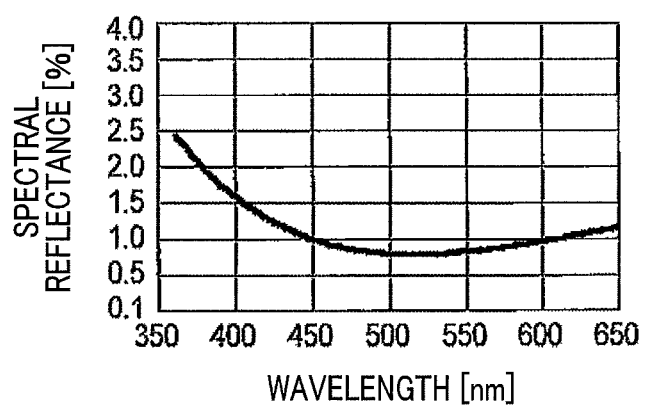
FIG. 10 is a diagram showing spectral reflectance on the surface of a low refractive index layer of Example E1.
Figure 11:
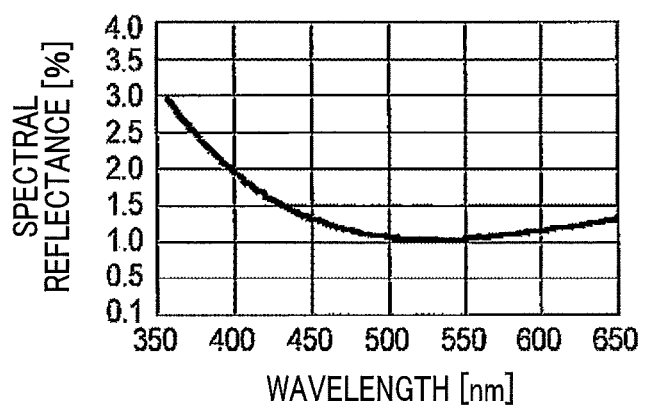
FIG. 11 is a diagram showing spectral reflectance on the surface of a low refractive index layer of Example E17.
Figure 12:
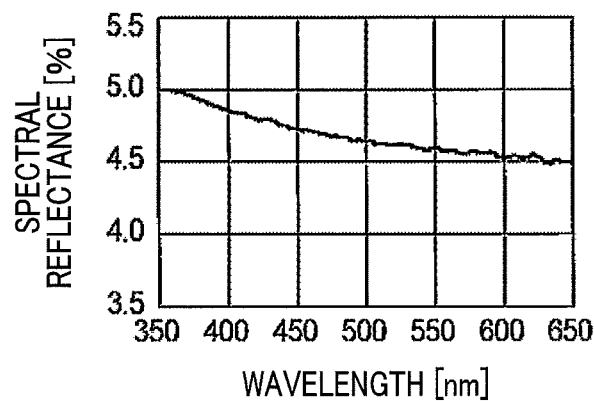
FIG. 12 is a diagram showing spectral reflectance on the surface of an uneven distribution layer of Example F1.
Figure 13:
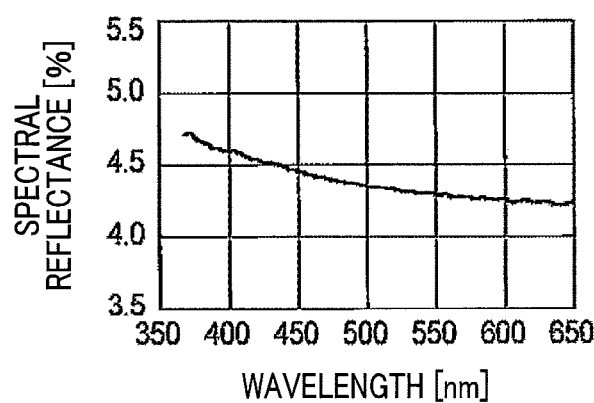
FIG. 13 is a diagram showing spectral reflectance on the surface of an uneven distribution layer of Example F16.
Figure 14:
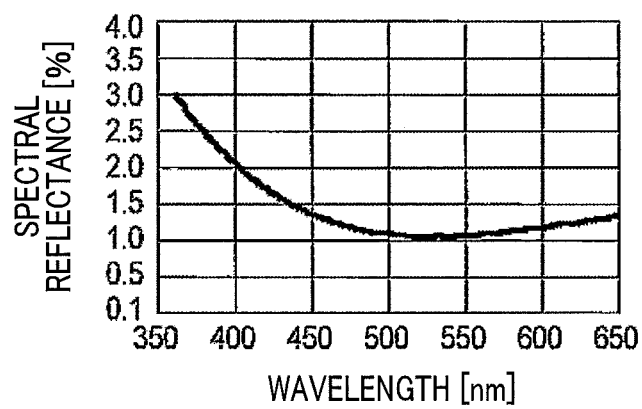
FIG. 14 is a diagram showing spectral reflectance on the surface of a low refractive index layer of Example F1.
Figure 15:
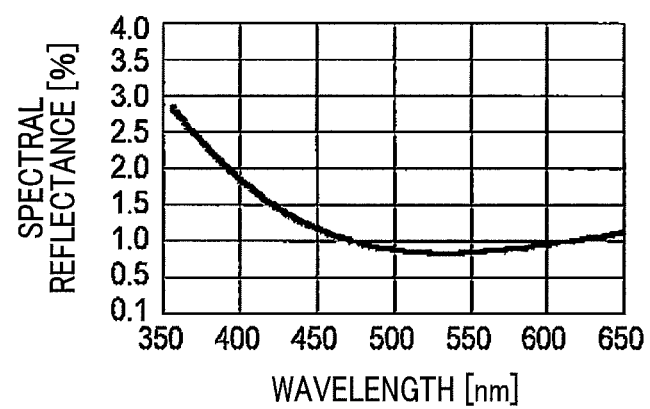
FIG. 15 is a diagram showing spectral reflectance on the surface of a low refractive index layer of Example F16.

FIGS. 4, 8 and 12 each show the surface reflectance of the uneven distribution layer of the antireflection film according to the present embodiment.

The figures show that the waveform of reflectance does not have ripples throughout the measuring wavelength range but that the reflectance continuously changes through the substrate, the middle layer and the hard coating layer. Further, the figures show that the addition of the metal oxide microparticles raises the refractive index in the surface of the uneven distribution layer.

The hard coating layer 12b preferably has a thickness of not less than 1 μm. If the hard coating layer is less than 1 μm thick, hard coating properties would not be necessarily given.

(Recoating Layer)

As shown in FIG. 1, the recording layer 12c is formed on the hard coating layer 12b. For example, the recording layer contains the leveling material. The recoating layer typically contains the ionizing-radiation-curable resin and the leveling material. The recoating layer 12c does not contain the metal oxide microparticles.

The recoating layer 12c can be formed from the uneven-distribution-layer-forming coating liquid.

If the antireflection film does not include the recoating layer, the low refractive index layer would be separated and the abrasion resistance would be impaired. This is considered to be because the metal oxide microparticles unevenly distributed in the outermost surface (on the low refractive index layer side) of the uneven distribution layer electrically repel the material that forms the low refractive index layer and the adhesion between the uneven distribution layer and the low refractive index layer is impaired.

If electrical repulsion is stronger between the material that forms the low refractive index layer and the metal oxide microparticles, a problem such as cissing may be caused in applying the low-refractive-index-layer-forming coating liquid. Further, if the material that forms the low refractive index layer contains a water-repellent material, the metal oxide microparticles and the water-repellent material may electrically repel each other and therefore desired antifouling performance would not be necessarily obtained.

As described above, the recoating layer 12c is provided on the hard coating layer 12b and further the low refractive index layer 13 is formed on the recoating layer 12c, thereby enhancing adhesion therebetween and preventing abrasion resistance from being impaired. Further, the formation of the recoating layer 12c can achieve a uniform drying rate, suppress surface roughness and prevent blushing. The occurrence of blushing can be continued by measuring a haze value of the antireflection film. Specifically, when the haze value of the antireflection film is not less than 0.5%, it is determined that blushing has occurred. Since the material that forms the recoating layer also has leveling properties, formation of surface asperities can be suppressed and occurrence of haze can be prevented. Formation of surface asperities can be confirmed on the basis of the haze value of the antireflection film or by measuring the surface using an AFM.

Whether the recoating layer 12c is formed on the outermost layer of the uneven distribution layer 12 can be confirmed using a method similar to the one described in the first embodiment. Specifically, formation of the recoating layer 12c can be confirmed by measuring the pure-water contact angle in the surface of the uneven distribution layer.

Further, formation of the recoating layer 12c on the outermost layer in the uneven distribution layer 12 can also be confirmed through a surface analysis using an X-ray photoelectron spectrometer (XPS) explained in the first embodiment. Specifically, when the elements derived from the metal oxide microparticles are not detected as a result of an XPS analysis of the surface of the uneven distribution layer, it is determined that the recoating layer has been formed. For example, when ATO is used as the metal oxide microparticles, the elements derived from the metal oxide microparticles are tin and antimony, and when PTO is used as the metal oxide microparticles, the elements to be derived are phosphorus and tin.

The layer configuration in the uneven distribution layer, i.e. the configuration in which the substrate, the middle layer, the hard coating layer and the recoating layer are isolated from each other, can also be confirmed by observing a cross section of the uneven distribution layer using a scanning electron microscope (SEM) or a transmission electron microscope (TEM). Since no metal oxide microparticles can be observed in the middle layer and since the hard coating layer contains the metal oxide microparticles, the presence of a boundary can be observed. Further, in this case, the state of uneven distribution of the metal oxide microparticles can simultaneously be observed.

<Low Refractive Index Layer>

As shown in FIG. 1, the low refractive index layer 13 is provided on the uneven distribution layer 12.

The low refractive index layer 13 is obtained from the ionizing-radiation-curable material that is a binder-matrix-forming material and low refractive particles. For example, the low refractive index layer 13 is obtained by applying ionizing radiation to the low-refractive-index-layer-forming coating liquid that contains these materials, followed by curing. When the ionizing-radiation-curable material has a low refractive index, the low-refractive-index-layer-forming coating liquid does not necessarily have to contain low refractive particles.

The thickness of the low refractive index layer 13 may be the same as that explained in the first embodiment. Preferably, the optical thickness of the low refractive index layer ranges from 80 nm to 200 nm. When the low refractive index layer has an optical thickness that falls within this range, the spectral reflectance curve obtained from the surface side of the antireflection film, i.e. from the side of the arrow A shown in FIGS. 1 and 2, will have a minimum value in the vicinity of 500 nm.

In the spectral reflectance curve, the ascending curve in a short-wavelength direction with reference to the minimum value tends to be steep compared to the ascending curve in a long-wavelength direction. In this case, the steep ascending curve in the short-wavelength direction with reference to the minimum value of the spectral reflectance curve becomes the cause of color of the reflected light of the antireflection film to be formed, and also becomes the cause of color variations in the occurrence of thickness variations in the uneven distribution layer. When the minimum value of the spectral reflectance curve is in the vicinity of 500 nm, the reflected hue can be mitigated, and thus the occurrence of color variations due to the steep ascending curve in the short-wavelength direction can be suppressed.

If an average luminous reflectance in a low-refractive-index-layer-forming plane (surface (A)) of the antireflection film exceeds 2.5%, the antireflection performance of the antireflection film would not be sufficient. On the other hand, it is difficult to realize an antireflection film whose average luminous reflectance in the surface thereof is 0.2%, by use of optical interference of the uneven distribution layer. It is preferable that the average luminous reflectance in the surface of the low refractive index layer ranges from 0.2% to 2.0%. For example, the antireflection film of the present embodiment has a parallel light transmittance of 93% or more, a haze of 0.5% or less, a surface resistance ranging from $1\times10^5$ $\Omega/cm^2$ to $1\times10^{12}$ $\Omega/cm^2$ in the surface of the low refractive index layer, and a pure-water contact angle ranging from 80° to 140° in the surface of the low refractive index layer of the antireflection film.

The properties of the antireflection film, i.e. the parallel light transmittance, haze, surface resistance and pure-water contact angle, are similar to those described in the first embodiment.

As methods of measuring these properties, the methods similar to those described in the first embodiment, for example, may be used.

<<Method of Manufacturing Antireflection Film>>

Subsequently, hereinafter is described a method of manufacturing the antireflection film of the present embodiment.

The antireflection film of the present embodiment can be manufactured using a method similar to the one described in the first embodiment, excepting the use of the uneven-distribution-layer-forming coating liquid that contains metal oxide microparticles instead of the quaternary ammonium salt material.

For example, the antireflection film can be manufactured using the device shown in FIG. 3.

Hereinafter is specifically described the method of manufacturing the antireflection film of the present embodiment.

<Formation of Uneven Distribution Layer>

First, the transparent substrate 11 rolled up about the reel 31*a* is prepared. The transparent substrate 11 used here may be the same as the one explained in the first embodiment. The thickness of the transparent substrate 11 may be the same range as the one explained in the first embodiment.

Then, the reel 31*a* is mounted to the rotary shaft and the substrate 11 is reeled out of the reel 31*a*. Then, one end of the reeled out substrate 11 is fixed to the reel 31*b*. Subsequently, the conveyor is activated to reel out the substrate 11 from the reel 31*a*, while the substrate 11 is reeled into the reel 31*b*.

[Coating Process]

In this process, a coating film is formed using a method similar to the one explained in the first embodiment, excepting the use of the uneven-distribution-layer-forming coating liquid that contains metal oxide microparticles instead of the quaternary ammonium salt material.

(Ionizing-Radiation-Curable Material)

For example, the same material as the one explained in the first embodiment may be used as the ionizing-radiation-curable material.

(Metal Oxide Microparticles)

As the metal oxide microparticles, those which having electrical conductivity may be used, the metal oxide microparticles containing, as main components, one, or two or more metal oxides selected from zirconium oxides, antimony-containing tin oxides (ATO), phosphorus-containing tin oxides (PTO), tin-containing indium oxides, aluminum oxides, cerium oxides, zinc oxides, aluminum-containing zinc oxides, tin oxides, antimony-containing zinc oxides and indium-containing zinc oxides. Among these, ATO is preferably used from the viewpoint of electrical conductivity and refractive index.

For example, the metal oxide microparticles have an average particle size of 2,000 nm or less. If the average particle size of the metal oxide microparticles exceeds 2,000 nm, the metal oxide microparticles would tend to be unevenly distributed in the surface of the uneven distribution layer, leading to no formation of the recoating layer and thus allowing the metal oxide microparticles to reside in the surface of the uneven distribution layer. In this case, the low-refractive-index-layer-forming material and the metal oxide microparticles would electrically repel each other and thus the adhesion between the uneven distribution layer and the low refractive index layer would be impaired, resultantly impairing the abrasion resistance of the antireflection film to be obtained. Preferably, the average particle size of the metal oxide microparticles is 500 nm or less. However, taking account of the coating process, it is more preferable that the average particle size of the metal oxide microparticles ranges from 1 nm to 100 nm. Use of the metal oxide microparticles having an average particle size of such a range can prolong the time of using the coating liquid.

Further, it is preferable that the content of the metal oxide microparticles in the uneven distribution layer ranges from 0.5 parts by mass to 40 parts by mass. It is more preferable that the content of the metal oxide microparticles ranges from 0.5 parts by mass to 20 parts by mass. If the content of the metal oxide microparticles in the uneven distribution layer is less than 0.5 parts by mass, sufficient antistatic performance would not necessarily be obtained. On the other hand, if the content of the metal oxide microparticles exceeds 40 parts by mass, the recoating layer would not necessarily be formed well. In addition, if the content of the metal oxide microparticles exceeds 40 parts by mass, the metal oxide microparticles would be agglomerated in the uneven distribution layer, unfavorably leading to the occurrence of haze. Also, when the content of the metal oxide microparticles is not more than 20 parts by mass, stability of the coating liquid can be increased and therefore the state of the coating liquid can also be stabilized. It should be appreciated that the content of the conductive polymer in the uneven distribution layer is synonymous with the content of the conductive polymer with respect to the solid matter in the uneven-distribution-layer-forming coating liquid.

(Leveling Material)

For example, as the leveling material, materials similar to those explained in the first embodiment may be used. Further, the content of the leveling material in the uneven distribution layer may have the range explained in the first embodiment. Furthermore, the molecular weight of the leveling material may also have the range explained in the first embodiment.

The uneven distribution layer may have a thickness that falls in a range similar to the one explained in the first embodiment. Specifically, the thickness of the uneven distribution layer preferably ranges from 3 µm to 15 µm. Allowing the thickness to fall in the predetermined range, a desired uneven distribution layer can be obtained. If the uneven distribution layer has a thickness of less than 3 µm, the hard coating layer would turn to a layer having no surface hardness. Accordingly, the antireflection film would not necessarily have sufficient hard coating properties. Further, if the uneven distribution layer has a thickness of 15 µm or more, the concentration distribution of the conductive polymer would not be well achieved and therefore predetermined antistatic performance would not be necessarily obtained. More preferably, the thickness of the uneven distribution layer ranges from 4 µm to 10 µm.

(Solvent)

For example, a solvent similar to the ones explained in the first embodiment that may be used.

Specifically, of all solvents in use and contained in the uneven-distribution-layer-forming coating liquid that contains the binder-matrix-forming material, the metal oxide microparticles and the leveling material, not less than 30 parts by mass of the solvent may be the ones that dissolve or swell the transparent substrate. In addition, the uneven-distribution-layer-forming coating liquid may contain a solvent at a rate of not less than 25 parts by mass and not more than 85 parts by mass. Thus, the uneven distribution layer which includes the middle layer, the hard coating layer that contains the metal oxide microparticles, and the recoating layer can be formed.

Allowing the uneven-distribution-layer-forming coating liquid to contain a solvent in the amount falling in the range mentioned above, metal oxide microparticles in the coating film will be unevenly distributed to thereby well ensure the time for the formation of the hard coating layer in the uneven distribution layer. Thus, the uneven distribution layer can be easily manufactured. If the amount of the solvent is less than 25 parts by mass, the coating film would be rapidly dried and therefore formation of the middle layer in the uneven distribution layer would tend to be difficult. In addition, metal oxide microparticles cannot be unevenly distributed in the uneven distribution layer and therefore it may be difficult to obtain desired antistatic performance. On the other hand, if the amount of the solvent exceeds 85 parts by mass, the drying time would be required to be prolonged, which is unfitted for mass production. Further, in this case, it would be difficult to form an uneven distribution layer that has a desired surface hardness.

The solvent that dissolves or swells the transparent substrate infiltrate into the transparent substrate in the process of applying the uneven-distribution-layer-forming coating liquid onto the transparent substrate and forming the coating film, followed by drying. Accompanying this, the components of the binder-matrix-forming material also infiltrate into the transparent substrate and mix into the substrate to form the middle layer 12a. In this case, the metal oxide microparticles are unevenly distributed in the hard coating layer such that there will be no difference in the refractive index between the middle layer and the hard coating layer. It is more preferable that the metal oxide microparticles are unevenly distributed in the hard coating layer such that the concentration will be gradually increased in a direction from the low refractive index layer side toward the transparent substrate side. Further, due to surface tension, the recoating-layer-forming material moves to the outermost surface (the side on which the low refractive index layer is formed) to form the recoating layer. The solvent contained in the uneven-distribution-layer-forming coating liquid includes 30 parts by mass or more of the solvent that dissolves or swells the transparent substrate 11. This amount of the solvent contained in the coating liquid of the uneven distribution layer enables formation of the middle layer between the transparent substrate and the uneven distribution layer, the middle layer consisting of the components of the transparent substrate and the components of the binder matrix, and further enables efficient formation of the uneven distribution layer. If the solvent that dissolves or swells the transparent substrate is less than 30 parts by mass with respect to all solvents, the uneven distribution layer would not be necessarily formed.

When a triacetyl cellulose film is used as the transparent substrate, the solvent similar to those explained in the first embodiment may be used as the solvent for dissolving or swelling the transparent substrate. Also, the solvent that does not dissolve or swell the triacetyl cellulose film may be those which are similar to the ones explained in the first embodiment.

When the uneven-distribution-layer-forming coating liquid is cured using an ultraviolet beam, a photopolymerization initiator may be added to the uneven-distribution-layer-forming coating liquid. The uneven-distribution-layer-forming coating liquid may have such additives as a surface adjuster, a refractive index adjuster, an adhesion improver and a curative added. As the photopolymerization initiator, those which are similar to the ones explained in the first embodiment may be used. The amount of addition of the photopolymerization initiator may be the same as the one explained in the first embodiment.

Such an uneven-distribution-layer-forming coating liquid is applied onto the transparent substrate using a wet deposition method to thereby form a coating film.

[Drying Process]

After forming the first coating film, the substrate 11 is conveyed to the second unit 22 by the conveyor.

The substrate 11 is dried through a process similar to the one explained in the first embodiment. Specifically, the substrate 11 is subjected to two-stage drying. In a primary drying, the metal oxide microparticles are unevenly distributed. In a secondary drying, the coating film is dried.

The drying process may be performed in a solvent atmosphere with a concentration range similar to the one explained in the first embodiment. The solvent that can be used in the drying atmosphere in this case may be those which are similar to the ones explained in the first embodiment.

Further, the time for the amount of the solvent to become 10 parts by mass preferably has a range similar to the one explained in the first embodiment.

[Radiation Applying Process]

The dried substrate 11 is conveyed to the third unit 3 by the conveyor.

In the third unit 23, the coating film is cured with the application of ionizing radiation to thereby obtain the uneven distribution layer. As the ionizing radiation, those which are similar to the ones explained in the first embodiment may be used.

<Formation of Low Refractive Index Layer>

Subsequently, a method of forming the low refractive index layer is described.

The low refractive index layer may be formed using the method similar to the one explained in the first embodiment. Specifically, the low refractive index layer is formed through a coating process, a drying process and an ionizing radiation applying process similar to the ones explained in the first embodiment, by performing these processes in this order.

The composition of the low-refractive-index-layer-forming coating liquid to be used may be similar to the one explained in the first embodiment.

In this way, the antireflection film is obtained.

In the present embodiment, with the blending of the metal oxide microparticles, the antireflection film is imparted with antistatic properties. Further, the metal oxide microparticles easily segregate toward the surface, compared to the ionizing-radiation-curable material that is the binder-matrix-forming material. Also, the leveling material easily segregates toward the surface, compared to the metal oxide microparticles and the ionizing-radiation-curable material. Accordingly, by controlling conditions such as of a drying temperature, a drying time and the like in forming the uneven distribution layer, the metal oxide microparticles can be unevenly distributed, thereby forming the uneven distribution layer that includes the middle layer, the hard coating layer and the recoating layer which are isolated from each other.

Further, by applying the uneven-distribution-layer-forming coating liquid, the middle layer 12a, the hard coating layer 12b and the recoating layer 12c can be concurrently formed. Accordingly, manufacturing cost can be reduced, compared to the case where a hard coating layer and an antistatic layer are sequentially applied onto the transparent substrate 11.

Further, the recoating layer 12c is provided on the hard coating layer 12b and further the low refractive index layer 13 is formed on the recoating layer 12c to thereby enhance adhesion therebetween and thus prevent impairment of abrasion resistance. Further, formation of the recoating layer 12c can suppress surface roughness and prevent blushing. Such an antireflection film will also have excellent optical characteristics.

EXAMPLES

First, a method of evaluating the antireflection film will be described.

[Average Luminous Reflectance]

Using a black matte spray, black coating was applied to a surface opposite to the low-refractive-index-layer-formed surface of the obtained antireflection film. After the coating, using an automatic spectrophotometer (U-4000 manufactured by Hitachi Ltd.), spectral reflectance at an incident angle of 5° was measured in the low-refractive-index-layer formed surface, under the conditions of C light source and two-degree field of view. An average luminous reflectance (Y %) was calculated from the obtained spectral reflectance. Further, a photopic standard relative luminous efficiency was used as a relative luminous efficiency.

[Haze (H) and Parallel Light Transmittance]

Using an image clarity measure (NDH-2000 manufactured by Nippon Denshoku Industries Co., Ltd.), haze (H) and parallel light transmittance were measured of the obtained antireflection film. Haze and parallel light transmittance were measured in conformity with JIS K7136 and JIS K7361-1:1997, respectively. [Surface Resistance]

Using a high resistance resistivity meter (Hiresta-MCP-HT260 manufactured by DIA Instruments Co., Ltd.), surface resistance was measured of the surface of the low refractive index layer of the obtained antireflection film, in conformity with JIS-K6911 (1995).

[Contact Angle]

For the surface of the uneven distribution layer before forming the low refractive index layer and the surface of the low refractive index layer of the obtained antireflection film, water droplets of 1.8 mm in diameter were each formed at a needle tip in a dry state (20° C.-65% RH) and these droplets were brought into contact with the surface of the sample (solid body) to form the droplets thereon, using a contact angle meter (CA-X model manufactured by Kyowa Interface Science Co., Ltd.). The contact angle refers to an angle formed between: a tangent line with respect the surface of liquid at a point where a solid body contacts the liquid; and the surface of the solid body, and was defined by an angle on the side of the liquid. As the liquid, distilled water was used. Further, the pure-water contact angle was measured in conformity with JIS-R3257.

[Pencil Hardness]

Pencil hardness of the surface of the low refractive index layer of each antireflection film was measured with a load of 500 g, in conformity with JIS K5600-5-4 (1999).

[Color Variations and Interference Band]

For the obtained antireflection film, fluorescent light was thrown on the surface of the low refractive index layer to confirm light reflected on this surface and to thereby confirm color variations and an interference band. Evaluation through visual confirmation was performed on the basis of the following criteria.

O: Color variations and interference band were good

X: Color variations and interference band were not good

[Abrasion Resistance (Steel Wool (SW))]

For the surface of the low refractive index layer of the obtained antireflection film, the surface of the low refractive index layer of the optical laminate was scratched back and forth for ten times by a steel wool (Bonstar #0000 manufactured by Nippon Steel Wool Co., Ltd), imposing a load of 500 g/cm$^2$, using Gakushin-type fastness rubbing tester (AB-301 manufactured by Tester Sangyo Co., Ltd.) to visually evaluate changes in the appearance caused by the scratches and flaws. Evaluation through visual confirmation was performed on the basis of the following criteria.

◯: No flaws were confirmed
X: Flaws were confirmed

[Pencil Hardness]

For the surface of the low refractive index layer of the obtained antireflection film, pencil hardness test was performed in conformity with JIS K5600-5-4 (1999) to thereby calculate pencil hardness.

According to the following criteria of judgement, a middle layer, a hard coating layer, an antistatic layer and a leveling layer were judged.

[Confirmation on the Presence/Absence of Middle Layer in Uneven Distribution Layer]

The presence/absence of the middle layer was confirmed on the basis of the spectral reflectance that has been calculated in the above item [Average luminous reflectance]. Specifically, when no interference peak corresponding to the thickness of the uneven distribution layer was confirmed in an obtained spectral reflectance curve, the middle layer was judged as being present. When an interference peak corresponding to the thickness of the uneven distribution layer was confirmed, the middle layer was judged as being absent.

◯: Middle layer was present (Interference peak was absent)
X: Middle layer was absent (Interference peak was present)

[Confirmation of the Presence/Absence of Hard Coating Layer in Uneven Distribution Layer]

Formation or non-formation of the hard coating layer was judged on the basis of the surface resistance in the surface of the low reflectance layer and the pencil hardness in the surface of the uneven distribution layer, which have been calculated in the items [Surface resistance] and [Pencil hardness], respectively, set forth above.

◯: Hard coating layer was present (The surface resistance in the surface of the low refractive index layer was not more than $1\times10^{12}$ Ω/cm$^2$ and the pencil hardness in the surface of the uneven distribution layer was not less than H.)
X: Hard coating layer was absent (Other than the above (The surface resistance in the surface of the low refractive index layer exceeded $1\times10^{12}$ Ω/cm$^2$ or the pencil hardness was less than H.))

[State of Distribution of Quaternary Ammonium Salt Material in Hard Coating Layer]

The state of distribution of the quaternary ammonium salt material in the hard coating layer was confirmed by performing cross sectional EDX. After fixing the obtained antireflection film using an embedding resin, the fixed film was subjected to cutting using a microtome to expose a cross section and prepare an analysis sample. The obtained analysis sample was introduced to a scanning electron microscope attached with an energy-dispersive X-ray analyzer to perform EDX analysis at the position (Y1) 1 μm deep, the position (Y2) 3 μm deep and the position (Y3) 5 μm deep from the interface between the low refractive index layer and the uneven distribution layer. The result of the analysis was evaluated on the basis of the following criteria.

◯: There was concentration gradient (Cl was detected at the 1 μm deep position (Y1), the 3 pin deep position (Y2) and the 5 m deep position (Y3), and the Cl concentration was lowered with the increase of the depth from Y1, Y2 to Y3.)
X: There was no concentration gradient (Other than the above (No chlorine was detected at the 5 μm deep position (Y3), or the Cl concentration was not lowered with the increase of the depth from Y1, Y2 to Y3.)

[State of Distribution of Metal Oxide Microparticles in Hard Coating Layer]

The state of distribution of the metal oxide microparticles in the hard coating layer was confirmed by performing cross sectional EDX. After fixing the obtained antireflection film using an embedding resin, the fixed film was subjected to cutting using a microtome to expose a cross section and prepare an analysis sample. The obtained analysis sample was introduced to a scanning electron microscope attached with an energy-dispersive X-ray analyzer to perform EDX analysis at the position (Y1) 1 μm deep, the position (Y2) 3 μm deep and the position (Y3) 5 μm deep from the interface between the low refractive index layer and the uneven distribution layer. The result of the analysis was evaluated on the basis of the following criteria.

◯: Sn (tin) was detected at some of the positions
X: Sn (tin) was detected at none of the positions

[Confirmation of the Presence/Absence of Recoating Layer in Uneven Distribution Layer]

The presence of the leveling layer was confirmed on the basis of the contact angle in the surface of the uneven distribution layer. The contact angle of pure water in the surface of the uneven distribution layer is as calculated in the above item [Contact angle].

◯: Recoating layer was present (The contact angle of pure water in the surface of the uneven distribution layer was 60° or more.)
X: Recoating layer was absent (The contact angle of pure water in the surface of the uneven distribution layer was less than 60°.)

The [Confirmation of the presence/absence of recoating layer in uneven distribution layer] was not performed with respect to the antireflection film in which neither the quaternary ammonium salt material nor the metal oxide microparticles were added to the uneven-distribution-layer-forming coating liquid.

<<Test A to Test C>>

Test A, test B and test C relate to the first embodiment.

<<Method of Fabricating Antireflection Film>>

<Test A>

Hereinafter is described a Case (A) where a compound having an acryl group is used as the leveling material in the uneven distribution layer.

First, hereinafter is described preparation of uneven-distribution-layer-forming coating liquids A1 to A10.

Synthesis Example 1 of Quaternary Ammonium Salt Material

Octyl polyethylene glycol polypropylene glycol methacrylate (Product name: "Blemmer 50POEP-800B" manufactured by NOF Corporation): 18.0 g
Methacryloyl oxyethyl trimethyl ammonium chloride: 35.0 g
Cyclohexyl methacrylate: 14.0 g
Azobisisobutyronitrile: 0.3 g
Isopropyl alcohol: 100.0 g
Methyl ethyl ketone: 40.0 g were charged into a four-neck flask that includes an agitating blade, a reflux cooling tube, a dry-air inlet tube and a thermometer, and polymerized at a temperature of 65° C. for 3 hours in a nitrogen atmosphere. After the polymerization, a reaction liquid was fed into hexane, and the product was deposited, followed by drying. The obtained quaternary ammonium salt material had a weight-average molecular weight of 18,500.

(Uneven-Distribution-Layer-Forming Coating Liquid A1)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were added together. These were adjusted using methyl acetate so as to contain 50 parts by mass of solid matter, thereby obtaining an uneven-distribution-layer-forming coating liquid A1.

(Uneven-Distribution-Layer-Forming Coating Liquid A2)

For 100 parts by mass of urethane acrylate (UA-53 manufactured by Shin Nakamura Chemical Co., Ltd.), NR-121X-9IPA (isopropyl alcohol dispersion liquid manufactured by Colcoat Co., Ltd.) (Solid matter): 20 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A2.

(Uneven-Distribution-Layer-Forming Coating Liquid A3)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass BYK-352 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A3.

(Uneven-Distribution-Layer-Forming Coating Liquid A4)

For 100 parts by mass of urethane acrylate (UA-53 manufactured by Shin Nakamura Chemical Co., Ltd.), Light ester DQ 100 (manufactured by Kyoeisha Chemical Co., Ltd., weight-average molecular weight 208) that contains quaternary ammonium salt: 10 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A4.

(Uneven-Distribution-Layer-Forming Coating Liquid A5)

For 100 parts by mass of urethane acrylate (UA-53 manufactured by Shin Nakamura Chemical Co., Ltd.), p-Styrenesulfonic acid ammonium salt homopolymer (molecular weight 120,000): 10 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A5.

(Uneven-distribution-layer-foiming coating liquid A6)

For 100 parts by mass of urethane acrylate (UA-53 manufactured by Shin Nakamura Chemical Co., Ltd.), The quaternary ammonium salt material (molecular weight 18,500) prepared in Synthesis Example 1: 0.01 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A6.

(Uneven-Distribution-Layer-Forming Coating Liquid A7)

For 100 parts by mass of urethane acrylate (UA-53 manufactured by Shin Nakamura Chemical Co., Ltd.), The quaternary ammonium salt material (molecular weight 18,500) prepared in Synthesis Example 1: 100 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A7.

(Uneven-Distribution-Layer-Forming Coating Liquid A8)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 Parts by Mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted for the urethane acrylate usingThese were adjusted using ethanol so as to contain 50 parts by mass of solid matter, thereby obtaining an uneven-distribution-layer-forming coating liquid A8.

(Uneven-Distribution-Layer-Forming Coating Liquid A9)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 20 parts by mass of solid matter, thereby obtaining an uneven-distribution-layer-forming coating liquid A9.

(Uneven-Distribution-Layer-Forming Coating Liquid A10)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 90 parts by mass of solid matter, thereby obtaining an uneven-distribution-layer-forming coating liquid A10.

(Uneven-Distribution-Layer-Forming Coating Liquid A11)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid A11.

Preparation of a low-refractive-index-layer-forming coating liquid A is shown below.

(Low-Refractive-Index-Layer-Forming Coating Liquid A)

Dispersion liquid of porous silica microparticles (average particle size 50 nm/solid matter 20 parts by mass/methyl isobutyl ketone dispersion liquid):(solid matter) 2.5 parts by mass EO-modified dipentaerythritol hexaacrylate (DPEA-12 manufactured by Nippon Kayaku Co., Ltd.): 2.5 parts by mass Photopolymerization initiator (Irgacure 184 manufactured by Chiba Japan Co., Ltd.): 0.1 parts by mass were made available. These were adjusted using isopropyl alcohol so as to contain 5 parts by mass of solid matter, thereby obtaining a low-refractive-index-layer-forming coating liquid A.

Example A1

(Formation of Hard Coating Layer)

As a transparent substrate, a triacetylcellulose film (hereinafter referred to as "TAC") (thickness 80 μm, refractive index 1.49, manufactured by FUJIFILM Corporation) of 80 μm thick was made available. The uneven-distribution-layer-forming coating liquid A1 was applied to one surface of the film. Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Subsequently, the low-refractive-index-layer-forming coating liquid A was applied to the upper layer of the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example A2 to Example A10

Antireflection films of <Example A2> to <Example A10> were fabricated using the uneven-distribution-layer-forming coating liquids A2 to A10 instead of the uneven-distribution-layer-forming coating liquid A1, with the rest of manufacturing conditions being similar to those of <Example A1>.

Example A11

(Formation of Hard Coating Layer)

The uneven-distribution-layer-forming coating liquid A1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 0.5 μm.

(Formation of Low Refractive Index Layer)

Then, a low refractive index layer was formed on an upper layer of the hard coating layer. The low-refractive-index-layer-forming coating liquid A was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example A12

(Formation of Hard Coating Layer)

The uneven-distribution-layer-forming coating liquid A1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 20 μm.

(Formation of Low Refractive Index Layer)

Then, a low refractive index layer was formed on an upper layer of the hard coating layer. The low-refractive-index-layer-forming coating liquid A was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example A13

(Formation of Hard Coating Layer)

The uneven-distribution-layer-forming coating liquid A1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 5 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid A was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example A14

(Formation of Hard Coating Layer)

The uneven-distribution-layer-forming coating liquid A1 was applied to one surface of a TAC film (thickness 80 μm), followed by drying at a temperature of 25° C. for 70 seconds. After that, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid A was applied to the hard coating layer so that the thickness after drying would be 100 nm. After coating, the resultant layer was dried at a temperature of 80° C. for 60 seconds. After that, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example A15

(Formation of Hard Coating Layer)

The uneven-distribution-layer-forming coating liquid A1 was applied to one surface of a TAC film (thickness 80 μm), followed by drying at a temperature of 80° C. for 70 seconds. After that, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid A was applied to the hard coating layer so that the thickness after drying would be 100 nm. After coating, the resultant layer was dried at a temperature of 80° C. for 60 seconds. After that, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example 16

An antireflection film of <Example 16> was fabricated in a manner similar to <Example A1>, excepting that the uneven-distribution-layer-forming coating liquid A11 was used instead of the uneven-distribution-layer-forming coating liquid A1.

Table 1 shows components and manufacturing conditions used in <Example A1> to <Example A16>.

TABLE 1

| | Uneven-distr.-layer-forming coating liquid | Low-refractive-layer-forming coating liquid | Quaternary ammonium salt material | | | Leveling material |
|---|---|---|---|---|---|---|
| | | | Mat. name | Mol. weight | Quantity | Mat. name |
| Ex. A1 | Uneven-distr.-layer-forming coating liquid A1 | Low-refractive-layer-forming coating liquid A | Synthesis Example 1 | 18,500 | 10 parts by mass | BYK-350 |
| Ex. A2 | Uneven-distr.-layer-forming coating liquid A2 | Low-refractive-layer-forming coating liquid A | NR-121X-9IPA | 15,000 | 20 parts by mass | BYK-350 |

TABLE 1-continued

| Ex. | Uneven-distr.-layer-forming coating liquid | Low-refractive-layer-forming coating liquid | Name | Value | Parts | BYK |
|---|---|---|---|---|---|---|
| Ex. A3 | Uneven-distr.-layer-forming coating liquid A3 | Low-refractive-layer-forming coating liquid A | Synthesis Example 1 | 18,500 | 10 parts by mass | BYK-352 |
| Ex. A4 | Uneven-distr.-layer-forming coating liquid A4 | Low-refractive-layer-forming coating liquid A | Light ester DQ100 | 208 | 10 parts by mass | BYK-350 |
| Ex. A5 | Uneven-distr.-layer-forming coating liquid A5 | Low-refractive-layer-forming coating liquid A | Ammonium salt homo-polymer | 120,000 | 10 parts by mass | BYK-350 |
| Ex. A6 | Uneven-distr.-layer-forming coating liquid A6 | Low-refractive-layer-forming coating liquid A | Synthesis Example 1 | 18,500 | 0.01 parts by mass | BYK-350 |
| Ex. A7 | Uneven-distr.-layer-forming coating liquid A7 | Low-refractive-layer-forming coating liquid A | Synthesis Example 1 | 18,500 | 100 parts by mass | BYK-350 |
| Ex. A8 | Uneven-distr.-layer-forming coating liquid A8 | Low-refractive-layer-forming coating liquid A | Synthesis Example 1 | 18,500 | 10 parts by mass | BYK-350 |
| Ex. A9 | Uneven-distr.-layer-forming coating liquid A9 | Low-refractive-layer-forming coating liquid A | Synthesis Example 1 | 18,500 | 10 parts by mass | BYK-350 |
| Ex. A10 | Uneven-distr.-layer-forming coating liquid A10 | Low-refractive-layer-forming coating liquid A | Synthesis Example 1 | 18,500 | 10 parts by mass | BYK-350 |
| Ex. A11 | Uneven-distr.-layer-forming coating liquid A1 | Low-refractive-layer-forming coating liquid A | Synthesis Example 1 | 18,500 | 10 parts by mass | BYK-350 |
| Ex. A12 | Uneven-distr.-layer-forming coating liquid A1 | Low-refractive-layer-forming coating liquid A | Synthesis Example 1 | 18,500 | 10 parts by mass | BYK-350 |
| Ex. A13 | Uneven-distr.-layer-forming coating liquid A1 | Low-refractive-layer-forming coating liquid A | Synthesis Example 1 | 18,500 | 10 parts by mass | BYK-350 |
| Ex. A14 | Uneven-distr.-layer-forming coating liquid A1 | Low-refractive-layer-forming coating liquid A | Synthesis Example 1 | 18,500 | 10 parts by mass | BYK-350 |
| Ex. A15 | Uneven-distr.-layer-forming coating liquid A1 | Low-refractive-layer-forming coating liquid A | Synthesis Example 1 | 18,500 | 10 parts by mass | BYK-350 |
| Ex. A16 | Uneven-distr.-layer-forming coating liquid A11 | Low-refractive-layer-forming coating liquid A | Synthesis Example 1 | 18,500 | 10 parts by mass | — |

| | Thickness of uneven distr. layer | Solvent Mat. name | Solid matter adjustment | Drying temp. Prim. drying temp. | Drying temp. Sec. drying temp. | Drying time Prim. drying time | Drying time Sec. drying time |
|---|---|---|---|---|---|---|---|
| Ex. A1 | 6 μm | Methyl acetate | 50% | 25° C. | 80° C. | 10 sec. | 60 sec. |
| Ex. A2 | 6 μm | Methyl acetate | 50% | 25° C. | 80° C. | 10 sec. | 60 sec. |
| Ex. A3 | 6 μm | Methyl acetate | 50% | 25° C. | 80° C. | 10 sec. | 60 sec. |
| Ex. A4 | 6 μm | Methyl acetate | 50% | 25° C. | 80° C. | 10 sec. | 60 sec. |
| Ex. A5 | 6 μm | Methyl acetate | 50% | 25° C. | 80° C. | 10 sec. | 60 sec. |
| Ex. A6 | 6 μm | Methyl acetate | 50% | 25° C. | 80° C. | 10 sec. | 60 sec. |
| Ex. A7 | 6 μm | Methyl acetate | 50% | 25° C. | 80° C. | 10 sec. | 60 sec. |
| Ex. A8 | 6 μm | Ethanol | 50% | 25° C. | 80° C. | 10 sec. | 60 sec. |
| Ex. A9 | 6 μm | Methyl acetate | 20% | 25° C. | 80° C. | 10 sec. | 60 sec. |
| Ex. A10 | 6 μm | Methyl acetate | 90% | 25° C. | 80° C. | 10 sec. | 60 sec. |
| Ex. A11 | 0.5 μm | Methyl acetate | 50% | 25° C. | 80° C. | 10 sec. | 60 sec. |
| Ex. A12 | 20 μm | Methyl acetate | 50% | 25° C. | 80° C. | 10 sec. | 60 sec. |
| Ex. A13 | 6 μm | Methyl acetate | 50% | 25° C. | 80° C. | 10 sec. | 5 sec. |
| Ex. A14 | 6 μm | Methyl acetate | 50% | 25° C. | | 70 sec. | |

TABLE 1-continued

| | | | | | | | |
|---|---|---|---|---|---|---|---|
| Ex. A15 | 6 μm | Methyl acetate | 50% | | 80° C. | 70 sec. | |
| Ex. A16 | 6 μm | Methyl acetate | 50% | 25° C. | 80° C. | 10 sec. | 60 sec. |

The evaluation described above was performed of the obtained antireflection films of <Example A1> to <Example A16>. The results of the evaluation are shown in Table 2.

TABLE 2

| | Items of Evaluation | | | | | | | | | Status of forming uneven distribution layer | | | |
|---|---|---|---|---|---|---|---|---|---|---|---|---|---|
| | | Parallel | | Contact angle (° C.) | | | | | | | | Conc. | |
| | Luminous reflectance (%) | Haze (%) | light trans-mittance (%) | Surface resistance (Ω/cm²) | Sur. of uneven distr. layer | Sur. of low refractive index layer | Color var. and interference band | Abrasion resistance (SW) | Pencil hard-ness | Mid-dle layer | Hard coat-ing layer | distr. of quaternary ammonium salt material | Re-coating layer |
| Ex. A1 | 1.0 | 0.1 | 96.0 | 1 × 10⁹ | 75 | 85 | ○ | ○ | 2H | ○ | ○ | ○ | ○ |
| Ex. A2 | 1.0 | 0.1 | 96.0 | 1 × 10⁹ | 75 | 85 | ○ | ○ | 2H | ○ | ○ | ○ | ○ |
| Ex. A3 | 1.0 | 0.1 | 96.0 | 1 × 10⁹ | 75 | 85 | ○ | ○ | 2H | ○ | ○ | ○ | ○ |
| Ex. A4 | 3.0 | 2.0 | 94.0 | 5 × 10⁸ | 45 | 60 | ○ | X | 2H | ○ | ○ | ○ | X |
| Ex. A5 | 1.0 | 0.1 | 96.0 | 1 × 10¹³ | 75 | 85 | ○ | ○ | 2H | ○ | X | X | ○ |
| Ex. A6 | 1.0 | 0.1 | 96.0 | 1 × 10¹³ | 75 | 85 | ○ | ○ | 2H | ○ | X | X | ○ |
| Ex. A7 | 3.0 | 3.0 | 93.0 | 2 × 10⁸ | 40 | 60 | ○ | X | B | ○ | X | X | X |
| Ex. A8 | 1.0 | 0.1 | 96.0 | 1 × 10¹³ | 75 | 85 | X | ○ | 2H | X | X | X | ○ |
| Ex. A9 | 3.5 | 3.0 | 94.0 | 1 × 10⁸ | 40 | 60 | ○ | X | B | ○ | X | X | X |
| Ex. A10 | 1.0 | 0.7 | 95.5 | 1 × 10¹³ | 50 | 60 | X | X | 2H | X | X | X | X |
| Ex. A11 | 2.0 | 3.0 | 93.0 | 1 × 10⁹ | 30 | 30 | X | X | B | X | X | X | X |
| Ex. A12 | 1.0 | 0.1 | 96.0 | 1 × 10¹³ | 75 | 85 | ○ | ○ | 2H | ○ | X | X | ○ |
| Ex. A13 | 3.0 | 7.5 | 93.0 | 1 × 10⁹ | 40 | 50 | ○ | X | B | ○ | X | X | X |
| Ex. A14 | 3.0 | 7.5 | 93.0 | 1 × 10⁹ | 40 | 50 | ○ | X | B | ○ | X | X | X |
| Ex. A15 | 2.0 | 0.5 | 93.0 | 5 × 10¹³ | 50 | 70 | X | X | 2H | X | X | X | X |
| Ex. A16 | 3.5 | 2.0 | 92.0 | 1 × 10⁹ | 50 | 85 | ○ | X | 2H | ○ | ○ | ○ | — |

<Test B>

Hereinafter is described a Case (B) in which a compound having a fluorine group is used as the leveling material in the uneven distribution layer.

First, preparation of uneven-distribution-layer-forming coating liquids B1 to B11 is shown.

Synthesis Example 1 of Quaternary Ammonium Salt Material

Octyl polyethylene glycol polypropylene glycol methacrylate (Product name: "Blemmer 50POEP-800B" manufactured by NOF Corporation): 18.0 g
Methacryloyl oxyethyl trimethyl ammonium chloride: 35.0 g
Cyclohexyl methacrylate: 14.0 g
Azobisisobutyronitrile: 0.3 g
Isopropyl alcohol: 100.0 g
Methyl ethyl ketone: 40.0 g were charged into a four-neck flask that includes an agitating blade, a reflux cooling tube, a dry-air inlet tube and a thermometer, and polymerized at a temperature of 65° C. for 3 hours in a nitrogen atmosphere. After the polymerization, a reaction liquid was fed into hexane, and the product was deposited, followed by drying. The obtained quaternary ammonium salt material had a weight-average molecular weight of 18,500.

(Uneven-Distribution-Layer-Forming Coating Liquid B1)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass F470 (manufactured by DIC Corporation): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B1.

(Uneven-Distribution-Layer-Forming Coating Liquid B2)

For 100 parts by mass of urethane acrylate (UA-53 manufactured by Shin Nakamura Chemical Co., Ltd.), NR-121X-9IPA (isopropyl alcohol dispersion liquid manufactured by Colcoat Co., Ltd.): (Solid matter) 20 parts by mass
F470 (manufactured by DIC Corporation): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B2.

(Uneven-Distribution-Layer-Forming Coating Liquid B3)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass F489 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B3.

(Uneven-Distribution-Layer-Forming Coating Liquid B4)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass Ftergent 222F (manufactured by Neos Company Limited): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B4.

(Uneven-Distribution-Layer-Forming Coating Liquid B5)

For 100 parts by mass of urethane acrylate (UA-53 manufactured by Shin Nakamura Chemical Co., Ltd.), Light ester DQ 100 (manufactured by Kyoeisha Chemical Co., Ltd., weight-average molecular weight 208) that contains quaternary ammonium salt: 10 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B5.

(Uneven-Distribution-Layer-Forming Coating Liquid B6)

For 100 parts by mass of urethane acrylate (UA-53 manufactured by Shin Nakamura Chemical Co., Ltd.), p-Styrenesulfonic acid ammonium salt homopolymer (molecular weight 120,000): 10 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B6.

(Uneven-Distribution-Layer-Forming Coating Liquid B7)

For 100 parts by mass of urethane acrylate (UA-53 manufactured by Shin Nakamura Chemical Co., Ltd.), The quaternary ammonium salt material (molecular weight 18,500) prepared in Synthesis Example 1: 0.01 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B7.

(Uneven-Distribution-Layer-Forming Coating Liquid B8)

For 100 parts by mass of urethane acrylate (UA-53 manufactured by Shin Nakamura Chemical Co., Ltd.), The quaternary ammonium salt material (molecular weight 18,500) prepared in Synthesis Example 1: 100 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid B8.

(Uneven-Distribution-Layer-Forming Coating Liquid B9)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using ethanol so as to contain 50 parts by mass of solid matter, thereby obtaining an uneven-distribution-layer-forming coating liquid B9.

(Uneven-Distribution-Layer-Forming Coating Liquid B10)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 Parts by Mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 20 parts by mass of solid matter, thereby obtaining an uneven-distribution-layer-forming coating liquid B10.

(Uneven-Distribution-Layer-Forming Coating Liquid B11)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 90 parts by mass of solid matter, thereby obtaining an uneven-distribution-layer-forming coating liquid B11.
(Uneven-Distribution-Layer-Forming Coating Liquid B12)
For 100 parts by mass of urethane acrylate (UA-53 manufactured by Shin Nakamura Chemical Co., Ltd.),
  The quaternary ammonium salt material (molecular weight 18,500) prepared in Synthesis Example 1: 5 parts by mass
  Dipentaerythritol triacrylate: 50 parts by mass
  Pentaerythritol tetraacrylate: 50 parts by mass
  Photopolymerization initiator (Irgacure 184 manufactured by Chiba Japan Co., Ltd.): 10 parts by mass
were made available. These were adjusted using methyl acetate so as to contain 50 parts by mass of solid matter, thereby obtaining an uneven-distribution-layer-forming coating liquid B12.
Preparation of a low-refractive-index-layer-forming coating liquid B is shown below.
(Low-Refractive-Index-Layer-Forming Coating Liquid B)
  Dispersion liquid of porous silica microparticles (average particle size 50 nm/solid matter 20 parts by mass/methyl isobutyl ketone dispersion liquid) (solid matter): 2.5 parts by mass
  EO-modified dipentaerythritol hexaacrylate (DPEA-12 manufactured by Nippon Kayaku Co., Ltd.): 2.5 parts by mass
  Photopolymerization initiator (Irgacure 184 manufactured by Chiba Japan Co., Ltd.): 0.1 parts by mass
were made available. These were adjusted using isopropyl alcohol so as to contain 5 parts by mass of solid matter, thereby obtaining the low-refractive-index-layer-forming coating liquid B.

Example B1

(Formation of Hard Coating Layer)

As a transparent substrate, a triacetylcellulose film (hereinafter referred to as "TAC") (thickness 80 µm, refractive index 1.49, manufactured by FUJIFILM Corporation) of 80 µm thick was made available. The uneven-distribution-layer-forming coating liquid B1 was applied to one surface of the film. Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 µm.
(Formation of Low Refractive Index Layer)

Then, a low refractive index layer was formed on an upper layer of the hard coating layer. The low refractive index layer-forming coating liquid B was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example B2 to Example B11

Antireflection films of <Example B2> to <Example B11> were fabricated in a manner similar to <Example B1>, excepting that the uneven-distribution-layer-forming coating liquids B2 to B11 were used instead of the uneven-distribution-layer-forming coating liquid B1.

Example B12

(Formation of Hard Coating Layer)

The uneven-distribution-layer-forming coating liquid B1 was applied to one surface of a TAC film (thickness 80 µm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 0.5 µm.
(Formation of Low Refractive Index Layer)

Then, a low refractive index layer was formed on an upper layer of the hard coating layer. The low-refractive-index-layer-forming coating liquid B was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example B13

(Formation of Hard Coating Layer)

The uneven-distribution-layer-forming coating liquid B1 was applied to one surface of a TAC film (thickness 80 µm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 20 µm.
(Formation of Low Refractive Index Layer)

Then, a low refractive index layer was formed on an upper layer of the hard coating layer. The low-refractive-index-layer-forming coating liquid B was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example B14

(Formation of Hard Coating Layer)

The uneven-distribution-layer-forming coating liquid A1 was applied to one surface of a TAC film (thickness 80 µm). Then, the film was dried, as primary drying, in a drying oven at a temperature of 25° C. for 10 seconds, successively followed by drying, as secondary drying, at a temperature of 80° C. for 5 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.
(Formation of Low Refractive Index Layer)

Then, a low refractive index layer was formed on an upper layer of the hard coating layer. The low-refractive-index-layer-forming coating liquid B was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example B15

(Formation of Hard Coating Layer)

The uneven-distribution-layer-forming coating liquid B1 was applied to one surface of a TAC film (thickness 80 μm), followed by drying at a temperature of 25° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.
(Formation of Low Refractive Index Layer)

Then, a low refractive index layer was formed on an upper layer of the hard coating layer. The low-refractive-index-layer-forming coating liquid B was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example B16

(Formation of Hard Coating Layer)

The uneven-distribution-layer-forming coating liquid B1 was applied to one surface of a TAC film (thickness 80 μm), followed by drying at a temperature of 80° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.
(Formation of Low Refractive Index Layer)

Then, a low refractive index layer was formed on an upper layer of the hard coating layer. The low-refractive-index-layer-foaming coating liquid B was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example B17

An antireflection film of <Example B17> was fabricated in a manner similar to <Example B1>, excepting that the uneven-distribution-layer-forming coating liquid B12 was used instead of the uneven-distribution-layer-forming coating liquid B1.

Table 3 shows components and manufacturing conditions used in <Example B1> to <Example B17>.

TABLE 3

|  | Uneven-distr.-layer-forming coating liquid | Low-refractive-layer-forming coating liquid | Quaternary ammonium salt material | | | Leveling material |
|---|---|---|---|---|---|---|
|  |  |  | Mat. name | Mol. weight | Quantity | Mat. name |
| Ex. B1 | Uneven-distr.-layer-forming coating liquid B1 | Low-refractive-layer-forming coating liquid B | Synthesis Example 1 | 18,500 | 10 parts by mass | F470 |
| Ex. B2 | Uneven-distr.-layer-forming coating liquid B2 | Low-refractive-layer-forming coating liquid B | NR-121X-9IPA | 15,000 | 20 parts by mass | F470 |
| Ex. B3 | Uneven-distr.-layer-forming coating liquid B3 | Low-refractive-layer-forming coating liquid B | Synthesis Example 1 | 18,500 | 10 parts by mass | F489 |
| Ex. B4 | Uneven-distr.-layer-forming coating liquid B4 | Low-refractive-layer-forming coating liquid B | Synthesis Example 1 | 18,500 | 10 parts by mass | Ftergent 222F |
| Ex. B5 | Uneven-distr.-layer-forming coating liquid B5 | Low-refractive-layer-forming coating liquid B | Light ester DQ100 | 208 | 10 parts by mass | F470 |
| Ex. B6 | Uneven-distr.-layer-forming coating liquid B6 | Low-refractive-layer-forming coating liquid B | Ammonium salt homo-polymer | 120,000 | 10 parts by mass | F470 |
| Ex. B7 | Uneven-distr.-layer-forming coating liquid B7 | Low-refractive-layer-forming coating liquid B | Synthesis Example 1 | 18,500 | 0.01 parts by mass | F470 |
| Ex. B8 | Uneven-distr.-layer-forming coating liquid B8 | Low-refractive-layer-forming coating liquid B | Synthesis Example 1 | 18,500 | 100 parts by mass | F470 |
| Ex. B9 | Uneven-distr.-layer-forming coating liquid B9 | Low-refractive-layer-forming coating liquid B | Synthesis Example 1 | 18,500 | 100 parts by mass | F470 |

TABLE 3-continued

| | | | | | | |
|---|---|---|---|---|---|---|
| Ex. B10 | Uneven-distr.-layer-forming coating liquid B10 | Low-refractive-layer-forming coating liquid B | Synthesis Example 1 | 18,500 | 10 parts by mass | F470 |
| Ex. B11 | Uneven-distr.-layer-forming coating liquid B11 | Low-refractive-layer-forming coating liquid B | Synthesis Example 1 | 18,500 | 10 parts by mass | F470 |
| Ex. B12 | Uneven-distr.-layer-forming coating liquid B1 | Low-refractive-layer-forming coating liquid B | Synthesis Example 1 | 18,500 | 10 parts by mass | F470 |
| Ex. B13 | Uneven-distr.-layer-forming coating liquid B1 | Low-refractive-layer-forming coating liquid B | Synthesis Example 1 | 18,500 | 10 parts by mass | F470 |
| Ex. B14 | Uneven-distr.-layer-forming coating liquid B1 | Low-refractive-layer-forming coating liquid B | Synthesis Example 1 | 18,500 | 10 parts by mass | F470 |
| Ex. B15 | Uneven-distr.-layer-forming coating liquid B1 | Low-refractive-layer-forming coating liquid B | Synthesis Example 1 | 18,500 | 10 parts by mass | F470 |
| Ex. B16 | Uneven-distr.-layer-forming coating liquid B1 | Low-refractive-layer-forming coating liquid B | Synthesis Example 1 | 18,500 | 10 parts by mass | F470 |
| Ex. B17 | Uneven-distr.-layer-forming coating liquid B12 | Low-refractive-layer-forming coating liquid B | Synthesis Example 1 | 18,500 | 10 parts by mass | — |

| | Thickness of uneven distr. layer | Solvent | | Drying temp. | | Drying time | |
|---|---|---|---|---|---|---|---|
| | | Mat. name | Solid matter adjustment | Prim. drying temp. | Sec. drying temp. | Prim. drying time | Sec. drying time |
| Ex. B1 | 6 μm | Methyl acetate | 50% | 25° C. | 80° C. | 10 sec. | 60 sec. |
| Ex. B2 | 6 μm | Methyl acetate | 50% | 25° C. | 80° C. | 10 sec. | 60 sec. |
| Ex. B3 | 6 μm | Methyl acetate | 50% | 25° C. | 80° C. | 10 sec. | 60 sec. |
| Ex. B4 | 6 μm | Methyl acetate | 50% | 25° C. | 80° C. | 10 sec. | 60 sec. |
| Ex. B5 | 6 μm | Methyl acetate | 50% | 25° C. | 80° C. | 10 sec. | 60 sec. |
| Ex. B6 | 6 μm | Methyl acetate | 50% | 25° C. | 80° C. | 10 sec. | 60 sec. |
| Ex. B7 | 6 μm | Methyl acetate | 50% | 25° C. | 80° C. | 10 sec. | 60 sec. |
| Ex. B8 | 6 μm | Methyl acetate | 50% | 25° C. | 80° C. | 10 sec. | 60 sec. |
| Ex. B9 | 6 μm | Methyl acetate | 50% | 25° C. | 80° C. | 10 sec. | 60 sec. |
| Ex. B10 | 6 μm | Methyl acetate | 20% | 25° C. | 80° C. | 10 sec. | 60 sec. |
| Ex. B11 | 6 μm | Methyl acetate | 90% | 25° C. | 80° C. | 10 sec. | 60 sec. |
| Ex. B12 | 0.5 μm | Methyl acetate | 50% | 25° C. | 80° C. | 10 sec. | 60 sec. |
| Ex. B13 | 20 μm | Methyl acetate | 50% | 25° C. | 80° C. | 10 sec. | 60 sec. |
| Ex. B14 | 6 μm | Methyl acetate | 50% | 25° C. | 80° C. | 10 sec. | 5 sec. |
| Ex. B15 | 6 μm | Methyl acetate | 50% | 25° C. | | 70 sec. | |
| Ex. B16 | 6 μm | Methyl acetate | 50% | 80° C. | | 70 sec. | |
| Ex. B17 | 6 μm | Methyl acetate | 50% | 25° C. | 80° C. | 10 sec. | 60 sec. |

TABLE 4

| | | | | | Contact angle (° C.) | | | | | Status of forming uneven distribution layer | | | |
|---|---|---|---|---|---|---|---|---|---|---|---|---|---|
| | Luminous reflectance (%) | Haze (%) | Parallel light transmittance (%) | Surface resistance (Ω/cm²) | Sur. of uneven distr. layer | Sur. of low refractive index layer | Color var. and interference band | Abrasion resistance (SW) | Pencil hardness | Middle layer | Hard coating layer | Conc. distr. of quaternary ammonium salt material | Re-coating layer |
| Ex. B1 | 1.0 | 0.1 | 96.0 | 1 × 10⁹ | 80 | 85 | ○ | ○ | 2H | ○ | ○ | ○ | ○ |
| Ex. B2 | 1.0 | 0.1 | 96.0 | 1 × 10⁹ | 80 | 85 | ○ | ○ | 2H | ○ | ○ | ○ | ○ |
| Ex. B3 | 1.0 | 0.1 | 96.0 | 1 × 10⁹ | 80 | 85 | ○ | ○ | 2H | ○ | ○ | ○ | ○ |
| Ex. B4 | 1.0 | 0.1 | 96.0 | 1 × 10⁹ | 80 | 85 | ○ | ○ | 2H | ○ | ○ | ○ | ○ |
| Ex. B5 | 3.0 | 2.0 | 94.0 | 5 × 10⁸ | 45 | 60 | ○ | X | 2H | ○ | ○ | ○ | X |
| Ex. B6 | 1.0 | 0.1 | 96.0 | 1 × 10¹³ | 80 | 85 | ○ | ○ | 2H | ○ | X | X | ○ |
| Ex. B7 | 1.0 | 0.1 | 96.0 | 1 × 10¹³ | 80 | 85 | ○ | ○ | 2H | ○ | X | X | ○ |
| Ex. B8 | 3.0 | 3.0 | 93.0 | 2 × 10⁸ | 40 | 60 | ○ | X | B | ○ | X | X | X |
| Ex. B9 | 1.0 | 0.1 | 96.0 | 1 × 10¹³ | 80 | 85 | X | ○ | 2H | X | X | X | ○ |
| Ex. B10 | 3.5 | 3.0 | 94.0 | 1 × 10⁸ | 40 | 60 | ○ | X | B | ○ | X | X | X |
| Ex. B11 | 1.0 | 0.7 | 95.5 | 1 × 10¹³ | 50 | 60 | X | X | 2H | X | X | X | X |
| Ex. B12 | 2.0 | 3.0 | 93.0 | 1 × 10⁹ | 30 | 30 | X | X | B | X | X | X | X |
| Ex. B13 | 1.0 | 0.1 | 96.0 | 1 × 10¹³ | 80 | 85 | ○ | ○ | 2H | ○ | X | X | ○ |
| Ex. B14 | 3.0 | 7.5 | 93.0 | 1 × 10⁹ | 40 | 50 | ○ | X | B | ○ | X | X | X |
| Ex. B15 | 3.0 | 7.5 | 93.0 | 1 × 10⁹ | 40 | 50 | ○ | X | B | ○ | X | X | X |
| Ex. B16 | 2.0 | 0.5 | 93.0 | 5 × 10¹³ | 50 | 70 | X | X | 2H | X | X | X | X |
| Ex. B17 | 3.5 | 2.0 | 92.0 | 1 × 10⁹ | 50 | 85 | ○ | X | 2H | ○ | ○ | ○ | — |

The evaluation described above was performed of the obtained antireflection films of <Example B1> to <Example B17>. The results of the evaluation are shown in Table 4.

<Test C>

Hereinafter is described a Case (C) in which a compound having a fluorine group is used as the leveling material in the uneven distribution layer.

First, preparation of uneven-distribution-layer-forming coating liquids C1 to C10 is shown.

Synthesis Example 1 of Quaternary Ammonium Salt Material

Octyl polyethylene glycol polypropylene glycol methacrylate (Product name: "Blemmer 50POEP-800B" manufactured by NOF Corporation): 18.0 g Methacryloyl oxyethyl trimethyl ammonium chloride: 35.0 g Cyclohexyl methacrylate: 14.0 g Azobisisobutyronitrile: 0.3 g Isopropyl alcohol: 100.0 g Methyl ethyl ketone: 40.0 g were charged into a four-neck flask that includes an agitating blade, a reflux cooling tube, a dry-air inlet tube and a thermometer, and polymerized at a temperature of 65° C. for 3 hours in a nitrogen atmosphere. After the polymerization, a reaction liquid was fed into hexane, and the product was deposited, followed by drying. The obtained quaternary ammonium salt material had a weight-average molecular weight of 18,500.

(Uneven-Distribution-Layer-Forming Coating Liquid C1)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass BYK-UV3570 (manufactured by BYK Japan KK): 0.1 parts by mass Dipentaerythritol triaciylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C1.

(Uneven-Distribution-Layer-Forming Coating Liquid C2)

For 100 parts by mass of urethane acrylate (UA-53 manufactured by Shin Nakamura Chemical Co., Ltd.), NR-121X-9IPA (isopropyl alcohol dispersion liquid manufactured by Colcoat Co., Ltd.): (solid matter) 20 parts by mass BYK-UV3570 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C2.

(Uneven-Distribution-Layer-Forming Coating Liquid C3)

For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass POLYFLOW KL401 (manufactured by Kyoeisha Chemical Co., Ltd.): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C3.

(Uneven-Distribution-Layer-Forming Coating Liquid C4)
For 100 parts by mass of urethane acrylate (UA-53 manufactured by Shin Nakamura Chemical Co., Ltd.), Light ester DQ 100 (manufactured by Kyoeisha Chemical Co., Ltd., weight-average molecular weight 208) that contains quaternary ammonium salt: 10 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C4.

(Uneven-Distribution-Layer-Forming Coating Liquid C5)
For 100 parts by mass of urethane acrylate (UA-53 manufactured by Shin Nakamura Chemical Co., Ltd.), p-Styrenesulfonic acid ammonium salt homopolymer (molecular weight 120,000): 10 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C5.

(Uneven-Distribution-Layer-Forming Coating Liquid C6)
For 100 parts by mass of urethane acrylate (UA-53 manufactured by Shin Nakamura Chemical Co., Ltd.), The quaternary ammonium salt material (molecular weight 18,500) prepared in Synthesis Example 1: 0.01 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C6.

(Uneven-Distribution-Layer-Forming Coating Liquid C7)
For 100 parts by mass of urethane acrylate (UA-53 manufactured by Shin Nakamura Chemical Co., Ltd.), The quaternary ammonium salt material (molecular weight 18,500) prepared in Synthesis Example 1: 100 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C7.

(Uneven-Distribution-Layer-Forming Coating Liquid C8)
For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using ethanol so as to contain 50 parts by mass of solid matter, thereby obtaining an uneven-distribution-layer-forming coating liquid C8.

(Uneven-Distribution-Layer-Forming Coating Liquid C9)
For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 20 parts by mass of solid matter, thereby obtaining an uneven-distribution-layer-forming coating liquid C9.

(Uneven-Distribution-Layer-Forming Coating Liquid C10)
For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 90 parts by mass of solid matter, thereby obtaining an uneven-distribution-layer-forming coating liquid C10.

(Uneven-Distribution-Layer-Forming Coating Liquid C11)
For 100 parts by mass of urethane acrylate (UA-53 manufactured by Shin Nakamura Chemical Co., Ltd.), The quaternary ammonium salt material (molecular weight 18,500) prepared in Synthesis Example 1: 5 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid C11.

Preparation of a low-refractive-index-layer-forming coating liquid C is shown below.

(Low-Refractive-Index-Layer-Forming Coating Liquid C)
Dispersion liquid of porous silica microparticles (average particle size 50 nm/solid matter 20 parts by mass/methyl isobutyl ketone dispersion liquid) (solid matter): 2.5 parts by mass EO-modified dipentaerythritol hexaacrylate (DPEA-12 manufactured by Nippon Kayaku Co., Ltd.): 2.5 parts by mass Photopolymerization initiator (Irgacure 184 manufactured by Chiba Japan Co., Ltd.): 0.1 parts by mass were made available. These were adjusted using isopropyl alcohol so that the liquid would contain 5 parts by mass of solid matter, thereby obtaining the low-refractive-index-layer-forming coating liquid C.

Example C1

(Formation of Hard Coating Layer)

As a transparent substrate, a triacetylcellulose film (hereinafter referred to as "TAC") (thickness 80 μm, refractive index 1.49, manufactured by FUJIFILM Corporation) of 80 μm thick was made available. The uneven-distribution-layer-forming coating liquid Cl was applied to one surface of the film. Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid C was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example C2 to Example C10

Antireflection films of <Example C2> to <Example C10> were fabricated in a manner similar to <Example C1>, excepting that the uneven-distribution-layer-forming coating liquids C2 to C10 were used instead of the uneven-distribution-layer-forming coating liquid Cl.

Example C11

(Formation of Hard Coating Layer)

The uneven-distribution-layer-forming coating liquid Cl was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 0.5 μm.

(Formation of Low Refractive Index Layer)

Then, a low refractive index layer was formed on an upper layer of the hard coating layer. The low-refractive-index-layer-forming coating liquid C was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example C12

(Formation of Hard Coating Layer)

The uneven-distribution-layer-forming coating liquid Cl was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 20 μm.

(Formation of Low Refractive Index Layer)

Then, a low refractive index layer was formed on an upper layer of the hard coating layer. The low-refractive-index-layer-forming coating liquid C was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example C13

(Formation of Hard Coating Layer)

The uneven-distribution-layer-forming coating liquid Cl was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 5 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid C was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example C14

(Formation of Hard Coating Layer)

The uneven-distribution-layer-forming coating liquid Cl was applied to one surface of a TAC film (thickness 80 μm), followed by drying at a temperature of 25° C. for 70 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid C was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film Example C15

(Formation of Hard Coating Layer)

The uneven-distribution-layer-forming coating liquid Cl was applied to one surface of a TAC film (thickness 80 μm), followed by drying at a temperature of 80° C. for 70 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid C was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example C16

An antireflection film of <Example C16> was fabricated in a manner similar to <Example C1>, excepting that the uneven-distribution-layer-forming coating liquid C11 was used instead of the uneven-distribution-layer-forming coating liquid Cl.

Table 5 shows components and manufacturing conditions used in <Example C1> to <Example C16>.

TABLE 5

| | Uneven-distr.-layer-forming coating liquid | Low-refractive-layer-forming coating liquid | Quaternary ammonium salt material | | | Leveling material |
|---|---|---|---|---|---|---|
| | | | Mat. name | Mol. weight | Quantity | Mat. name |
| Ex. C1 | Uneven-distr.-layer-forming coating liquid C1 | Low-refractive-layer-forming coating liquid C | Synthesis Example 1 | 18,500 | 10 parts by mass | BYK-UV3570 |
| Ex. C2 | Uneven-distr.-layer-forming coating liquid C2 | Low-refractive-layer-forming coating liquid C | NR-121X-9IPA | 15,000 | 20 parts by mass | BYK-UV3570 |
| Ex. C3 | Uneven-distr.-layer-forming coating liquid C3 | Low-refractive-layer-forming coating liquid C | Synthesis Example 1 | 18,500 | 10 parts by mass | POLYFLOW KL401 |
| Ex. C4 | Uneven-distr.-layer-forming coating liquid C4 | Low-refractive-layer-forming coating liquid C | Light ester DQ100 | 208 | 10 parts by mass | BYK-UV3570 |
| Ex. C5 | Uneven-distr.-layer-forming coating liquid C5 | Low-refractive-layer-forming coating liquid C | Ammonium salt homo-polymer | 120,000 | 10 parts by mass | BYK-UV3570 |
| Ex. C6 | Uneven-distr.-layer-forming coating liquid C6 | Low-refractive-layer-forming coating liquid C | Synthesis Example 1 | 18,500 | 0.01 parts by mass | BYK-UV3570 |
| Ex. C7 | Uneven-distr.-layer-forming coating liquid C7 | Low-refractive-layer-forming coating liquid C | Synthesis Example 1 | 18,500 | 100 parts by mass | BYK-UV3570 |
| Ex. C8 | Uneven-distr.-layer-forming coating liquid C8 | Low-refractive-layer-forming coating liquid C | Synthesis Example 1 | 18,500 | 10 parts by mass | BYK-UV3570 |

TABLE 5-continued

| | | | | | | |
|---|---|---|---|---|---|---|
| Ex. C9 | Uneven-distr.-layer-forming coating liquid C9 | Low-refractive-layer-forming coating liquid C | Synthesis Example 1 | 18,500 | 10 parts by mass | BYK-UV3570 |
| Ex. C10 | Uneven-distr.-layer-forming coating liquid C10 | Low-refractive-layer-forming coating liquid C | Synthesis Example 1 | 18,500 | 10 parts by mass | BYK-UV3570 |
| Ex. C11 | Uneven-distr.-layer-forming coating liquid C1 | Low-refractive-layer-forming coating liquid C | Synthesis Example 1 | 18,500 | 10 parts by mass | BYK-UV3570 |
| Ex. C12 | Uneven-distr.-layer-forming coating liquid C1 | Low-refractive-layer-forming coating liquid C | Synthesis Example 1 | 18,500 | 10 parts by mass | BYK-UV3570 |
| Ex. C13 | Uneven-distr.-layer-forming coating liquid C1 | Low-refractive-layer-forming coating liquid C | Synthesis Example 1 | 18,500 | 10 parts by mass | BYK-UV3570 |
| Ex. C14 | Uneven-distr.-layer-forming coating liquid C1 | Low-refractive-layer-forming coating liquid C | Synthesis Example 1 | 18,500 | 10 parts by mass | BYK-UV3570 |
| Ex. C15 | Uneven-distr.-layer-forming coating liquid C1 | Low-refractive-layer-forming coating liquid C | Synthesis Example 1 | 18,500 | 10 parts by mass | BYK-UV3570 |
| Ex. C16 | Uneven-distr.-layer-forming coating liquid C11 | Low-refractive-layer-forming coating liquid C | Synthesis Example 1 | 18,500 | 10 parts by mass | — |

| | Thickness of uneven distr. layer | Solvent | | Drying temp. | | Drying time | |
|---|---|---|---|---|---|---|---|
| | | Mat. name | Solid matter adjustment | Prim. drying temp. | Sec. drying temp. | Prim. drying time | Sec. drying time |
| Ex. C1 | 6 μm | Methyl acetate | 50% | 25° C. | 80° C. | 10 sec. | 60 sec. |
| Ex. C2 | 6 μm | Methyl acetate | 50% | 25° C. | 80° C. | 10 sec. | 60 sec. |
| Ex. C3 | 6 μm | Methyl acetate | 50% | 25° C. | 80° C. | 10 sec. | 60 sec. |
| Ex. C4 | 6 μm | Methyl acetate | 50% | 25° C. | 80° C. | 10 sec. | 60 sec. |
| Ex. C5 | 6 μm | Methyl acetate | 50% | 25° C. | 80° C. | 10 sec. | 60 sec. |
| Ex. C6 | 6 μm | Methyl acetate | 50% | 25° C. | 80° C. | 10 sec. | 60 sec. |
| Ex. C7 | 6 μm | Methyl acetate | 50% | 25° C. | 80° C. | 10 sec. | 60 sec. |
| Ex. C8 | 6 μm | Ethanol | 50% | 25° C. | 80° C. | 10 sec. | 60 sec. |
| Ex. C9 | 6 μm | Methyl acetate | 20% | 25° C. | 80° C. | 10 sec. | 60 sec. |
| Ex. C10 | 6 μm | Methyl acetate | 90% | 25° C. | 80° C. | 10 sec. | 60 sec. |
| Ex. C11 | 0.5 μm | Methyl acetate | 50% | 25° C. | 80° C. | 10 sec. | 60 sec. |
| Ex. C12 | 20 μm | Methyl acetate | 50% | 25° C. | 80° C. | 10 sec. | 60 sec. |
| Ex. C13 | 6 μm | Methyl acetate | 50% | 25° C. | 80° C. | 10 sec. | 60 sec. |
| Ex. C14 | 6 μm | Methyl acetate | 50% | 25° C. | | 70 sec. | |
| Ex. C15 | 6 μm | Methyl acetate | 50% | 80° C. | | 70 sec. | |
| Ex. C16 | 6 μm | Methyl acetate | 50% | 25° C. | 80° C. | 10 sec. | 60 sec. |

The evaluation described above was performed of the obtained antireflection films of <Example C1> to <Example C16>. The results of the evaluation are shown in Table 6.

TABLE 6

| | Items of Evaluation | | | | | | | | | | | | |
|---|---|---|---|---|---|---|---|---|---|---|---|---|---|
| | | | | | Contact angle (°) | | | | | | Status of forming uneven distribution layer | | |
| | Luminous reflectance (%) | Haze (%) | Parallel light trans- mittance (%) | Surface resistance (Ω/cm$^2$) | Sur. of uneven distr. layer | Sur. of low refractive index layer | Color var. and inter- ference band | Abrasion resistance (SW) | Pencil hard- ness | Middle layer | Hard coating layer | Conc. distr. of quaternary ammonium salt material | Recoating layer |
| Ex. C1 | 1.0 | 0.1 | 96.0 | 1 × 10$^9$ | 80 | 85 | ○ | ○ | 2H | ○ | ○ | ○ | ○ |
| Ex. C2 | 1.0 | 0.1 | 96.0 | 1 × 10$^9$ | 80 | 85 | ○ | ○ | 2H | ○ | ○ | ○ | ○ |
| Ex. C3 | 1.0 | 0.1 | 96.0 | 1 × 10$^9$ | 80 | 85 | ○ | ○ | 2H | ○ | ○ | ○ | ○ |
| Ex. C4 | 3.0 | 2.0 | 94.0 | 5 × 10$^8$ | 45 | 60 | ○ | X | 2H | ○ | ○ | ○ | X |
| Ex. C5 | 1.0 | 0.1 | 96.0 | 1 × 10$^{13}$ | 80 | 85 | ○ | ○ | 2H | ○ | X | X | ○ |
| Ex. C6 | 1.0 | 0.1 | 96.0 | 1 × 10$^{13}$ | 80 | 85 | ○ | ○ | 2H | ○ | X | X | ○ |
| Ex. C7 | 3.0 | 3.0 | 93.0 | 2 × 10$^8$ | 40 | 60 | ○ | X | B | ○ | X | X | X |
| Ex. C8 | 1.0 | 0.1 | 96.0 | 1 × 10$^{13}$ | 80 | 85 | X | ○ | 2H | X | X | X | ○ |
| Ex. C9 | 3.5 | 3.0 | 94.0 | 1 × 10$^8$ | 40 | 60 | ○ | X | B | ○ | X | X | X |
| Ex. C10 | 1.0 | 0.7 | 95.5 | 1 × 10$^{13}$ | 50 | 60 | X | X | 2H | X | X | X | X |
| Ex. C11 | 2.0 | 3.0 | 93.0 | 1 × 10$^9$ | 30 | 30 | X | X | B | X | X | X | X |
| Ex. C12 | 1.0 | 0.1 | 96.0 | 1 × 10$^{13}$ | 80 | 85 | ○ | ○ | 2H | ○ | X | X | ○ |
| Ex. C13 | 3.0 | 7.5 | 93.0 | 1 × 10$^9$ | 40 | 50 | ○ | X | B | ○ | X | X | X |
| Ex. C14 | 3.0 | 7.5 | 93.0 | 1 × 10$^9$ | 40 | 50 | ○ | X | B | ○ | X | X | X |
| Ex. C15 | 2.0 | 0.5 | 93.0 | 5 × 10$^{13}$ | 50 | 70 | X | X | 2H | X | X | X | X |
| Ex. C16 | 3.5 | 2.0 | 92.0 | 1 × 10$^9$ | 50 | 85 | ○ | X | 2H | ○ | ○ | ○ | ○ |

The following evaluation was further performed.
[Confirmation of Presence/Absence of Recoating Layer by XPS]

For the antireflection film obtained in <Example A1> and the antireflection film obtained in <Example A16>, surface analysis was conducted of the surface of the uneven distribution layer before formation of the low refractive index layer, using an X-ray photoelectron spectrometer (JPS-90MXV micro (manufactured by JEOL Ltd.)). In the measurement, the X-ray intensity was 100 W (10 kV, 10 mA).

As a result of the analysis, C and O were detected but no Cl was detected from the surface of the uneven distribution layer of the antireflection film of <Example A1>. On the other hand, C, N, O and Cl were detected from the surface of the uneven distribution layer of the antireflection film of <Example A16>. This indicates that, in the antireflection film of <Example A1>, a recoating layer without containing the quaternary ammonium salt material is formed in the outermost layer of the uneven distribution layer.

Further, for the antireflection film obtained in <Example B1> and the antireflection film obtained in <Example B17>, surface analysis was conducted of the surface of the uneven distribution layer before formation of the low refractive index layer, using an X-ray photoelectron spectrometer (JPS-90MXV micro (manufactured by JEOL Ltd.)). In the measurement, the X-ray intensity was 100 W (10 kV, 10 mA). As a result of the analysis, C, O and F were detected but no Cl was detected from the surface of the uneven distribution layer of the antireflection film of <Example B1>. On the other hand, C, N, O and Cl were detected from the surface of the uneven distribution layer of the antireflection film of <Example B17>. This indicates that, in the antireflection film of <Example B1>, a recoating layer without containing the quaternary ammonium salt material is formed in the outermost layer of the uneven distribution layer.

Further, for the antireflection film obtained in <Example C1> and the antireflection film obtained in <Example C16>, surface analysis was conducted of the surface of the uneven distribution layer before formation of the low refractive index layer, using an X-ray photoelectron spectrometer (JPS-90MXV micro (manufactured by JEOL Ltd.)). In the measurement, the X-ray intensity was 100 W (10 kV, 10 mA). As a result of the analysis, C, O and Si were detected but no Cl was detected from the surface of the uneven distribution layer of the antireflection film of <Example C1>. On the other hand, C, N, O and Cl were detected from the surface of the uneven distribution layer of the antireflection film of <Example C16>. This indicates that, in the antireflection film of <Example C1>, a recoating layer without containing the quaternary ammonium salt material is formed in the outermost layer of the uneven distribution layer.

<<Text D to Test F>>

Test D, Text E and Test F are related to the second embodiment.

<<Method of Fabricating Antireflection Film>>

<Test D>

Hereinafter is described a Case (D) in which a compound having an acryl group is used as the leveling material in the recoating layer.

First, preparation of uneven-distribution-layer-forming coating liquids D1 to D10 are shown below.

(Uneven-Distribution-Layer-Forming Coating Liquid D1)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass BYK-350 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid D1.

(Uneven-Distribution-Layer-Forming Coating Liquid D2)

For 100 parts by mass of urethane acrylate (UA-53 manufactured by Shin Nakamura Chemical Co., Ltd.),
Phosphorus-containing tin oxide (average particle size 100 nm/isopropyl alcohol dispersion liquid) (solid matter): 5 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid D2.

(Uneven-Distribution-Layer-Forming Coating Liquid D3)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid) (solid matter): 5 parts by mass
BYK-352 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid D3.

(Uneven-Distribution-Layer-Forming Coating Liquid D4)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 0.01 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid D4.

(Uneven-Distribution-Layer-Forming Coating Liquid D5)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 300 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid D5.

(Uneven-Distribution-Layer-Forming Coating Liquid D6)

For 100 parts by mass of urethane acrylate (UA-53 manufactured by Shin Nakamura Chemical Co., Ltd.),
Antimony-containing tin oxide (average particle size 5,000 nm/isopropyl alcohol dispersion liquid): (solid matter) 5 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid D6.

(Uneven-Distribution-Layer-Forming Coating Liquid D7)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 5 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using ethanol so as to contain 50 parts by mass of solid matter, thereby obtaining an uneven-distribution-layer-forming coating liquid D7.

(Uneven-Distribution-Layer-Forming Coating Liquid D8)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 5 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 20 parts by mass of solid matter, thereby obtaining an uneven-distribution-layer-forming coating liquid D8.

(Uneven-Distribution-Layer-Forming Coating Liquid D9)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 5 parts by mass
BYK-350 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 90 parts by mass of solid matter, thereby obtaining an uneven-distribution-layer-forming coating liquid D9.

(Uneven-Distribution-Layer-Forming Coating Liquid D10)
For 100 parts by mass of urethane acrylate (UA-53 manufactured by Shin Nakamura Chemical Co., Ltd.),
  Antimony-containing tin oxide (average particle size 100 nm/isopropyl alcohol dispersion liquid): (solid matter) 5 parts by mass
  Dipentaerythritol triacrylate: 50 parts by mass
  Pentaerythritol tetraacrylate: 50 parts by mass
  Photopolymerization initiator (Irgacure 184 manufactured by Chiba Japan Co., Ltd.): 10 parts by mass
were made available. These were adjusted using methyl acetate so as to contain 50 parts by mass of solid matter, thereby obtaining an uneven-distribution-layer-forming coating liquid D10.

(Uneven-Distribution-Layer-Forming Coating Liquid D11)
For 100 parts by mass of urethane acrylate (UA-53 manufactured by Shin Nakamura Chemical Co., Ltd.),
  BYK-350 (manufactured by BYK Japan KK): 0.1 parts by mass
  Dipentaerythritol triacrylate: 50 parts by mass
  Pentaerythritol tetraacrylate: 50 parts by mass
  Photopolymerization initiator (Irgacure 184 manufactured by Chiba Japan Co., Ltd.): 10 parts by mass
were made available. These were adjusted using methyl acetate so as to contain 50 parts by mass of solid matter, thereby obtaining an uneven-distribution-layer-forming coating liquid D11.

Preparation of a low-refractive-index-layer-forming coating liquid D is shown below.

(Low-Refractive-Index-Layer-Forming Coating Liquid)
For 100 parts by mass of methyl isobutyl ketone,
  Dispersion liquid of porous silica microparticles (average particle size 50 nm, solid matter 20%, solvent: methyl isobutyl ketone): 18.0 parts by mass
  EO-modified dipentaerythritol hexaacrylate (product name: DPEA-12 manufactured by Nippon Kayaku Co., Ltd.): 2.5 parts by mass
  Photopolymerization initiator (Irgacure 184 manufactured by Chiba Japan Co., Ltd.): 0.1 parts by mass
were used to prepare the low-refractive-index-layer-forming coating liquid D.

Example D1

(Formation of Uneven Distribution Layer)

The uneven-distribution-layer-forming coating liquid D1 was applied to one surface of a triacetylcellulose film (manufactured by FUJIFILM Corporation: thickness 80 μm). The resultant film was dried, as primary drying, in a drying oven at a temperature of 25° C. for 10 seconds, successively followed by drying, as secondary drying, in a drying oven at a temperature of 80° C. for 60 seconds. After drying, an ultraviolet beam, with an exposure of 300 mJ/m², was applied thereto using an ultraviolet beam applicator (light source H-Bulb manufactured by Fusion UV Systems Japan K.K.), thereby obtaining a transparent uneven distribution layer having a dried thickness of 6 μm.

(Formation of Low Refractive Index Layer)

The low-refractive-index-layer-forming coating liquid A was applied onto the uneven distribution layer as formed, so that the thickness after drying would be 100 nm. The resultant layer was dried at a temperature of 25° C. for 25 seconds, followed by drying at a temperature of 80° C. for 50 seconds. After that, an ultraviolet beam, with an exposure of 300 mJ/m², was applied thereto using an ultraviolet beam applicator (light source H-Bulb manufactured by Fusion UV Systems Japan K.K.), for curing to form a low refractive index layer, thereby fabricating an antireflection film of <Example D1>.

Example D2 to Example D9

Antireflection films of <Example D2> to <Example D9> were fabricated under manufacturing conditions similar to <Example D1>, excepting that the uneven-distribution-layer-forming coating liquids D2 to D9 were used instead of the uneven-distribution-layer-forming coating liquid D1.

Example D10

(Formation of Hard Coating Layer)

The uneven-distribution-layer-forming coating liquid D1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 0.6

(Formation of Low Refractive Index Layer)

Then, a low refractive index layer was formed on an upper layer of the hard coating layer. The low-refractive-index-layer-forming coating liquid D was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example D11

(Formation of Hard Coating Layer)

The uneven-distribution-layer-forming coating liquid D1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m², was applied to the film using an ultraviolet beam applicator (light source H-Bulb, Fusion UV Systems Japan K.K.), thereby forming a transparent hard coating layer having a dried thickness of 20

(Formation of Low Refractive Index Layer)

Then, a low refractive index layer was formed on an upper layer of the hard coating layer. The low-refractive-index-layer-foaming coating liquid D was applied to the hard coating layer so that the thickness after drying would be 100 nm. After coating, the resultant layer was dried at a temperature of 80° C. for 60 seconds. Further, an ultraviolet beam, with an exposure of 300 mJ/m², was applied thereto using an ultraviolet beam applicator (light source H-Bulb, Fusion UV Systems Japan K.K.), for curing to form a low refractive index layer, thereby fabricating an antireflection film.

Example D12

(Formation of Hard Coating Layer)

The uneven-distribution-layer-forming coating liquid D1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 5 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid D was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film

Example D13

(Formation of Hard Coating Layer)

The uneven-distribution-layer-forming coating liquid D1 was applied to one surface of a TAC film (thickness 80 followed by drying at a temperature of 25° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid D was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example D14

(Formation of Hard Coating Layer)

The uneven-distribution-layer-forming coating liquid D1 was applied to one surface of a TAC film (thickness 80 μm), followed by drying at a temperature of 80° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid D was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example D15

An antireflection film of <Example D15> was fabricated in a manner similar to <Example D1>, excepting that the uneven-distribution-layer-forming liquid D10 was used instead of the uneven-distribution-layer-forming liquid D1.

Example D16

An antireflection film of <Example D16> was fabricated in a manner similar to <Example D1>, excepting that the uneven-distribution-layer-forming liquid D11 was used instead of the uneven-distribution-layer-forming liquid D1.

Table 7 shows components and manufacturing conditions used in <Example D1> to <Example D16>.

TABLE 7

| | Uneven-distr.-layer-forming coating liquid | Low-refractive-layer-forming coating liquid | Manufacturing conditions | | | Leveling material |
|---|---|---|---|---|---|---|
| | | | Metal oxide microparticles | | | |
| | | | Mat. name | Particle size | Quantity | Mat. name |
| Ex. D1 | Uneven-distr.-layer-forming coating liquid D1 | Low-refractive-layer-forming coating liquid D | ATO | 100 | 5 parts by mass | BYK-350 |
| Ex. D2 | Uneven-distr.-layer-forming coating liquid D2 | Low-refractive-layer-forming coating liquid D | PTO | 100 | 5 parts by mass | BYK-350 |
| Ex. D3 | Uneven-distr.-layer-forming coating liquid D3 | Low-refractive-layer-forming coating liquid D | ATO | 100 | 5 parts by mass | BYK-352 |
| Ex. D4 | Uneven-distr.-layer-forming coating liquid D4 | Low-refractive-layer-forming coating liquid D | ATO | 100 | 0.01 parts by mass | BYK-350 |
| Ex. D5 | Uneven-distr.-layer-forming coating liquid D5 | Low-refractive-layer-forming coating liquid D | ATO | 100 | 300 parts by mass | BYK-350 |

TABLE 7-continued

| | Uneven-distr.-layer-forming coating liquid | Low-refractive-layer-forming coating liquid | | | | |
|---|---|---|---|---|---|---|
| Ex. D6 | Uneven-distr.-layer-forming coating liquid D6 | Low-refractive-layer-forming coating liquid D | ATO | 5,000 | 5 parts by mass | BYK-350 |
| Ex. D7 | Uneven-distr.-layer-forming coating liquid D7 | Low-refractive-layer-forming coating liquid D | ATO | 100 | 5 parts by mass | BYK-350 |
| Ex. D8 | Uneven-distr.-layer-forming coating liquid D8 | Low-refractive-layer-forming coating liquid D | ATO | 100 | 5 parts by mass | BYK-350 |
| Ex. D9 | Uneven-distr.-layer-forming coating liquid D9 | Low-refractive-layer-forming coating liquid D | ATO | 100 | 5 parts by mass | BYK-350 |
| Ex. D10 | Uneven-distr.-layer-forming coating liquid D1 | Low-refractive-layer-forming coating liquid D | ATO | 100 | 5 parts by mass | BYK-350 |
| Ex. D11 | Uneven-distr.-layer-forming coating liquid D1 | Low-refractive-layer-forming coating liquid D | ATO | 100 | 5 parts by mass | BYK-350 |
| Ex. D12 | Uneven-distr.-layer-forming coating liquid D1 | Low-refractive-layer-forming coating liquid D | ATO | 100 | 5 parts by mass | BYK-350 |
| Ex. D13 | Uneven-distr.-layer-forming coating liquid D1 | Low-refractive-layer-forming coating liquid D | ATO | 100 | 5 parts by mass | BYK-350 |
| Ex. D14 | Uneven-distr.-layer-forming coating liquid D1 | Low-refractive-layer-forming coating liquid D | ATO | 100 | 5 parts by mass | BYK-350 |
| Ex. D15 | Uneven-distr.-layer-forming coating liquid D10 | Low-refractive-layer-forming coating liquid D | ATO | 100 | 5 parts by mass | — |
| Ex. D16 | Uneven-distr.-layer-forming coating liquid D11 | Low-refractive-layer-forming coating liquid D | — | — | — | BYK-350 |

| | | Manufacturing conditions | | | | | |
|---|---|---|---|---|---|---|---|
| | Thickness of uneven distr. layer | Diluting solvent | | Drying temp. | | Drying time | |
| | | Mat. name | Solid matter adjustment | Prim. drying temp. | Sec. drying temp. | Prim. drying time | Sec. drying time |
| Ex. D1 | 6 μm | Methyl acetate | 50% | 25° C. | 80° C. | 10 sec. | 60 sec. |
| Ex. D2 | 6 μm | Methyl acetate | 50% | 25° C. | 80° C. | 10 sec. | 60 sec. |
| Ex. D3 | 6 μm | Methyl acetate | 50% | 25° C. | 80° C. | 10 sec. | 60 sec. |
| Ex. D4 | 6 μm | Methyl acetate | 50% | 25° C. | 80° C. | 10 sec. | 60 sec. |
| Ex. D5 | 6 μm | Methyl acetate | 50% | 25° C. | 80° C. | 10 sec. | 60 sec. |
| Ex. D6 | 6 μm | Methyl acetate | 50% | 25° C. | 80° C. | 10 sec. | 60 sec. |
| Ex. D7 | 6 μm | Ethanol | 50% | 25° C. | 80° C. | 10 sec. | 60 sec. |
| Ex. D8 | 6 μm | Methyl acetate | 20% | 25° C. | 80° C. | 10 sec. | 60 sec. |
| Ex. D9 | 6 μm | Methyl acetate | 90% | 25° C. | 80° C. | 10 sec. | 60 sec. |
| Ex. D10 | 0.5 μm | Methyl acetate | 50% | 25° C. | 80° C. | 10 sec. | 60 sec. |
| Ex. D11 | 20 μm | Methyl acetate | 50% | 25° C. | 80° C. | 10 sec. | 60 sec. |
| Ex. D12 | 6 μm | Methyl acetate | 50% | 25° C. | 80° C. | 10 sec. | 5 sec. |
| Ex. D13 | 6 μm | Methyl acetate | 50% | 25° C. | | 70 sec. | |
| Ex. D14 | 6 μm | Methyl acetate | 50% | 80° C. | | 70 sec. | |
| Ex. D15 | 6 μm | Methyl acetate | 50% | 25° C. | 80° C. | 10 sec. | 60 sec. |
| Ex. D16 | 6 μm | Methyl acetate | 50% | 25° C. | 80° C. | 10 sec. | 60 sec. |

The evaluation described above was performed of the obtained antireflection films of <Example D1> to <Example D16>. The results of the evaluation are shown in Table 8.

TABLE 8

| | Items of Evaluation | | | | | | | | Status of forming uneven distribution layer | | | |
|---|---|---|---|---|---|---|---|---|---|---|---|---|
| | Luminous reflectance (%) | Haze (%) | Parallel light transmittance (%) | Surface resistance (Ω/cm²) | Contact angle (°) | | Color var. and interference band | Abrasion resistance (SW) | Pencil hardness | Middle layer | Hard coating layer | Result of cross sectional EDX | Recoating layer |
| | | | | | Sur. of uneven distr. layer | Sur. of low refractive index layer | | | | | | | |
| Ex. D1 | 0.8 | 0.1 | 95.0 | 1 × 10⁹ | 75 | 85 | ○ | ○ | 2H | ○ | ○ | ○ | ○ |
| Ex. D2 | 0.8 | 0.1 | 95.0 | 1 × 10⁹ | 75 | 85 | ○ | ○ | 2H | ○ | ○ | ○ | ○ |
| Ex. D3 | 0.8 | 0.1 | 95.0 | 1 × 10⁹ | 75 | 85 | ○ | ○ | 2H | ○ | ○ | ○ | ○ |
| Ex. D4 | 1.0 | 0.1 | 95.6 | 1 × 10¹³ | 75 | 85 | ○ | ○ | 2H | ○ | ○ | ○ | ○ |
| Ex. D5 | 3.0 | 5.0 | 93.0 | 1 × 10⁹ | 50 | 60 | ○ | X | B | ○ | X | X | X |
| Ex. D6 | 4.0 | 6.0 | 93.0 | 1 × 10⁹ | 50 | 60 | ○ | X | B | ○ | X | X | X |
| Ex. D7 | 0.9 | 0.1 | 95.0 | 1 × 10¹³ | 75 | 85 | X | ○ | 2H | X | X | X | ○ |
| Ex. D8 | 3.5 | 3.0 | 92.0 | 1 × 10⁸ | 40 | 60 | ○ | X | B | ○ | X | X | X |
| Ex. D9 | 3.0 | 3.0 | 92.0 | 1 × 10¹³ | 50 | 60 | X | X | 2H | X | X | X | X |
| Ex. D10 | 2.0 | 3.0 | 93.0 | 1 × 10⁹ | 30 | 30 | X | X | B | X | X | X | X |
| Ex. D11 | 0.8 | 0.1 | 96.0 | 1 × 10¹³ | 75 | 85 | ○ | ○ | 2H | ○ | X | X | ○ |
| Ex. D12 | 3.0 | 7.5 | 90.0 | 1 × 10⁹ | 40 | 50 | ○ | X | B | ○ | X | X | X |
| Ex. D13 | 3.0 | 7.5 | 90.0 | 1 × 10⁹ | 40 | 50 | ○ | X | B | ○ | X | X | X |
| Ex. D14 | 2.0 | 0.5 | 92.0 | 5 × 10¹³ | 50 | 70 | X | X | 2H | X | X | X | X |
| Ex. D15 | 3.5 | 2.0 | 92.0 | 1 × 10⁹ | 50 | 50 | ○ | X | 2H | ○ | ○ | ○ | — |
| Ex. D16 | 1.0 | 0.1 | 96.0 | 1 × 10¹³ | 70 | 85 | ○ | ○ | 2H | ○ | ○ | — | ○ |

<Test E>

Hereinafter is described a Case (E) in which a compound having a fluorine group is used as the leveling material in the recoating layer.

First, preparation of uneven-distribution-layer-forming coating liquids E1 to E10 is shown below.

(Uneven-Distribution-Layer-Forming Coating Liquid E1)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E1.

(Uneven-Distribution-Layer-Forming Coating Liquid E2)

For 100 parts by mass of urethane acrylate (UA-53 manufactured by Shin Nakamura Chemical Co., Ltd.), Phosphorus-containing tin oxide (average particle size 100 nm/isopropyl alcohol dispersion liquid): (solid matter) 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E2.

(Uneven-Distribution-Layer-Forming Coating Liquid E3)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass F489 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E3.

(Uneven-Distribution-Layer-Forming Coating Liquid E4)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass Ftergent 222F (manufactured by Neos Company Limited): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E4.

(Uneven-Distribution-Layer-Forming Coating Liquid E5)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 0.01 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E5.

(Uneven-Distribution-Layer-Forming Coating Liquid E6)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 300 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E6.

(Uneven-Distribution-Layer-Forming Coating Liquid E7)

For 100 parts by mass of urethane acrylate (UA-53 manufactured by Shin Nakamura Chemical Co., Ltd.), Antimony-containing tin oxide (average particle size 5,000 nm/isopropyl alcohol dispersion liquid): (solid matter) 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E7.

(Uneven-Distribution-Layer-Forming Coating Liquid E8)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using ethanol so as to contain 50 parts by mass of solid matter, thereby obtaining an uneven-distribution-layer-forming coating liquid E8.

(Uneven-Distribution-Layer-Forming Coating Liquid E9)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 20 parts by mass of solid matter, thereby obtaining an uneven-distribution-layer-forming coating liquid E9.

(Uneven-Distribution-Layer-Forming Coating Liquid E10)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 90 parts by mass of solid matter, thereby obtaining an uneven-distribution-layer-forming coating liquid E10.

(Uneven-Distribution-Layer-Forming Coating Liquid E11)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E11.

(Uneven-Distribution-Layer-Forming Coating Liquid E12)

For 100 parts by mass of urethane acrylate (UA-53 manufactured by Shin Nakamura Chemical Co., Ltd.), F470 (manufactured by DIC Corporation): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid E12.

Hereinafter are shown examples of preparation of a low-refractive-index-layer-forming coating liquid E.

(Low-Refractive-Index-Layer-Forming Coating Liquid E)

For 100 parts by mass of methyl isobutyl ketone,

Dispersion liquid of porous silica microparticles (average particle size 50 nm, solid matter 20%, solvent: methyl isobutyl ketone): 18.0 parts by mass EO-modified dipentaerythritol hexaacrylate (product name. DPEA-12 manufactured by Nippon Kayaku Co., Ltd.): 2.5 parts by mass Photopolymerization initiator (Irgacure 184 manufactured by Chiba Japan Co., Ltd.): 0.1 parts by mass were used to prepare the low-refractive-index-layer-forming coating liquid E.

Example E1

(Formation of Uneven Distribution Layer)

The uneven-distribution-layer-forming coating liquid B1 was applied to one surface of a triacetylcellulose film (manufactured by FUJIFILM Corporation: thickness 80 µm). The resultant film was dried, as primary drying, in a drying oven at a temperature of 25° C. for 10 seconds, successively followed by drying, as secondary drying, in a drying oven at a temperature of 80° C. for 60 seconds. After drying, an ultraviolet beam, with an exposure of 300 mJ/m$^2$, was applied thereto using an ultraviolet beam applicator (light source H-Bulb manufactured by Fusion UV Systems Japan K.K.), thereby obtaining a transparent uneven distribution layer having a dried thickness of 6 µm.
(Formation of Low Refractive Index Layer)

The low-refractive-index-layer-forming coating liquid E was applied onto the uneven distribution layer as formed, so that the thickness after drying would be 100 nm. The resultant layer was dried, as primary drying, at a temperature of 25° C. for 25 seconds, followed by drying, as secondary drying, at a temperature of 80° C. for 50 seconds. After that, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film of <Example E1>.

Example E2> to <Example E10

Antireflection films of <Example E2> to <Example E10> were fabricated in a manner similar to <Example E1>, excepting that the uneven-distribution-layer-forming coating liquids E2 to E10 were used instead of the uneven-distribution-layer-forming coating liquid E1.

Example E11

(Formation of Hard Coating Layer)

The uneven-distribution-layer-forming coating liquid E1 was applied to one surface of a TAC film (thickness 80 µm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 0.5 µm.
(Formation of Low Refractive Index Layer)

Then, a low refractive index layer was formed on an upper layer of the hard coating layer. The low-refractive-index-layer-forming coating liquid E was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example E12

(Formation of Hard Coating Layer)

The uneven-distribution-layer-forming coating liquid E1 was applied to one surface of a TAC film (thickness 80 µm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 20 µm.
(Formation of Low Refractive Index Layer)

Then, a low refractive index layer was formed on an upper layer of the hard coating layer. The low-refractive-index-layer-forming coating liquid E was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb, Fusion UV Systems Japan K.K.), for curing to form a low refractive index layer, thereby fabricating an antireflection film.

Example E13

(Formation of Hard Coating Layer)

The uneven-distribution-layer-forming coating liquid E1 was applied to one surface of a TAC film (thickness 80 µm). Then, the film was dried, as primary drying, in a drying oven at a temperature of 25° C. for 10 seconds, successively followed by drying, as secondary drying, at a temperature of 80° C. for 5 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6
(Formation of Low Refractive Index Layer)

Then, a low refractive index layer was formed on an upper layer of the hard coating layer. The low-refractive-index-layer-forming coating liquid E was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example E14

(Formation of Hard Coating Layer)

The uneven-distribution-layer-forming coating liquid E1 was applied to one surface of a TAC film (thickness 80 µm). Then, the film was dried at a temperature of 25° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 µm.
(Formation of Low Refractive Index Layer)

Then, a low refractive index layer was formed on an upper layer of the hard coating layer. The low-refractive-index-layer-forming coating liquid E was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example E15

(Formation of Hard Coating Layer)

The uneven-distribution-layer-forming coating liquid E1 was applied to one surface of a TAC film (thickness 80 μm). Then, the film was dried at a temperature of 80° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.

(Formation of Low Refractive Index Layer)

Then, a low refractive index layer was formed on an upper layer of the hard coating layer. The low-refractive-index-layer-forming coating liquid E was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example E16

An antireflection film of <Example E16> was fabricated in a manner similar to <Example E1>, excepting that the uneven-distribution-layer-forming coating liquid E11 was used instead of the uneven-distribution-layer-forming coating liquid E1.

Example E17

An antireflection film of <Example E17> was fabricated in a manner similar to <Example E1>, excepting that the uneven-distribution-layer-forming coating liquid E12 was used instead of the uneven-distribution-layer-forming coating liquid E1.

Table 9 shows components and manufacturing conditions used in <Example E1> to <Example E17>.

TABLE 9

| | Manufacturing conditions | | | | | |
|---|---|---|---|---|---|---|
| | Uneven-distr.-layer-forming coating liquid | Low-refractive-layer-forming coating liquid | Metal oxide microparticles | | | Leveling material |
| | | | Mat. name | Particle size | Quantity | Mat. name |
| Ex. E1 | Uneven-distr.-layer-forming coating liquid E1 | Low-refractive-layer-forming coating liquid E | ATO | 100 | 5 parts by mass | F470 |
| Ex. E2 | Uneven-distr.-layer-forming coating liquid E2 | Low-refractive-layer-forming coating liquid E | PTO | 100 | 5 parts by mass | F470 |
| Ex. E3 | Uneven-distr.-layer-forming coating liquid E3 | Low-refractive-layer-forming coating liquid E | ATO | 100 | 5 parts by mass | F470 |
| Ex. E4 | Uneven-distr.-layer-forming coating liquid E4 | Low-refractive-layer-forming coating liquid E | ATO | 100 | 5 parts by mass | Ftergent 222F |
| Ex. E5 | Uneven-distr.-layer-forming coating liquid E5 | Low-refractive-layer-forming coating liquid E | ATO | 100 | 0.01 parts by mass | F470 |
| Ex. E6 | Uneven-distr.-layer-forming coating liquid E6 | Low-refractive-layer-forming coating liquid E | ATO | 100 | 300 parts by mass | F470 |
| Ex. E7 | Uneven-distr.-layer-forming coating liquid E7 | Low-refractive-layer-forming coating liquid E | ATO | 5,000 | 5 parts by mass | F470 |
| Ex. E8 | Uneven-distr.-layer-forming coating liquid E8 | Low-refractive-layer-forming coating liquid E | ATO | 100 | 5 parts by mass | F470 |
| Ex. E9 | Uneven-distr.-layer-forming coating liquid E9 | Low-refractive-layer-forming coating liquid E | ATO | 100 | 5 parts by mass | F470 |
| Ex. E10 | Uneven-distr.-layer-forming coating liquid E10 | Low-refractive-layer-forming coating liquid E | ATO | 100 | 5 parts by mass | F470 |
| Ex. E11 | Uneven-distr.-layer-forming coating liquid E1 | Low-refractive-layer-forming coating liquid E | ATO | 100 | 5 parts by mass | F470 |
| Ex. E12 | Uneven-distr.-layer-forming coating liquid E1 | Low-refractive-layer-forming coating liquid E | ATO | 100 | 5 parts by mass | F470 |
| Ex. E13 | Uneven-distr.-layer-forming coating liquid E1 | Low-refractive-layer-forming coating liquid E | ATO | 100 | 5 parts by mass | F470 |
| Ex. E14 | Uneven-distr.-layer-forming coating liquid E1 | Low-refractive-layer-forming coating liquid E | ATO | 100 | 5 parts by mass | F470 |
| Ex. E15 | Uneven-distr.-layer-forming coating liquid E1 | Low-refractive-layer-forming coating liquid E | ATO | 100 | 5 parts by mass | F470 |

TABLE 9-continued

| | | | | | | |
|---|---|---|---|---|---|---|
| Ex. E16 | Uneven-distr.-layer-forming coating liquid E11 | Low-refractive-layer-forming coating liquid E | ATO | 100 | 5 parts by mass | — |
| Ex. E17 | Uneven-distr.-layer-forming coating liquid E12 | Low-refractive-layer-forming coating liquid E | — | — | — | F470 |

| | Manufacturing conditions | | | | | | |
|---|---|---|---|---|---|---|---|
| | Thickness of uneven distr. layer | Diluting solvent | | Drying temp. | | Drying time | |
| | | Mat. name | Solid matter adjustment | Prim. drying temp. | Sec. drying temp. | Prim. drying time | Sec. drying time |
| Ex. E1 | 6 μm | Methyl acetate | 50% | 25° C. | 80° C. | 10 sec. | 50 sec. |
| Ex. E2 | 6 μm | Methyl acetate | 50% | 25° C. | 80° C. | 10 sec. | 50 sec. |
| Ex. E3 | 6 μm | Methyl acetate | 50% | 25° C. | 80° C. | 10 sec. | 50 sec. |
| Ex. E4 | 6 μm | Methyl acetate | 50% | 25° C. | 80° C. | 10 sec. | 50 sec. |
| Ex. E5 | 6 μm | Methyl acetate | 50% | 25° C. | 80° C. | 10 sec. | 50 sec. |
| Ex. E6 | 6 μm | Methyl acetate | 50% | 25° C. | 80° C. | 10 sec. | 50 sec. |
| Ex. E7 | 6 μm | Methyl acetate | 50% | 25° C. | 80° C. | 10 sec. | 50 sec. |
| Ex. E8 | 6 μm | Ethanol | 50% | 25° C. | 80° C. | 10 sec. | 50 sec. |
| Ex. E9 | 6 μm | Methyl acetate | 20% | 25° C. | 80° C. | 10 sec. | 50 sec. |
| Ex. E10 | 6 μm | Methyl acetate | 90% | 25° C. | 80° C. | 10 sec. | 50 sec. |
| Ex. E11 | 0.5 μm | Methyl acetate | 50% | 25° C. | 80° C. | 10 sec. | 60 sec. |
| Ex. E12 | 20 μm | Methyl acetate | 50% | 25° C. | 80° C. | 10 sec. | 60 sec. |
| Ex. E13 | 6 μm | Methyl acetate | 50% | 25° C. | 80° C. | 10 sec. | 5 sec. |
| Ex. E14 | 6 μm | Methyl acetate | 50% | 25° C. | | 70 sec. | |
| Ex. E15 | 6 μm | Methyl acetate | 50% | 80° C. | | 70 sec. | |
| Ex. E16 | 6 μm | Methyl acetate | 50% | 25° C. | 80° C. | 10 sec. | 50 sec. |
| Ex. E17 | 6 μm | Methyl acetate | 50% | 25° C. | 80° C. | 10 sec. | 50 sec. |

The evaluation described above was performed of the obtained antireflection films of <Example E1> to <Example E17>. The results of the evaluation are shown in Table 10.

TABLE 10

| | Items of Evaluation | | | | | | | | Status of forming uneven distribution layer | | | |
|---|---|---|---|---|---|---|---|---|---|---|---|---|
| | | | | | Contact angle (° C.) | | Color var. and inter-ference band | | | | | |
| | Luminous reflectance (%) | Haze (%) | Parallel light trans-mittance (%) | Surface resistance (Ω/cm$^2$) | Sur. of uneven distr. layer | Sur. of low refractive index layer | | Abrasion resistance (SW) | Pencil hardness | Middle layer | Hard coating layer | Result of cross sectional EDX | Recoating layer |
| Ex. E1 | 0.8 | 0.1 | 95.0 | 1 × 10$^9$ | 75 | 90 | ◯ | ◯ | 2H | ◯ | ◯ | ◯ | ◯ |
| Ex. E2 | 0.8 | 0.1 | 95.0 | 1 × 10$^9$ | 75 | 90 | ◯ | ◯ | 2H | ◯ | ◯ | ◯ | ◯ |
| Ex. E3 | 0.8 | 0.1 | 95.0 | 1 × 10$^9$ | 75 | 90 | ◯ | ◯ | 2H | ◯ | ◯ | ◯ | ◯ |
| Ex. E4 | 0.8 | 0.1 | 95.0 | 1 × 10$^9$ | 75 | 90 | ◯ | ◯ | 2H | ◯ | ◯ | ◯ | ◯ |
| Ex. E5 | 1.0 | 0.1 | 95.6 | 1 × 10$^{13}$ | 75 | 90 | ◯ | ◯ | 2H | ◯ | ◯ | ◯ | ◯ |
| Ex. E6 | 3.0 | 5.0 | 93.0 | 1 × 10$^9$ | 50 | 50 | ◯ | X | B | ◯ | X | X | X |
| Ex. E7 | 4.0 | 6.0 | 93.0 | 1 × 10$^9$ | 50 | 50 | ◯ | X | B | ◯ | X | X | X |
| Ex. E8 | 0.9 | 0.1 | 95.0 | 1 × 10$^{13}$ | 75 | 90 | X | ◯ | 2H | X | X | X | ◯ |

TABLE 10-continued

| | Items of Evaluation | | | | | | | | | Status of forming uneven distribution layer | | | |
|---|---|---|---|---|---|---|---|---|---|---|---|---|---|
| | | | | | Contact angle (° C.) | | Color | | | | | | |
| | | | Parallel | | | Sur. of | var. | | | | | | |
| | Luminous reflectance (%) | Haze (%) | light trans- mittance (%) | Surface resistance ($\Omega/cm^2$) | Sur. of uneven distr. layer | low refractive index layer | and inter- ference band | Abrasion resistance (SW) | Pencil hardness | Middle layer | Hard coating layer | Result of cross sectional EDX | Recoating layer |
| Ex. E9 | 3.5 | 3.0 | 92.0 | $1 \times 10^8$ | 40 | 60 | ○ | X | B | ○ | X | X | X |
| Ex. E10 | 3.0 | 3.0 | 92.0 | $1 \times 10^{13}$ | 50 | 60 | X | X | 2H | X | X | X | X |
| Ex. E11 | 2.0 | 3.0 | 93.0 | $1 \times 10^9$ | 30 | 30 | X | X | B | X | X | X | X |
| Ex. E12 | 0.8 | 0.1 | 96.0 | $1 \times 10^{13}$ | 75 | 90 | ○ | ○ | 2H | ○ | X | X | ○ |
| Ex. E13 | 3.0 | 7.5 | 90.0 | $1 \times 10^9$ | 40 | 50 | ○ | X | B | ○ | X | X | X |
| Ex. E14 | 3.0 | 7.5 | 90.0 | $1 \times 10^9$ | 40 | 50 | ○ | X | B | ○ | X | X | X |
| Ex. E15 | 2.0 | 0.5 | 92.0 | $5 \times 10^{13}$ | 50 | 50 | X | X | 2H | X | X | X | X |
| Ex. E16 | 3.5 | 2.0 | 92.0 | $1 \times 10^9$ | 50 | 60 | ○ | X | 2H | ○ | ○ | ○ | — |
| Ex. E17 | 1.0 | 0.1 | 96.0 | $1 \times 10^{13}$ | 70 | 90 | ○ | ○ | 2H | ○ | ○ | — | ○ |

<Test F>

Hereinafter is described a Case (F) in which a compound having a siloxane bond is used as the leveling material in the recoating layer.

First, preparation of uneven-distribution-layer-forming coating liquids F1 to F10 is shown below.

(Uneven-Distribution-Layer-Forming Coating Liquid F1)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass BYK-UV3570 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F1.

(Uneven-Distribution-Layer-Forming Coating Liquid F2)

For 100 parts by mass of urethane acrylate (UA-53 manufactured by Shin Nakamura Chemical Co., Ltd.), Phosphorus-containing tin oxide (average particle size 100 nm/isopropyl alcohol dispersion liquid): (solid matter) 5 parts by mass BYK-3570 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F2.

(Uneven-Distribution-Layer-Forming Coating Liquid F3)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 5 parts by mass POLYFLOW KL401 (manufactured by Kyoeisha Chemical Co., Ltd.): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F3.

(Uneven-Distribution-Layer-Forming Coating Liquid F4)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 0.01 parts by mass BYK-UV3570 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F4.

(Uneven-Distribution-Layer-Forming Coating Liquid F5)

For 100 parts by mass of urethane acrylate (UA-53 manufactured by Shin Nakamura Chemical Co., Ltd.), Antimony-containing tin oxide (average particle size 100 nm/isopropyl alcohol dispersion liquid): (solid matter) 300 parts by mass BYK-3570 (manufactured by BYK Japan KK): 0.1 parts by mass Dipentaerythritol triacrylate: 50 parts by mass Pentaerythritol tetraacrylate: 50 parts by mass Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F5.

(Uneven-Distribution-Layer-Forming Coating Liquid F6)

For 100 parts by mass of urethane acrylate (UA-53 manufactured by Shin Nakamura Chemical Co., Ltd.), Antimony-containing tin oxide (average particle size 5,000 nm/isopropyl alcohol dispersion liquid): (solid matter) 5 parts by mass BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.: 10 parts by mass were made available. These were adjusted using methyl acetate so as to contain 50 parts by mass of solid matter, thereby obtaining an uneven-distribution-layer-forming coating liquid F6.

(Uneven-Distribution-Layer-Forming Coating Liquid F7)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 5 parts by mass
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using ethanol so as to contain 50 parts by mass of solid matter, thereby obtaining an uneven-distribution-layer-forming coating liquid F7.

(Uneven-Distribution-Layer-Forming Coating Liquid F8)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 5 parts by mass
BYK-3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 20 parts by mass of solid matter, thereby obtaining an uneven-distribution-layer-forming coating liquid F8.

(Uneven-Distribution-Layer-Forming Coating Liquid F9)

For 100 parts by mass of urethane acrylate (UA-53 manufactured by Shin Nakamura Chemical Co., Ltd.),
Antimony-containing tin oxide (average particle size 100 mu/isopropyl alcohol dispersion liquid): (solid matter) 5 parts by mass
BYK-3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 90 parts by mass of solid matter, thereby obtaining an uneven-distribution-layer-forming coating liquid F9.

(Uneven-Distribution-Layer-Forming Coating Liquid F10)

For 100 parts by mass of urethane acrylate (UA-53 manufactured by Shin Nakamura Chemical Co., Ltd.),
Antimony-containing tin oxide (average particle size 100 nm/isopropyl alcohol dispersion liquid): (solid matter) 5 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F10.

(Uneven-Distribution-Layer-Forming Coating Liquid F11)

For 100 parts by mass of urethane acrylate (UA-53 manufactured by Shin Nakamura Chemical Co., Ltd.),
BYK-UV3570 (manufactured by BYK Japan KK): 0.1 parts by mass
Dipentaerythritol triacrylate: 50 parts by mass
Pentaerythritol tetraacrylate: 50 parts by mass
Photopolymerization initiator (Irgacure 184 manufactured by Chiba Japan Co., Ltd.): 10 parts by mass were made available. These were adjusted using methyl acetate so as to contain 50 parts by mass of solid matter, thereby obtaining an uneven-distribution-layer-forming coating liquid F11.

Preparation of a low-refractive-index-layer-forming coating liquid F is shown below.

(Low-Refractive-Index-Layer-Forming Coating Liquid F)

For 100 parts by mass of methyl isobutyl ketone,
Dispersion liquid of porous silica microparticles (average particle size 50 nm, solid matter 20%, solvent: methyl isobutyl ketone): 18.0 parts by mass
EO-modified dipentaerythritol hexaacrylate (product name: DPEA-12 manufactured by Nippon Kayaku Co., Ltd.): 2.5 parts by mass
Photopolymerization initiator (product name: Irgacure 184 manufactured by Chiba Japan Co., Ltd.): 0.1 parts by mass were used to prepare the low-refractive-index-layer-forming coating liquid F.

Example F1

(Formation of Uneven Distribution Layer)

The uneven-distribution-layer-forming coating liquid F1 was applied to one surface of a triacetylcellulose film (manufactured by FUJIFILM Corporation: thickness 80 μm). The resultant film was dried, as primary drying, in a drying oven at a temperature of 25° C. for 10 seconds, successively followed by drying, as secondary drying, in a drying oven at a temperature of 80° C. for 60 seconds. After drying, an ultraviolet beam, with an exposure of 300 mJ/m$^2$, was applied thereto using an ultraviolet beam applicator (light source H-Bulb manufactured by Fusion UV Systems Japan K.K.), thereby obtaining a transparent uneven distribution layer having a dried thickness of 6 μm.

(Formation of Low Refractive Index Layer)

The low-refractive-index-layer-forming coating liquid F was applied onto the uneven distribution layer as formed, so that the thickness after drying would be 100 nm. The resultant layer was dried, as primary drying, at a temperature of 25° C. for 25 seconds, followed by drying, as secondary drying, at a temperature of 80° C. for 50 seconds. After that, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film of <Example F1>.

Example F2 to Example F9

Antireflection films of <Example F2> to <Example F9> were fabricated in a manner similar to <Example F1>, excepting that the uneven-distribution-layer-forming coating liquids F2 to F9 were used instead of the uneven-distribution-layer-forming coating liquid F1.

Example F10

(Formation of Hard Coating Layer)
The uneven-distribution-layer-forming coating liquid F1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 0.5 μm.
(Formation of Low Refractive Index Layer)
Then, a low refractive index layer was formed on an upper layer of the hard coating layer. The low-refractive-index-layer-forming coating liquid F was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example F11

(Formation of Hard Coating Layer)
The uneven-distribution-layer-forming coating liquid F1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 60 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 20 μm.
(Formation of Low Refractive Index Layer)
Then, a low refractive index layer was formed on an upper layer of the hard coating layer. The low-refractive-index-layer-forming coating liquid F was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example F12

(Formation of Hard Coating Layer)
The uneven-distribution-layer-forming coating liquid F1 was applied to one surface of a TAC film (thickness 80 μm). Then, the film was dried, as primary drying, in a drying oven at a temperature of 25° C. for 10 seconds, successively followed by drying, as secondary drying, at a temperature of 80° C. for 5 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.
(Formation of Low Refractive Index Layer)
Then, a low refractive index layer was formed on an upper layer of the hard coating layer. The low-refractive-index-layer-forming coating liquid F was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example F13

(Formation of Hard Coating Layer)
The uneven-distribution-layer-forming coating liquid F1 was applied to one surface of a TAC film (thickness 80 μm). Then, the film was dried at a temperature of 25° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.
(Formation of Low Refractive Index Layer)
Then, a low refractive index layer was formed on an upper layer of the hard coating layer. The low-refractive-index-layer-forming coating liquid F was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film.

Example F14

(Formation of Hard Coating Layer)
The uneven-distribution-layer-forming coating liquid F1 was applied to one surface of a TAC film (thickness 80 μm). Then, the film was dried at a temperature of 80° C. for 70 seconds. After drying, an ultraviolet beam, with an exposure of 300 mJ/m$^2$, was applied to the film using an ultraviolet beam applicator (light source H-Bulb, Fusion UV Systems Japan K.K.), thereby forming a transparent hard coating layer having a dried thickness of 6 μm.
(Formation of Low Refractive Index Layer)
Then, a low refractive index layer was formed on an upper layer of the hard coating layer. The low-refractive-index-layer-forming coating liquid F was applied to the hard coating layer so that the thickness after drying would be 100 nm. After coating, the resultant layer was dried at a temperature of 80° C. for 60 seconds. Further, an ultraviolet beam, with an exposure of 300 mJ/m$^2$, was applied thereto using an ultraviolet beam applicator (light source H-Bulb manufactured by Fusion UV Systems Japan K.K.), for curing to form a low refractive index layer, thereby fabricating an antireflection film An antireflection film of <Example F15> was fabricated in a manner similar to <Example F1>, excepting that the uneven-distribution-layer-forming coating liquid F10 was used instead of the uneven-distribution-layer-forming coating liquid F1.

An antireflection film of <Example F16> was fabricated in a manner similar to <Example F1>, excepting that the uneven-distribution-layer-forming coating liquid F11 was used instead of the uneven-distribution-layer-forming coating liquid F1.

Table 11 shows components and manufacturing conditions used in <Example F1> to <Example F16>.

TABLE 11

| | Uneven-distr.-layer-forming coating liquid | Low-refractive-layer-forming coating liquid | Metal oxide microparticles Mat. name | Particle size | Quantity | Leveling material Mat. name | Thickness of uneven distr. layer |
|---|---|---|---|---|---|---|---|
| Ex. F1 | Uneven-distr.-layer-forming coating liquid F1 | Low-refractive-layer-forming coating liquid F | ATO | 100 | 5 parts by mass | BYK-UV3570 | 6 μm |
| Ex. F2 | Uneven-distr.-layer-forming coating liquid F2 | Low-refractive-layer-forming coating liquid F | PTO | 100 | 5 parts by mass | BYK-UV3570 | 6 μm |
| Ex. F3 | Uneven-distr.-layer-forming coating liquid F3 | Low-refractive-layer-forming coating liquid F | ATO | 100 | 5 parts by mass | POLYFLOW KL401 | 6 μm |
| Ex. F4 | Uneven-distr.-layer-forming coating liquid F4 | Low-refractive-layer-forming coating liquid F | ATO | 100 | 0.01 parts by mass | BYK-UV3570 | 6 μm |
| Ex. F5 | Uneven-distr.-layer-forming coating liquid F5 | Low-refractive-layer-forming coating liquid F | ATO | 100 | 300 parts by mass | BYK-UV3570 | 6 μm |
| Ex. F6 | Uneven-distr.-layer-forming coating liquid F6 | Low-refractive-layer-forming coating liquid F | ATO | 5,000 | 5 parts by mass | BYK-UV3570 | 6 μm |
| Ex. F7 | Uneven-distr.-layer-forming coating liquid F7 | Low-refractive-layer-forming coating liquid F | ATO | 100 | 5 parts by mass | BYK-UV3570 | 6 μm |
| Ex. F8 | Uneven-distr.-layer-forming coating liquid F8 | Low-refractive-layer-forming coating liquid F | ATO | 100 | 5 parts by mass | BYK-UV3570 | 6 μm |
| Ex. F9 | Uneven-distr.-layer-forming coating liquid F9 | Low-refractive-layer-forming coating liquid F | ATO | 100 | 5 parts by mass | BYK-UV3570 | 6 μm |
| Ex. F10 | Uneven-distr.-layer-forming coating liquid F1 | Low-refractive-layer-forming coating liquid F | ATO | 100 | 5 parts by mass | BYK-UV3570 | 0.5 μm |
| Ex. F11 | Uneven-distr.-layer-forming coating liquid F1 | Low-refractive-layer-forming coating liquid F | ATO | 100 | 5 parts by mass | BYK-UV3570 | 20 μm |
| Ex. F12 | Uneven-distr.-layer-forming coating liquid F1 | Low-refractive-layer-forming coating liquid F | ATO | 100 | 5 parts by mass | BYK-UV3570 | 6 μm |
| Ex. F13 | Uneven-distr.-layer-forming coating liquid F1 | Low-refractive-layer-forming coating liquid F | ATO | 100 | 5 parts by mass | BYK-UV3570 | 6 μm |
| Ex. F14 | Uneven-distr.-layer-forming coating liquid F1 | Low-refractive-layer-forming coating liquid F | ATO | 100 | 5 parts by mass | BYK-UV3570 | 6 μm |
| Ex. F15 | Uneven-distr.-layer-forming coating liquid F10 | Low-refractive-layer-forming coating liquid F | ATO | 100 | 5 parts by mass | — | 6 μm |
| Ex. F16 | Uneven-distr.-layer-forming coating liquid F11 | Low-refractive-layer-forming coating liquid F | — | — | — | BYK-UV3570 | 6 μm |

| | Diluting solvent Mat. name | Solid matter adjustment | Prim. drying temp. | Sec. drying temp. | Prim. drying time | Sec. drying time |
|---|---|---|---|---|---|---|
| Ex. F1 | Methyl acetate | 50% | 25° C. | 80° C. | 10 sec. | 60 sec. |
| Ex. F2 | Methyl acetate | 50% | 25° C. | 80° C. | 10 sec. | 60 sec. |
| Ex. F3 | Methyl acetate | 50% | 25° C. | 80° C. | 10 sec. | 60 sec. |
| Ex. F4 | Methyl acetate | 50% | 25° C. | 80° C. | 10 sec. | 60 sec. |
| Ex. F5 | Methyl acetate | 50% | 25° C. | 80° C. | 10 sec. | 60 sec. |

TABLE 11-continued

|   |   |   |   |   |   |   |   |
|---|---|---|---|---|---|---|---|
| Ex. F6 | Methyl acetate | 50% | 25° C. | 80° C. | 10 sec. | 60 sec. |
| Ex. F7 | Ethanol | 50% | 25° C. | 80° C. | 10 sec. | 60 sec. |
| Ex. F8 | Methyl acetate | 20% | 25° C. | 80° C. | 10 sec. | 60 sec. |
| Ex. E9 | Methyl acetate | 90% | 25° C. | 80° C. | 10 sec. | 60 sec. |
| Ex. F10 | Methyl acetate | 50% | 25° C. | 80° C. | 10 sec. | 60 sec. |
| Ex. F11 | Methyl acetate | 50% | 25° C. | 80° C. | 10 sec. | 60 sec. |
| Ex. F12 | Methyl acetate | 50% | 25° C. | 80° C. | 10 sec. | 5 sec. |
| Ex. F13 | Methyl acetate | 50% | 25° C. | | 70 sec. | |
| Ex. F14 | Methyl acetate | 50% | 80° C. | | 70 sec. | |
| Ex. F15 | Methyl acetate | 50% | 25° C. | 80° C. | 10 sec. | 60 sec. |
| Ex. F16 | Methyl acetate | 50% | 25° C. | 80° C. | 10 sec. | 60 sec. |

The evaluation described above was performed of the obtained antireflection films of <Example F1> to <Example F16>.

Further, the following evaluation was performed.

[Confirmation of Refractive Index of Hard Coating Layer]

The refractive index of a hard coating layer was determined as having increased when the spectral reflectance calculated in the above item [Average luminous reflectance] was lowered by not less than 0.05%, compared to the antireflection films of the following examples, which do not contain metal oxide microparticles.

Compound having an acryl group: Example D16
Compound having a fluorine group: Example E17
Compound having a siloxane bond: Example F 16

[Confirmation of Presence/Absence of Recoating Layer by XPS]

Surface analysis was performed of the surface of the uneven distribution layer before forming the low refractive index layer in each of the antireflection films obtained in <Example D1>, <Example D16>, <Example E1>, <Example E17>, <Example F1> and <Example F16>, using an X-ray photoelectron spectrometer (JPS-90MXV micro (manufactured by JEOL Ltd.)). In the measurement, the X-ray intensity was 100 W (10 kV, 10 mA).

As a result of the analysis, C and O were detected but no Sn was detected from the surface of the uneven distribution layer of the antireflection film of <Example D1>. On the other hand, C, O and Sn were detected from the surface of the uneven distribution layer of the antireflection film of <Example D16>. This indicates that, in the antireflection film of <Example D1>, a recoating layer without containing the metal oxide microparticles is formed in the outermost layer of the uneven distribution layer.

Further, C, O and F were detected but no Sn was detected from the surface of the uneven distribution layer of the antireflection film of <Example E1>. On the other hand, C, O and Sn were detected from the surface of the uneven distribution layer of the antireflection film of <Example E17>. Sn is an element peculiar to metal oxide microparticles (ATO). Accordingly, this means that, in the antireflection film of <Example E1>, a recoating layer without containing the metal oxide microparticles is formed in the outermost layer of the uneven distribution layer.

Further, C, O and Si were detected but no Sn was detected from the surface of the uneven distribution layer of the antireflection film of <Example F1>. On the other hand, C, O and Sn were detected from the surface of the uneven distribution layer of the antireflection film of <Example F16>. Sn is an element peculiar to metal oxide microparticles (ATO). Accordingly, this means that, in the antireflection film of <Example F1>, a recoating layer without containing the metal oxide microparticles is formed in the outermost layer of the uneven distribution layer.

[Confirmation of Refractive Index by Measuring Spectral Reflectance]

Black coating was applied using a black matte spray to the surface opposite to the surface of the uneven distribution layer before forming the low refractive index layer and to the surface opposite to the surface of the low refractive index layer after forming the low refractive index layer, in each of the antireflection films obtained in <Example D1>, <Example D16>, <Example E1>, <Example E16>, <Example F1> and <Example F16>. After the coating, using an automatic spectrophotometer (U-4000 manufactured by Hitachi Ltd.), spectral reflectance at an incident angle of 5° was measured in the low-refractive-index-layer formed surface, under the conditions of C light source and two-degree field of view. The results are shown in FIGS. 4, 5, 8, 9, 12 and 13.

As a result of the measurement, the spectral reflectance in a visible region in the surface of the uneven distribution layer was higher in the antireflection film of <Example D1> than in the antireflection film of <Example D16>. This indicates that, in the surface of the uneven distribution layer, refractive index is higher in <Example D1> than in <Example D16>. Also, the spectral reflectance in a visible region in the surface of the low refractive index layer was lower in the antireflection film of <Example D1> than in the antireflection film of <Example D16>. This indicates that, due to the use of the same low-refractive-index-forming material, the high refractive index of the hard coating layer allowed lowering of the reflectance in the surface of the low refractive index layer.

The spectral reflectance in a visible region in the surface of the uneven distribution layer was higher in the antireflection film of <Example E1> than in the antireflection film of <Example E17>. This indicates that, in the surface of the uneven distribution layer, refractive index is higher in <Example E1> than in <Example E17>. Also, the spectral reflectance in a visible region in the surface of the low refractive index layer was lower in the antireflection film of <Example E1> than in the antireflection film of <Example E17>. This indicates that, due to the use of the same low-refractive-index-forming material, the high refractive index of the hard coating layer allowed lowering of the reflectance in the surface of the low refractive index layer.

The spectral reflectance in a visible region in the surface of the uneven distribution layer was higher in the antireflection film of <Example F1> than in the antireflection film of <Example F16>. This indicates that, in the surface of the uneven distribution layer, refractive index is higher in <Example F1> than in <Example F16>. Also, the spectral reflectance in a visible region in the surface of the low refractive index layer was lower in the antireflection film of <Example F1> than in the antireflection film of <Example F16>. This indicates that, due to the use of the same low-refractive-index-forming material, the high refractive index of the hard coating layer allowed lowering of the reflectance in the surface of the low refractive index layer.

Results of the evaluation are shown in Table 12.

TABLE 12

| | Items of Evaluation | | | | | | | | | Status of forming uneven distribution layer | | | |
|---|---|---|---|---|---|---|---|---|---|---|---|---|---|
| | | | | | Contact angle (° C.) | | | | | | | | |
| | Luminous reflectance (%) | Haze (%) | Parallel light transmittance (%) | Surface resistance ($\Omega/cm^2$) | Sur. of uneven distr. layer | Sur. of low refract-ive index layer | Color var. and interference band | Abrasion resistance (SW) | Pencil hard-ness | Middle layer | Hard coating layer | Result of cross sectional EDX | Re-coating layer |
| Ex. F1 | 0.8 | 0.1 | 95.0 | $1 \times 10^9$ | 75 | 90 | ○ | ○ | 2H | ○ | ○ | ○ | ○ |
| Ex. F2 | 0.8 | 0.1 | 95.0 | $1 \times 10^9$ | 75 | 90 | ○ | ○ | 2H | ○ | ○ | ○ | ○ |
| Ex. F3 | 0.8 | 0.1 | 95.0 | $1 \times 10^9$ | 75 | 90 | ○ | ○ | 2H | ○ | ○ | ○ | ○ |
| Ex. F4 | 1.0 | 0.1 | 95.6 | $1 \times 10^{13}$ | 75 | 90 | ○ | ○ | 2H | ○ | ○ | ○ | ○ |
| Ex. F5 | 3.0 | 5.0 | 93.0 | $1 \times 10^9$ | 50 | 60 | ○ | X | B | ○ | X | X | X |
| Ex. F6 | 4.0 | 6.0 | 93.0 | $1 \times 10^9$ | 50 | 60 | ○ | X | B | ○ | X | X | X |
| Ex. F7 | 0.9 | 0.1 | 95.0 | $1 \times 10^{13}$ | 75 | 90 | X | ○ | 2H | X | X | X | ○ |
| Ex. F8 | 3.5 | 3.0 | 92.0 | $1 \times 10^8$ | 40 | 60 | ○ | X | B | ○ | X | X | X |
| Ex. F9 | 3.0 | 3.0 | 92.0 | $1 \times 10^{13}$ | 50 | 60 | X | X | 2H | X | X | X | X |
| Ex. F10 | 2.0 | 3.0 | 93.0 | $1 \times 10^9$ | 30 | 30 | X | X | B | X | X | X | X |
| Ex. F11 | 0.8 | 0.1 | 96.0 | $1 \times 10^{13}$ | 75 | 90 | ○ | ○ | 2H | ○ | X | X | ○ |
| Ex. F12 | 3.0 | 7.5 | 90.0 | $1 \times 10^9$ | 40 | 50 | ○ | X | B | ○ | X | X | X |
| Ex. F13 | 3.0 | 7.5 | 90.0 | $1 \times 10^9$ | 40 | 50 | ○ | X | B | ○ | X | X | X |
| Ex. F14 | 2.0 | 0.5 | 92.0 | $5 \times 10^{13}$ | 50 | 70 | X | X | 2H | X | X | X | X |
| Ex. F15 | 3.5 | 2.0 | 92.0 | $1 \times 10^9$ | 50 | 60 | ○ | X | 2H | ○ | ○ | ○ | — |
| Ex. F16 | 1.0 | 0.1 | 96.0 | $1 \times 10^{13}$ | 70 | 90 | ○ | ○ | 2H | ○ | ○ | — | ○ |

EXPLANATION OF REFERENCES

1: Antireflection film
3: Manufacturing apparatus
11: Transparent substrate
12: Uneven distribution layer
12a: Middle layer
12b: Hard coating layer
12c: Recoating layer
13: Low refractive index layer
21: Coating unit
22: Drying unit
22a: First drying unit
22b: Second drying unit
23: Ionizing radiation applying unit
31a, 31b: Reels
33a, 33b: Guide rollers

The invention claimed is:

1. An antireflection film comprising:
a transparent substrate,
a first layer laminated on the transparent substrate and having a first refractive index, and
a second layer laminated on the first layer and having a second refractive index lower than the first refractive index of the first layer,
wherein:
the first layer is a cured coating film containing an ionizing-radiation-curable material, a quaternary ammonium salt material, a leveling material and a solvent,
the first layer has a thickness ranging from at least 3 μm to 15 μm and has a multi-layer structure comprising a recoating layer, a middle layer provided between the transparent substrate and the recoating layer, a hard coating layer provided between the middle layer and the recoating layer;
the middle layer contains the ionizing-radiation-curable material and components of the transparent substrate in which the ionizing-radiation-curable material are mixed with the components of the transparent substrate;
the recoating layer contains the ionizing-radiation-curable material and the leveling material and does not contain the quaternary ammonium salt material;
the hard coating layer contains the ionizing-radiation-curable material and the quaternary ammonium salt material, wherein a concentration of the quaternary ammonium salt material in the hard coating layer increases from a middle layer side of the hard coating layer facing toward the middle layer toward a recoating layer side of the hard coating layer facing toward the recoating layer over a thickness direction of the hard coating layer, such that the concentration of the quaternary ammonium salt material contained in the hard coating layer is higher at the recoating layer side than at the middle layer side;

the leveling material comprises a compound having an acryl group, the leveling material having a molecular weight ranging from 1,000 to 80,000, an amount of the leveling material contained in the first layer ranging from 0.001 parts by mass to 5.00 parts by mass with respect to the first layer of 100 parts by mass, the compound having the acryl group being an acrylic leveling material that contains the acryl group within a molecule of the compound and having a structure represented by the following chemical formula 1:

[Chemical Formula 1]

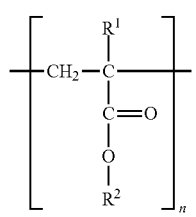

where $R^1$ is at least one of H, $CH_3$, or $C_nH_{2n-1}$ (n=natural number) and $R^2$ is at least one of an alkyl group, a polyester group, a polyether group, and a salt;
the quaternary ammonium salt material has a molecular weight ranging from 2,000 to 80,000, an amount of the quaternary ammonium salt material contained in the first layer ranging from 0.5 parts by mass to 20 parts by mass with respect to the first layer of 100 parts by mass;
a parallel light transmittance of the antireflection film is not less than 93%;
a haze of the antireflection film is not more than 0.5%;
a surface resistance of the second layer ranges from $1 \times 10^5$ $\Omega/cm^2$ to $1 \times 10^{12}$ $\Omega/cm^2$;
a pure-water contact angle of a surface of the second layer ranges from 80° to 140°; and
an average luminous reflectance of the surface of the second layer ranges from not less than 0.2% to not more than 2.0%.

2. The antireflection film according to claim 1, wherein:
the concentration of the quaternary ammonium salt material contained in the hard coating layer gradually increases from the middle layer side toward the recoating layer side.

3. The antireflection film according to claim 1, wherein:
a pencil hardness of a surface of the second layer is 2H.

4. The antireflection film according to claim 2, wherein:
a pencil hardness of a surface of the second layer is 2H.

5. An antireflection film comprising:
a transparent substrate,
a first layer laminated on the transparent substrate and having a first refractive index, and
a second layer laminated on the first layer and having a second refractive index lower than the first refractive index of the first layer,
wherein:
the first layer is a cured coating film containing an ionizing-radiation-curable material, a quaternary ammonium salt material, a leveling material and a solvent,
the first layer has a thickness ranging from at least 3 μm to 15 μm and has a multi-layer structure comprising a recoating layer, a middle layer provided between the transparent substrate and the recoating layer, a hard coating layer provided between the middle layer and the recoating layer;

the middle layer contains the ionizing-radiation-curable material and components of the transparent substrate in which the ionizing-radiation-curable material are mixed with the components of the transparent substrate;
the recoating layer contains the ionizing-radiation-curable material and the leveling material and does not contain the quaternary ammonium salt material;
the hard coating layer contains the ionizing-radiation-curable material and the quaternary ammonium salt material, wherein a concentration of the quaternary ammonium salt material in the hard coating layer increases from a middle layer side of the hard coating layer facing toward the middle layer toward a recoating layer side of the hard coating layer facing toward the recoating layer over a thickness direction of the hard coating layer, such that the concentration of the quaternary ammonium salt material contained in the hard coating layer is higher at the recoating layer side than at the middle layer side;
the leveling material comprises a compound having an acryl group, the leveling material having a molecular weight ranging from 1,000 to 80,000, an amount of the leveling material contained in the first layer ranging from 0.001 parts by mass to 5.00 parts by mass with respect to the first layer of 100 parts by mass, the compound having the acryl group being an acrylic leveling material that contains the acryl group within a molecule of the compound and having a structure represented by the following chemical formula 1:

[Chemical Formula 1]

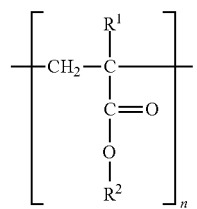

where $R^1$ is at least one of H, $CH_3$, or $C_nH_{2n-1}$ (n=natural number) and $R^2$ is at least one of an alkyl group, a polyester group, a polyether group, and a salt;
the quaternary ammonium salt material has a molecular weight ranging from 2,000 to 80,000, an amount of the quaternary ammonium salt material contained in the first layer ranging from 0.5 parts by mass to 20 parts by mass with respect to the first layer of 100 parts by mass;
a parallel light transmittance of the antireflection film is not less than 93%;
a haze of the antireflection film is not more than 0.5%;
a surface resistance of the second layer ranges from $1 \times 10^5$ $\Omega/cm^2$ to $1 \times 10^{12}$ $\Omega/cm^2$;
a pure-water contact angle of a surface of the second layer ranges from 80° to 140°;
an average luminous reflectance of the surface of the second layer ranges from not less than 0.2% to not more than 2.0%; and
the antireflection film is produced by a process comprising:
forming a first coating film by applying a coating liquid to at least one principal surface of the transparent substrate, the coating liquid containing the ionizing-radiation-curable material, the quaternary ammonium salt material, the leveling material and the solvent;

subjecting the first coating film to primary drying that is performed in a solvent atmosphere corresponding to a solvent concentration ranging from 0.2 vol % to 10 vol %, the solvent used in the solvent atmosphere being a methyl acetate;

subjecting the first coating film that has been subjected to the primary drying to secondary drying; and applying ionizing radiation to the first coating film that has been subjected to the secondary drying to obtain the first layer as a cured material of the first coating film.

6. The antireflection film according to claim 5, wherein:

the primary drying is performed in a range of 15° C. to 30° C.;

the secondary drying is performed in a range of 40° C. to 150° C.; and in the first drying, time from when the first coating film is applied until when the solvent contained in the first coating film become 10 parts by mass or less ranges from 2 seconds to 60 seconds.

7. The antireflection film according to claim 6, wherein:

the primary drying is performed at a temperature of 25° C. for 10 seconds; and the secondary drying is performed at a temperature of 80° C. for 60 seconds.

8. A method of producing an antireflection film according to claim 1, comprising:

forming a first coating film by applying a coating liquid to at least one principal surface of the transparent substrate, the coating liquid containing the ionizing-radiation-curable material, the quaternary ammonium salt material, the leveling material and the solvent;

subjecting the first coating film to primary drying;

subjecting the first coating film that has been subjected to the primary drying to secondary drying; and applying ionizing radiation to the first coating film that has been subjected to the secondary drying to obtain the first layer as a cured material of the first coating film.

9. The method of producing an antireflection film according to claim 8, wherein:

the coating liquid contains 25 parts by mass to 85 parts by mass of the solvent per 100 parts by mass of the coating liquid; and the solvent contain 30 parts by mass or more of a solvent that dissolves or swells the transparent substrate, per 100 parts by mass of the solvent.

10. The method of producing an antireflection film according to claim 8, wherein:

the primary drying is performed in a range of 15° C. to 30° C.; and the secondary drying is performed in a range of 40° C. to 150° C.

* * * * *